United States Patent [19]
Van Huben et al.

[11] Patent Number: 5,878,408
[45] Date of Patent: Mar. 2, 1999

[54] DATA MANAGEMENT SYSTEM AND PROCESS

[75] Inventors: Gary Alan Van Huben; Joseph Lawrence Mueller, both of Poughkeepsie, N.Y.; Michael Steven Siegel, Raleigh, N.C.; Thomas Bernard Warnock; Darryl James McDonald, both of Austin, Tex.

[73] Assignee: International Business Machines Corporation, Armonk, N.Y.

[21] Appl. No.: 761,253

[22] Filed: Dec. 6, 1996

[51] Int. Cl.⁶ ...................................................... G06F 17/30
[52] U.S. Cl. .................................................. 707/1; 707/200
[58] Field of Search ................................... 707/1, 2, 3, 7, 707/8, 9, 10, 100, 101, 102, 103, 104, 200, 201, 202, 203, 204; 364/282.1, 282.3, 222.81, 222.82, 221.7, 253

[56] References Cited

U.S. PATENT DOCUMENTS

| | | | |
|---|---|---|---|
| 5,201,047 | 4/1993 | Maki et al. | 707/4 |
| 5,321,605 | 6/1994 | Chapman et al. | 705/7 |
| 5,333,312 | 7/1994 | Wang | 707/10 |
| 5,333,315 | 7/1994 | Saether et al. | 707/1 |
| 5,333,316 | 7/1994 | Champagne et al. | 707/8 |
| 5,386,559 | 1/1995 | Eisenberg et al. | 707/201 |
| 5,418,949 | 5/1995 | Suzuki | 707/205 |
| 5,504,879 | 4/1996 | Eisenberg et al. | 707/100 |
| 5,544,360 | 8/1996 | Lewak et al. | 707/1 |
| 5,574,898 | 11/1996 | LeBlang et al. | 707/1 |
| 5,592,661 | 1/1997 | Eisenberg et al. | 707/104 |
| 5,600,832 | 2/1997 | Eisenberg et al. | 707/203 |

OTHER PUBLICATIONS

Oliver Tegel, "Integrating Human Knowledge Into The Product Development Process" published in Proceedings of ASME Database Symposium Eng–Data Mgmt, Integrating the Engineering Enterprise ASME Database Symposium 1994, ASCE NY USA, pp. 93–100.

"Beyond EDA" published in Electronic Business, vol. 19, No. 6, Jun. 1993 pp. 42–46, 48.

Primary Examiner—Thomas G. Black
Assistant Examiner—Ruay Lian Ho
Attorney, Agent, or Firm—Lynn L. Augspurger

[57] ABSTRACT

A design control system suitable for use in connection with the design of integrated circuits and other elements of manufacture having many parts which need to be developed in a concurrent engineering environment with inputs provided by users and or systems which may be located anywhere in the world provides a set of control information for coordinating movement of the design information through development and to release while providing dynamic tracking of the status of elements of the bills of materials in an integrated and coordinated activity control system utilizing a repository which can be implemented in the form of a database (relational, object oriented, etc.) or using a flat file system. Once a model is created and/or identified by control information design libraries hold the actual pieces of the design under control of the system without limit to the number of libraries, and providing for tracking and hierarchical designs which are allowed to traverse through multiple libraries. Data Managers become part of the design team, and libraries are programmable to meet the needs of the design group they service.

15 Claims, 40 Drawing Sheets

FIGURE 2

File  Return  Filter  Owner  Status                               Help

235 — NAME  [           ]  ▷
236 — LIBRARY  [           ]  ▷
237 — TYPE  [           ]  ▷
238 — VERSION  [           ]  ▷
239 — LEVEL  [           ]

MODEL STATUS:  VALID              MODEL OWNER:  FORD

| NAME | TYPE | LIB | VERS | LEVEL | STATUS |
|---|---|---|---|---|---|
| 0001 A ALU | SCHEM | CP_LIB | BASE | ENGIN | VALID |
| 0002 I ALU | VHDL | CP_LIB | BASE | ENGIN | VALID |
| 0003 O ALU | SYNTHES | CP_LIB | BASE | ENGIN | VALID |
| 0004 I ADDER | LAYOUT | TECH | HIPWR | QUAL | INVAL |
| 0005 A MULT_DIV | LAYOUT | TECH | LOPWR | QUAL | VALID |
| 0006 I MULT1 | GATE | TECH | LOPWR | QUAL | VALID |
| 0007 I DIV1 | GATE | TECH | LOPWR | QUAL | VALID |
| 0008 | | | | | |
| 0009 | | | | | |

240

FIGURE 5a
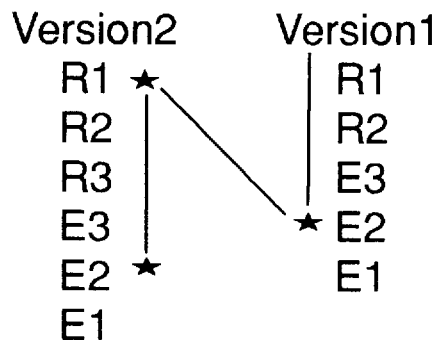
Starting at Version 2
Level E2
Search resumes at same
level in Version 1
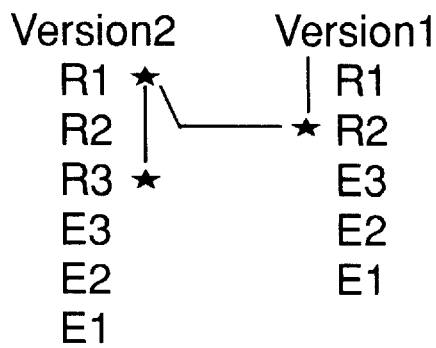
Starting at Version 2
Release Level R3
Search resumes at most
recent release level
in Version 1
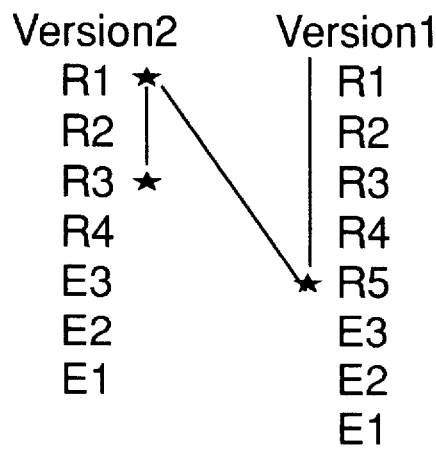
Starting at Version 2
Release Level R3
Search resumes at most
recent release level
in Version 1

FIGURE 16

38211 — LIBRARY PROCESS EXCEPTION FORM

| | | |
|---|---|---|
| NAME | | |
| 38212 — LIBRARY | | ▽ — 38217 |
| TYPE | | ▽ — 38218 |
| 38213 — VERSION | | ▽ — 38219 |
| 38214 — LEVEL | | ▽ — 38220 |

38215 — PROCESS TYPE

38623 — ● PRE   ○ POST   ○ DILP

FIGURE 18

VIEW / EDIT LIBRARY PROCESS RESULTS

- 38211 — NAME
- 38212 — LIBRARY
- 38213 — TYPE
- 38214 — VERSION
- 38215 — FILE LEVEL
- 38824 — PROC LEVEL

- 38217
- 38218
- 38219
- 38220
- 38825

PROCESS TYPE

● PRE  ○ POST  ○ DILP  ○ FOREGROUND

```
39201 ────┐  H  SCHEMATIC  FULL
39202,3,4 ┌─ M  /HOME/ALU.SCHEM  SCHEMATIC  A  43E2
          │  M  /HOME/ALU.BEHAV   DATAFLOW   I  71E2
          └─ M  /HOME/ALU.GATE    SYNTHESIS  O  9022
39205 ────── R  GATEGEN /HOME/ALU.SCHEM SCHEMATIC 0
39206,7 ┌─── K  /TOOLS/BIN/AUTOSYN  648A
        └─── K  /TOOLS/RULES/SR71_TECH  3129
39208 ────── P  /HOME/ALU.PEDFILE  PED  08BC
```

DATA MANAGEMENT SYSTEM AND PROCESS

COPYRIGHT NOTICE AND AUTHORIZATION

This patent document contains material which is subject to copyright protection.

(C) Copyright International Business Machines Corporation 1995, 1996 (Unpublished). All rights reserved. Note to U.S. Government Users—Documentation related to restricted rights—Use, duplication, or disclosure is subject to restrictions set forth in any applicable GSA ADP Schedule Contract with International Business Machines Corporation.

The owner, International Business Machines Corporation, has no objection to the facsimile reproduction by any one of the patent disclosure, as it appears in the Patent and Trademark Office patent files or records of any country, but otherwise reserves all rights whatsoever.

FIELD OF THE INVENTION

This invention is related to a Computer Integrated Design Control System and Method for concurrent engineering, and particularly to process management in a concurrent engineering environment useful in connection with the design, development and manufacturing of complex electronic machines such as computer systems and their complex electronic parts.

RELATED APPLICATIONS

The preferred embodiment of our claimed invention is described in detail herein. Our preferred embodiment may desireably interact with other inventions which may be considered related applications filed concurrently herewith, having inventors in common with this our preferred embodiment of this invention.

For convenience of understanding, these other applications describe various systems, methods and processes for data management particularly suited for use with this invention, our Data Management System and Processes.

The related applications include the application entitled Data Management System and Method for Concurrent Engineering which provides greater detail about our Aggregation Manager for a Data Management system, and Data Management System for Concurrent Engineering, and Data Management System for Problems, Releases and Parts for Computer Integrated Design Control which describes a method for managing problems, releases and multiple releases, and Data Management System having Shared Libraries.

All of these related applications are filed concurrently herewith, and their disclosures are incorporated herein by this reference. All are commonly assigned to International Business Machines Corporation, Armonk, N.Y.

GLOSSARY OF TERMS

While dictionary meanings are also implied by certain terms used here, the following glossary of some terms may be useful.

| | |
|---|---|
| AFS | Andrew File System - File Management System developed by Transarc Inc. and used on Unix/AIX Networks. |
| API | Application Program(ming) Interface. |
| ASC | Accredited Standards Committee (ANSI) |
| BOM | Bill of Materials |
| CIM | Computer Integrated Manufacturing |
| CR | Control Repository |
| CRC | Cyclic Redundancy Check |
| CLSI Compiler | VHDL Analyzer developed by Compass Design Systems |
| DCS | Design Control System. Our Design Control System incorporates Data Management System processes, including interactive data management systems which supply processes which may be applicable in general data management systems, such as a process manager, a promotion manager, a lock manager, a release manager, and aggregation manager and the other processes we describe herein as part of a Computer Integrated Design Control System and, where the context applies, Data Management System, is a Data Management System functioning within an overall integrated design control system. |
| DILP | Designer Initiated Library Process |
| DM | Data Manager or Data Management |
| DMCU | Data Management Control Utilities |
| DMS | Data Management System |
| DR | Data Repository |
| EC | Engineering Change |
| EDA | Electronic Design Automation |
| GUI | Graphical User Interface |
| PDM | Product Data Management |
| PIM | Product Information Management |
| PN | Part Number |
| RAS | Random Access Storage |
| sim | static inline memory |
| tape-out | Delivery of a coherent set of design data to manufacturing. Also known as Release Internal Tape (RIT) within IBM. |
| TDM | the Cadence Team Design Manager (most currently Version 4.4) |
| VHDL | Very High-Level Design Language - A high level language comprised of standards supported by IEEE and the EDA industry. The language is widely used in the electronics and computer industry and by the military as an alternative to Verilog and ADA, other high level computer coding languages. |

BACKGROUND OF THE INVENTION

Historically there has been a division between data management and process management. Many solutions have been designed to either manage pieces of data in a repository or navigate data through a manufacturing or design process. In environments where large quantities of data need to be subjected to some type of process, qualities from both solutions are required. For example, a typical data management system may permit data to be moved from one repository to another. Once the data arrives, a different system is employed to initiate the data into a process flow. In addition, many solutions fail to record the results of the process into the data management system for direct association with the data. These systems lack the capability to audit the data against prescribed criteria or ensure that data integrity is maintained during and after process execution in a design control system for concurrent engineering.

In the article entitled "Beyond EDA (electronic design automation)", published in Electronic Business Vol.19, No.6 June 1993 P42–46, 48, it was noted that while billions of dollars have been spent over the past (then and still last) five years for electronic design automation systems (EDA) and software to help companies cut their design cycle, a huge gulf remains between design and manufacturing. To eliminate the gulf and thus truly comply with the commandments, companies are extending the concept of concurrent engineering to enterprise wide computing. The concept, which calls for integrating all the disciplines from design to manufacturing is becoming the business model of the 1990s. Achieving an enterprise wide vision requires tying together existing systems and programs and managing the data that flows among them. Software that makes that linkage possible is largely in the class known by two names: product data management (PDM) or product information management (PIM). Mr. Robinson, the author, described the experiences of several companies with PIM and PDM, in particular Sherpa and Cadence.

The design of complex parts, such as integrated circuits, computers, or other complex machines in a complete manufacturing operation like IBM's requires computer capability, with computers capable of processing multiple tasks, and allowing concurrent data access by multiple users. The IBM System 390 operating system known as Multiple Virtual Storage (MVS) allows such things as relational database management methods, such as the TIME system described by U.S. Pat. No. 5,333,316, to be used to reduce design time. The TIME system is used within IBM for the purposes described in the patent during circuit design. However, these prior efforts treated design as directed to an entity and did not achieve the efficiencies provided by the system detailed in our description of our invention, which also can run under MVS, but also under other operating systems. Our detailed description of our invention will illustrate that we have furthered the objects of the invention of U.S. Pat. No. 5,333,316 by increasing the flexibility of a number of circuit designers who may concurrently work on designing the same integrated circuit chip and reducing the interference between chip designers. With the prior system, a user (a person, processor or program capable of using data in a relational database) was given a private copy of the master table. Alteration of a row in the user table was not automatically updated in the master table, because a lock mechanism prevented the row update, but that was an great improvement at the time, because no longer did multiple users have to wait for copying of a table, each time data from a user needed to be updated. This row locking and treatment of data has become widespread in the relational database field, and it has been enabled for use with multiple instances of a platform even on Unix machines today. We should note that also in the MVS art, there have been proposed various library systems, e.g. those represented by U.S. Pat. Nos. 5,333,312 and 5,333,315 and others which relate to IBM's Image Object Distribution Manager in the ImagePlus product line of IBM, and IBM's Office Vision are examples of systems enabling control of a source document while allowing access by multiple users. Implementation of these patented ideas enable synchronous and asynchronous copying of a document into a folder in a target library. These methods provide for check out of a document and its placement in a target library while locking the document in the source library to prevent changes while the checked out document is out. But these steps are only some of the many things that are needed to bring a product to a release state. Bringing a product to a release state is an object of the current developments relating to design control in a manufacturing setting.

Concurrent engineering is required among many engineers working in parallel and at different locations worldwide. Furthermore, as noted by Oliver Tegel in "Integrating human knowledge into the product development process" as published in the Proceedings of the ASME Database Symposium, Engineering Data Management: Integrating the Engineering Enterprise ASME Database Symposium 1994. ASCE, New York, N.Y., USA. p 93–100, specialists who are not working directly together are often needed for solving the demanding tasks that arise during the development of today's advanced products. During product development, assistance is required from other departments such as manufacturing, operations scheduling, etc. Even the vendors and customers should be integrated into the product development process to guarantee the product developed will be accepted in the market.

There is a need for integrators/coordinators/model builders and the designers to work together to create a next release. Information from different people in different forms must be collected aiming at a final good design. A problem occurring during product development is, how to know which people to contact for what kind of information, but that is only one. During all of the process concurrent engineering, particularly for the needs of complex very large scaled integrated system design, needs to keep everything in order and on track, while allowing people to work on many different aspects of the project at the same time with differing authorizations of control from anywhere at anytime.

For the purpose of the following discussion, need to say that we call our system a "Computer Integrated Design Control System and Method" because it encompasses the ability to integrate CIM, EDA, PDM and PIM and because it has the modularity making it possible to fulfill these needs in a concurrent engineering environment particularly useful to the design of complex very large scaled integrated systems as employed in a computer system itself. The making of these systems is a worldwide task requiring the work of many engineers, whether they be employed by the manufacturer or by a vendor, working in parallel on many complete parts or circuits which are sub-parts of these parts. So as part of our development, we reviewed the situation and found that no-one that we have found is able to approach the creation of "Computer Integrated Design Control System" like ours or employ the methods needed for our environment. Our methods are modular and fulfill specific functions, and yet make it possible to integrate them within a complete "Computer Integrated Design Control System".

A patent literature review, especially one done with retrospective hindsight after understanding our own system and method of using our "Computer Integrated Design Control System" will show, among certainly others, aspects of DMS systems which somewhat approach some aspect of our own design, but are lacking in important respects. For instance, after review of our detailed description, one will come to appreciate that in modern data processing systems the need often arises (as we provide) to aggregate disparate data objects into a cohesive collection. These data objects may reside at various levels of completion, spanning multiple versions and/or repositories in a hierarchical, multi-tiered data management system. Additionally, these data aggregations may need to be hierarchical themselves, in order to enable the creation of large groupings of data with varying levels of granularity for the data included therein. In such a data management system, the end-users of the data aggregates are not necessarily the "owners" of all or any of the data objects comprising the data aggregate, but they have a need to manage the particular collection. Management of a data aggregation may include creating the aggregation, adding or deleting data objects, moving the aggregation through a hierarchical, multi-tiered data management system and tracking the status of the data aggregation in real-time while maintaining the coherence of the data aggregation. Creation of a data aggregation or the addition of a data object to an existing data aggregate may need to be accomplished within the data management system or via data objects imported into the data management system through application program interfaces for the data management system.

With such a focus, when one reviews the art, one will certainly find, currently, data management systems which provide means for grouping components of a data system to facilitate the retrieval thereof. However, these data management systems are insufficient and lacking because they fail to address the above-referenced need for grouping disparate data items, just to mention one aspect of our own developments.

Another example, U.S. Pat. No. 5,201,047 to Maki et al. (issued Apr. 6, 1993) teaches an attribute based classification and retrieval system wherein it is unnecessary to implement an artificial code for indexing classifications. The patent teaches a method for defining unique, user-determined attributes for storing data which are capable of being readily augmented without necessitating the modification of the underlying query used for retrieval thereof. However, the Maki et al. patent requires that the data items being grouped share at least one common attribute to enable the grouping, and therefore fails to address the problems of managing data aggregates formed from disparate and unrelated data objects.

Other data management systems address the creation of data aggregates coupled to particular processes implemented in the data system. For example, U.S. Pat. No. 5,321,605 to Chapman et al. issued Jun. 14, 1994) teaches the creation of a Bill of Resources table which represents the resources consumed in the performance of a given process. Attribute tables for the given resources are utilized to determine whether additional processes which will consume some or all of the resources of a given process can be initiated. The patent to Chapman et al., requires that each process to be initiated have a particular Bill of Resources aggregate associated therewith. This tightly coupled construct does not permit the creation of data aggregates not related to a particular process implemented in the data management system. Furthermore, since a process must be contemplated in order to create a Bill of Resources table, Chapman et al. do not permit the creation of aggregates without foreknowledge of the process that requires the resource. Thus, in a manner similar to that described for Maki et al., Chapman et al. require that a relationship between the elements exist prior to the formation of the Bill of Resources grouping.

Also, unrelated DMS systems are known which are used for hardware implementations which enable related data in a computer memory, storage or I/O subsystem to be physically grouped in proximity to other such data so as to improve hardware performance, application performance, and/or to solve memory management issues are known. For example, U.S. Pat. No. 5,418,949 to Suzuki (issued May 23, 1995) teaches a file storage management system for a database which achieves a high level of clustering on a given page and teaches loading related data from a secondary storage unit at high speed. The patent uses map files including a metamap file for defining page to page relations of data. These hardware implementations are not related to the present invention, as they involve the management of the physical contents of a data object rather than the management of aggregations of data objects as we perform the methods of our present invention. It is contemplated, however, that such known hardware techniques may be implemented in a system comprising the aggregation management features disclosed herein, thereby further augmenting the overall system efficiency.

During our development process we have viewed the development of others. Even the best of the EDA (electronic design automation) design houses don't have an integrated approach like we have developed.

For the purposes of this background, we will discuss some of the various approaches already used specifically viewing them in light of our own separate developments which we will further elaborate in our detailed description of our invention which follows later in this specification.

In the field of EDA, there are today two preeminent vendors of development software, Cadence Design Systems, Inc. and ViewLogic, Inc. Of course there are others, but these two companies may have a greater range of capability than the others. Also, there are in house systems, such as IBM's ProFrame which we think is unsuitable for use. It will not function well as a stand-alone DM point tool for integration into a foreign framework. But even the largest microelectronic systems are customers of the two named vendors which we will compare. Today, a DCS, it will be seen, without our invention, would require fitting together pieces of disparate systems which don't interact, and even such a combination would not achieve our desirable results.

For the purposes of comparison, after our own description of our environment, our "Computer Integrated Design Control System", we will discuss the features of the Cadence Team Design Manager Version 4.4 and ViewLogic's ViewData in Sections which compare with and refer to the Sections of our own preferred "Computer Integrated Design Control System" as set forth at the beginning of our detailed description of our invention. This comparison will show the shortcomings of these prior systems, as well as some changes which could be made to these prior systems to allow them to improve performance in our concurrent engineering environment by taking advantage of aspects of our own development as alternative embodiments of our invention.

Historically many attempts have been made to collect or group objects together in order to solve typical data management problems. These problems may include identifying all of the files used to create a model, or grouping files together to facilitate transport through a medium. The intent is usually to ensure the group remains together for a specified period of time.

The most common method in use today is to create a listing of files commonly referred to as a Bill of Materials. Many commercial products permit creation of such a BOM, but these BOM are static list BOM. For example, if one of the members of the BOM disappears or gets changed, the user is unaware that the original data set used to create the BOM is no longer valid.

We have created a new process which we call an Aggregation Manager which can be used in Bill of Materials applications but which overcomes prior disadvantages and also one which can be used in our Computer Integrated Design Control System.

SUMMARY OF THE INVENTION

Our invention provides for processing and tracking data for a Data Management Design Control System running in a client server environment where elements of the system may exist on a homogenous computer platform, or the elements may be scattered across multiple platforms in a heterogeneous environment. The Design Control System provides processes for hardware design, software development, manufacturing, inventory tracking, or any related field which necessitates execution of repetitive tasks against multiple iterations of data in a quality controlled environment.

Our invention provides a design control system usable in a concurrent engineering process which can cooperate in a distributed environment worldwide to enable a design to be processed with many concurrent engineering people and processes. The system we employ uses a data management control program tangibly embodying a program of instructions executable by a supporting machine environment for performing method steps by an aggregation manager of a data management system having a library organization which receives a request of a user initiated from said displayed client screen and fulfills the request by a providing result via our data management system's aggregation manager.

Our invention provides an improved way to make or import a model, and provides a dynamic way to track the model during its course through its design phase. We provide a way to track the BOM.

In order to make a common model, we display for creation of a model one or more control screen sections as part of a control panel input screen allowing creation of a model by interactive user activity, by importing a file listing, by searching of a library of files in said data management system and importing a located file, or by use of an application program interface with a collection of model management utilities utilities. Our sections of said control screen panel include:

(a) a display screen section displaying a first field representing the name of an anchor name field of a model which is identical to the name of a data object which is serving as a named anchor;

(b) a display screen section displaying a second field representing a library where said named anchor resides;

(c) a display screen section displaying a third field representing the type of data object identified by said anchor name;

(d) a display screen section displaying a fourth field representing user entries for the version of said named anchor;

(e) a display screen section displaying a fifth field representing user entries for the level of said named anchor for use by a user or a third party tool for creating, modifying or deleting an aggregate collection of data objects, encompassing those used for items that are identified, tabulated, tracked, validated and invalidated, and promoted, as are bills of materials, by said data management system; and (f) a display screen section displaying a sixth field representing user entries for the status of said named anchor.

Our model thus consists of one anchor and one or more associated components, each of which is a data object in said data management system. This means that our components can belong to any level and version of any library in said data management system and said components are not restricted to the same library, level and version as the anchor, and our components can and do comprise multiple data types, including data generated by tools of said data management system and third party tools. Thus we further provide that each component is labeled as an input or an output of its associated anchor. Thus we provide that each one component may be an anchor to another different model, and when such a component is an anchor to another different model, said different model consists of said such component acting as one anchor and further consisting of one or more associated components each of which is a data object in said data management system. In accordance with our invention our components can belong to any level and version of any library in said data management system and our components are not restricted to the same library, level and version as the anchor, and our components can comprise multiple data types, including data generated by tools of said data management system and third party tools.

Each of our components has field identifiers like those of our anchor and each component is also labeled as an input or an output of its associated anchor. Each one component may be an anchor to still another different model, with each component being labeled as an input or output in relation to its anchor file. All components of a model are either static and thus does not move through said data management system but is tracked by the system or dynamic and moves through said data management system with its associated model as part of an action of promoting a model when a model is promoted, a dynamic member being labeled as an input or an output with respect to its associated anchor, while both anchors and components may be labeled as static.

With these facilities, concurrent engineering is enhanced, and after creation of a model, thereafter, our system provides continuously tracking the created model while allowing a user to modify it by adding components, deleting components, changing the status or deleting said created model, and allowing promotion of a model in our data processing system through the libraries of our data processing system.

This, along with many other changes have been made as detailed in the description of our invention which follows.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

FIG. 2 illustrates our preferred embodiment's data entry.

FIG. 16 shows the Library Process Exception screen which allows a user to exclude a file from Library Processing.

FIG. 18 shows the user screen which enables one to view, and in certain cases edit, the results of Library Processes.

FIG. 20 is an example PEDigree file.

DETAILED DESCRIPTION OF THE INVENTION

Overview (Section 1.0)

In order to introduce our Design Control System we will describe it as it can be applied to development of complex circuit design and development projects such as microprocessor design projects. The implementation of our Design Control System can be implemented in a variety of ways using many computing platforms as is suitable for a concurrent engineering project. While we will describe our preferred embodiment, it should be recognized that with this teaching all or part of our exact implementation of user interfaces, methods, features, properties, characteristics and attributes may vary depending on the platform chosen and the surrounding design system. All of these variances will nevertheless employ those routines which implement our processes and which meet our requirements.

Platform (Section 1.1)

The Design Control System (DCS) in our preferred embodiment, even though it can be implemented with other platforms, runs on a network of RS/6000's (workstation class "personal" computers) with an AIX operating system arranged in a Client-Server fashion. Each client and server in our preferred embodiment, is able to implement cross platform code via interpretation, and thus can implement programs written in cross platform languages like Java and VRML. In such situations, Java can interact with VRML by describing extension modes, acting as scripts, and describing the actions and interactions of VRML objects.

Figure 1:
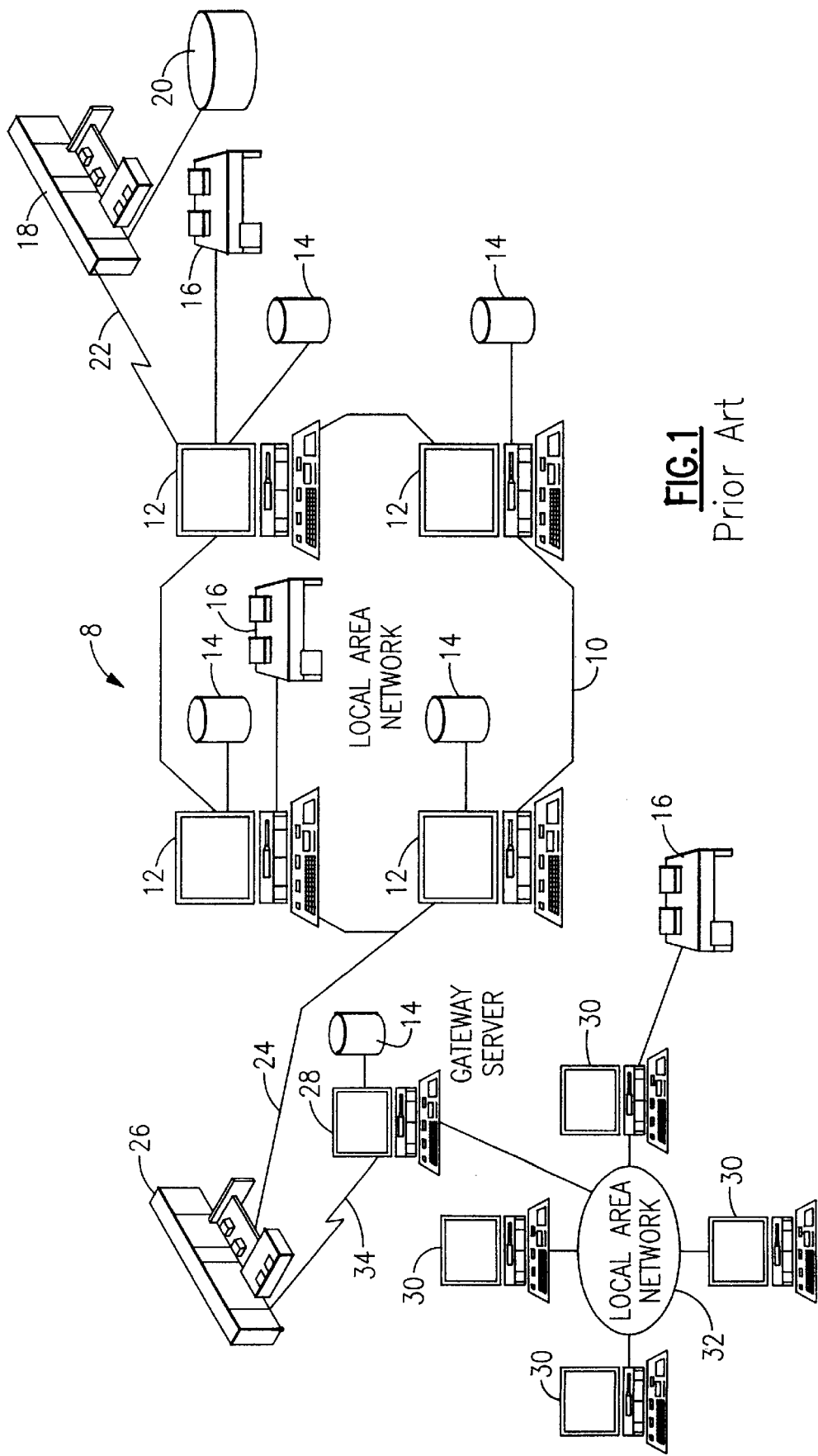
FIG. 1 illustrates a prior art system in which our present system can operate by changes made to the database and design control system, in accordance with our detailed description.

While more powerful situations are contemplated, the system can be installed in a prior art system, like that described in U.S. Pat. No. 5,333,312. Thus, as we show in FIG. 1, the prior art system of the earlier patent, can be employed in this application, by providing the system with new programs. However, such a system, as illustrated by FIG. 1 will be a data processing system 8, which may include a plurality of networks, such as Local Area Networks (LAN), 10 and 32, each of which preferably includes a plurality of individual computers 12 and 30 (which may be RS/6000 workstations or powerful PCs such as the IBM Aptiva's. As common in such data processing systems, each computer may be coupled to a storage device 14 and/or a printer/output device 16. One or more such storage devices 14 may be utilized, to store applications or resource objects which may be periodically accessed by a user within the data processing system 8. As we have said the system is provides with a repository, illustrated by main frame/server computer 18, which may be coupled to the Local Area Network 10 by means of communications links 22, and also to storage devices 20 which serve as remote storage for the LAN 10. Similarly, the LAN 10 may be coupled via communications links 24 supporting TCP/IP through a subsystem control unit/communications controller 26 and communications link 34 to a gateway server 28. Gateway server 28 is preferably an individual computer which serves to link the LAN 32 to LAN 10. The main system can be located anywhere in the world, and remotely from the various servers and clients coupled to it over communications links. The main system can accommodate hundreds of users making requests to the centralized repository (a large server 18, such as one of IBM's S/390 platforms or IBM's RISC System/6000 Scalable POWERparallel Systems (SP) platform for design control information. (AIX, S/390, RS/6000, RISC System/6000 and Scalable POWERparallel Systems are trademarks of International Business Machines Corporation, Armonk, N.Y.)

Since this repository 18 (a large server and its associated storage) is critical to the entire design team, it has the ability to remain available if a single server fails. In addition, the data is secured via a backup or archiving mechanism performed on a regular basis. Our DCS has important performance characteristics. It can handle a distributed computing environment with data being transmitted over LANs and telephone lines linking distant locations in real time. Users at one site experience no noticeable delays accessing data physically located at another site. Due to the complexity of the design, maximum throughput is attained by transferring only the control data necessary to carry out the specific task. For large projects design control information can be physically segregated by library, version and level to minimize the bottleneck caused by too many users accessing the same physical server. In the case of the design data, the physical data is tracked via pointers whenever possible, so as to minimize the amount of file movement between servers. Although, the "official" control information is centralized in one place, the DCS permits certain data to be cached locally on the users machine to improve performance by reducing traffic to the Design Control Repository. For example, much of the control information for private libraries can be cached locally in order to maximize performance for private library accesses. For public libraries, the DCS allows the user to take "snapshots" of a library in which the image of the library is refreshed locally. The user continues to work with his local image of the library until he deems it necessary to refresh the image. The amount of control data that is actually cached is dependent on the environment and the actual implementation. Many of the performance issues are discussed further in the Sections to which they pertain.

Libraries and Design Control Repository (Section 1.2)

The Design Control System has two important components. The Design Control Repository contains the control information for all components of the design. This includes such things as the names of all the pieces, the type of data, the level, the version, the owner, and any results which are deemed quality control records. These results indicate the "degree of goodness" of the design component and they are used by the DCS to make decisions regarding the type of actions which can be performed on a piece of data. This repository can be and is preferably implemented in the form of a database (relational, object oriented, etc.) or using a flat-file system. The actual implementation is usually based on the environment.

As we have said, and as illustrated by the machine to person interface depicted by FIG. 2, our program of instructions executable by a supporting machine environment for performing method steps by an aggregation manager of a data management system having a library organization which receives a request of a user initiated from said displayed client screen as illustrated by FIG. 2 and fulfills the request by a providing a result which provides a dynamic way to track a model during its course through its design phase via our data management system's aggregation manager.

In order to make a common model, we display for creation of a model one or more control screen sections which provide our control information components 235 236, 237, 238, and 239 as part of a control panel input screen allowing creation of a model by interactive user activity, by importing a file listing providing the data of screen sections 235, 236, 237, 238, and 239, by searching of a library of files in said data management system and importing a located file containing the data of screen sections 235, 236, 237, 238, and 239, or by use of an application program interface with a collection of model management utilities which provides the data of screen sections 235, 236, 237, 238, and 239. These data fields of our control screen which when created by a user comprise data entered in the form boxes (a form is a screen section entry field for representing a model) illustrated in FIG. 2, and when retrieved or otherwise obtained by the system by importing a file listing providing the data of screen sections, by searching of a library of files in said data management system and importing a located file containing the data of screen sections, or by use of an application program interface with a collection of model management utilities, all provide the data of a control screen panel sections which include:

(a) a display screen section displaying a first field representing the name (235) of an anchor name field of a model which is identical to the name of a data object which is serving as a named anchor;

(b) a display screen section displaying a second field representing a library (236) where said named anchor resides;

(c) a display screen section displaying a third field representing the type (237) of data object identified by said anchor name;

(d) a display screen section displaying a fourth field representing user entries for the version (238) of said named anchor;

(e) a display screen section displaying a fifth field representing user entries for the level (239) of said named anchor for use by a user or a third party tool for creating, modifying or deleting an aggregate collection of data objects, encompassing those used for items that are identified, tabulated, tracked, validated and invalidated, and promoted, as are bills of materials, by said data management system.

Furthermore, while, as in the other cases for entry section fields, the same screen does not have to, but can, display an additional field which displays status information. Thus, as illustrated by FIG. 2, the system provides a display screen section displaying a sixth field representing user entries for the status of said named anchor. Now each field can be display separately and various combinations can be made, but all fields are provided by and used by our system. At any time, the entire model schema can be displayed, as it is in the field 240, which displays several models names, as well as their anchor, type, library, version, level and status (which is dynamically tracked by our system).

Our model thus consists of one anchor (with a name 235) and one or more associated components, each of which is a data object in said data management system. This means that our components can belong to any level and version of any library in said data management system and said components are not restricted to the same library, level and version as the anchor, and our components can and do comprise multiple data types, including data generated by tools of said data management system and third party tools.

Now once a model is created or otherwise identified, it becomes part of our system. Indeed the second component is our Design Libraries. They hold the actual pieces of design under the control of the system. There is no limit to the number of libraries under the management of the Design Control Repository, and hierarchical designs are allowed to traverse through multiple libraries. The libraries are managed by Data Managers (Librarians) who are members of the design team. All major facets of the libraries are programmable so they can be tailored to the needs of the design group they service. Certain design groups require more data control than others, so the flexibility exists to widely vary the degree of data control. Libraries are categorized as Public or Private. Both can be shared, but the main difference is that a private library is managed by the actual designer. It's used to hold his daily updates and often will have no formal control. The DOS achieves this by defaulting all control information to a simple non-restrictive form. For example, any designer can create private libraries on their own. They automatically become the owner and have the right to make additional designers "backup" owners. As the owner they can edit, save, modify, or delete any data in their library. The DCS automatically establishes all the proper AFS and AIX permissions. Owners of private libraries control who can access their data with the system accommodating the use of default "access groups" (such as AFS groups) so the designer doesn't have to enter the userids of all his team members each time he creates a new library. Since Private Libraries are considered working areas, data control checks are minimized in order to maximize performance. For example, when a new data element is created, the DCS does not check the Control Repository to make sure the owner has the proper authorities, locks, etc. Instead, a designer is permitted to work in a completely unrestricted fashion in his own work space. All controls are placed on public libraries. The only control checking required is to ensure there are no data conflicts within the Private Library. It is acceptable for two Private Libraries to contain the same design data, so no checks across libraries are done. Public Libraries are the official project data repositories. All data delivered to external customers comes from Public Libraries. Public Libraries are overseen by Data Managers who configure the libraries with varying degrees of control. Typically the libraries are organized with a level structure whereby the lowest levels have the least amount control. Control gets more stringent as the levels increase, and the highest level denotes data released to manufacturing. Almost every attribute concerning data integrity is programmable by the Data Manager. Through a Data Manager Utility, they configure the structure (the number of levels and versions, including the connections between them), the various authorities, the required criteria to enter each level, and the types of Library Controlled Processes required at each level. The system can handle numerous public libraries, and each public library can service unlimited users. In accordance with our preferred embodiment of our DCS architecture we provide an Automated Library Machine (ALM). More than merely a repository for data, the ALM is a userid capable of accepting, executing and dispatching tasks without any human intervention. This enables the designers to make requests of the ALM to promote data or run library processes without the need for a Data Manager to process it.

In order to improve throughput, the ALM can dispatch parallel tasks if the operating system (i.e. AFS) supports it and the situation allows it.

This concepts improves efficiency, and increases security, since the ALM is the only user that requires writable permissions to the data repositories. The physical location of the data residing in Public Libraries is determined by the Data Manager. The DCS along with the Data Manager (and his alternates) are the only means of writing data into or removing data from these physical locations. As a means of safety, the Data Manager does have the ability to access and overwrite data in these physical locations without using the DCS (i.e. thru the OS). This is necessary in the unlikely event the control information gets out of sync with the physical data, and the Data Manager has to manually complete a transaction. Physical locations are defined through the Data Manager Utility for setting up Public Libraries. More details on this are available in the Data Manager User Interface Section 15.

Data Types (Section 1.3)

Data may be identified by a filename (anchor name 235) and a filetype (236). The DCS automatically segregates all data by "type". Types are very useful to associate a piece of data with a tool or process. For example, UNIX/AIX uses extensions to qualify data such as using a ".ps" extension to denote a postscript file. The Cadence Design Management System uses Cell Views to segregate the various types of data within a particular Cell (design component). This segregation is a fundamental building block to Design Control Systems since certain types of data require more design control than other types. Our DCS allows each individual type to be controlled on a level and version basis within a library. The DOS is capable of tracking any data type from any point tool, even third party vendors.

Levels (Section 1.4)

Each Public Library consists of n levels which are established by the Data Manager. The naming of the levels (239) are arbitrary, but each denotes a degree of quality of the design. Data moves into and out of levels via a "promotion" mechanism. There are two types of levels in the DCS, Engineering (or working) and Release Levels.

Figure 3:
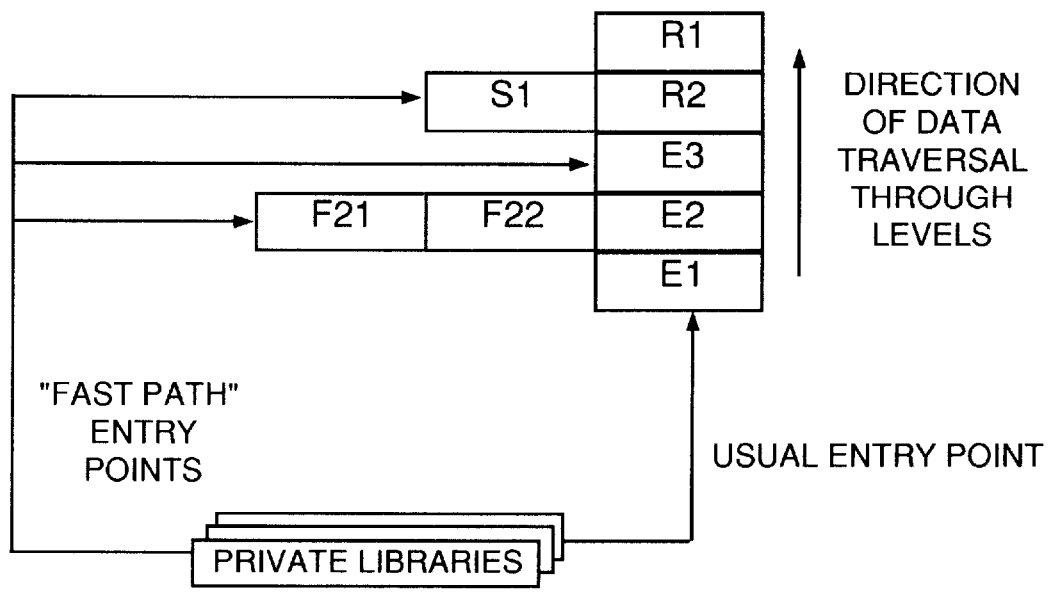
FIG. 3 illustrates our preferred Design Control System Level Structure.

FIG. 3 shows a typical level structure with 3 Engineering Levels denoted E1, E2 and E3, two main Release Levels denoted R1 and R2, a Sideways Release Level S1, and a Fast Path Stream consisting of F21 and F22. Data can be promoted into E1, F21, E3 and S1 from outside of the library, but it can only enter R2 from E3. E1, E2 and E3 are arranged in a serial fashion. The normal promotion path is for data to enter E1 (the least controlled level) and migrate up through E2, E3 and finally into R2 (the most tightly controlled level). The external paths into F21 and E3 are known as "fast paths" and exist to accommodate emergency updates to pieces of design residing at the higher levels. There are two different types of fast path arrangements:

Fast Path Entry means there is no fast path level associated with the Engineering level, just a "doorway" through which data can enter. Level E3 is an example of this where the user simply promotes data from the private library into E3. The DCS will run any preprocesses defined at E3, but any criteria that would normally be necessary to traverse through E1 and E2 is bypassed.

Fast Path Levels are staging areas where data is promoted into, and promoted through, in order to reach the target Engineering Level. There can be any number of Fast Path levels for any given Engineering Level. If there's more than 1, it's known as a Fast Path Stream since the data must migrate through all the Fast Path Levels before reaching the Engineering Level. F21 and F22 constitute a stream, which could've contained more than 2 levels. We have provided at least one level to provide an area where all the processing normally run at the E1 and E2 levels can be run to ensure that the fast path data meets all the same criteria.

Release Levels are handled in a different manner. R1 is the oldest release level and it's frozen, which means its contents can't be updated any longer. It contains a static snapshot of a design delivered to an external customer. R2 is now the active Release Level which is the destination of any data promoted from E3. The Data Manager programs the connection of E1 to E2 to E3 to Rn. The DCS automatically freezes the previous Release Level and connects E3 to the new Release Level whenever the Data Manage, creates a new one. Unlike main Release Levels, Sideways Release Levels are always active and there can be n Sideways Levels for each Release Level. The purpose of the Sideways Levels is to hold post tape-out updates such as microcode patches to hardware under test. Since the Release Level corresponding to that level of hardware is probably frozen, and a new iteration of design is propagating through the Engineering Levels, the only path into a Sideways level is directly from a Private Library. The Data Manager has the ability to reconfigure the Engineering Levels at any time based on these rules:

The connections between levels can be changed at any time. (i.e. E1→E2→E3 can be changed to E1→E3→E2.)

A level can be removed as long as no data resides in that level.

A level can be added at any time.

The Data Manager can create a new Release Level at any time. Existing frozen Release Levels can be removed as long as no data resides in that level. A frozen level can become an active level again if no data resides in the current active Release Level. The DCS performs a "thaw", a step which removes the current Release Level (R2) and connects the previous level (R1) to E3. As shown in FIG. 3, the DCS supports the normal promotion path to E1 as well as "fast paths" into E2 and E3. The following minimum checks are performed at all entry points:

The owner attempting to send data to a Public Library must possess the update lock. If no lock exists, the sender obtains the lock by default. If another user has the lock and the sender is a surrogate, he can obtain the lock (the system immediately notifies the original owner). If the sender is not a surrogate, the action is halted, until ownership is properly transferred.

If the level to which the data is being promoted to has any entry criteria, it is checked to ensure the data passes the criteria.

Versions (Section 1.5)

Figure 4:
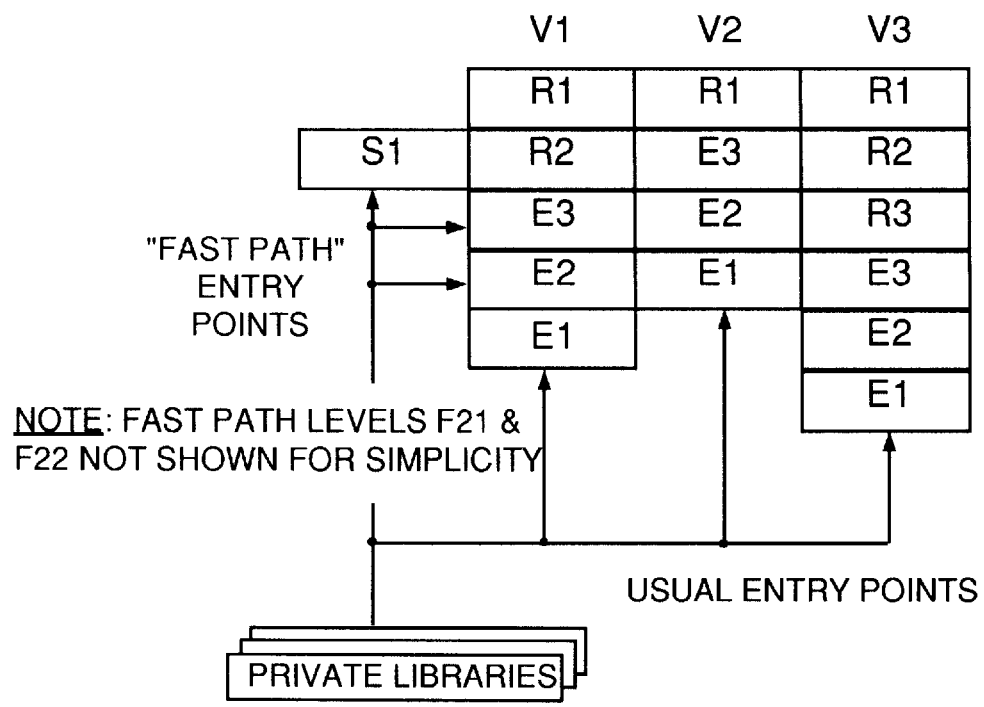
FIG. 4 illustrates our preferred Design Control System Level Structure with Versions.

Each public library consists of n versions which are defined by the Data Manager. The concept of versions exist to support parallel design efforts. All versions have the same Engineering (Working) Levels, but have different Release Levels depending on the frequency of tape-outs for that version. Data in seperate versions is permitted to traverse the levels at independent rates. For example, if a piece of design has 2 versions, 1 version may exist at E1 while the other version exists at E3. FIG. 4 is an extension of FIG. 3 in which library structure has been expanded to show 3 versions, V1, V2 and V3. In theory there's no limit to the number of versions just as there's no limit to the number of levels. Versions can be independent or dependent. Independent versions are isolated and must ultimately contain the entire set of design components. Dependent versions are based on previous versions (which the Data Manager specifies when creating a new version). By supporting the concept of dependent versions, only the incremental data necessary for a new design variation needs to be libraried in the new version. The Library Search mechanism will be able to construct a complete design Bill of Materials by picking up data from both versions.

Library Search (Section 1.6)

Our preferred embodiment of the DCS provides support for "Library Searches". This allows data, which is used in multiple iterations of the design, to exist in only one place. In other words, if a design component is changed, only that component needs to be re-libraried at a lower level. A full model can still be constructed by starting the search at the lowest level where the component is known to exist. The library search mechanism will pick up the latest pieces at the lowest level, then search through the next highest level to pick up more pieces, and so on until it reaches the highest level where all components reside. In addition to searching through levels, the mechanism also searches through versions. The user provides a starting library level, version and either a single type or a list of types. If the version is based on a previous version, and all the necessary design components can't be located in the starting version, the mechanism searches the previous version based on the following two rules:

1. If the search begins at an Engineering Level in one version, it resumes at the same Engineering Level (not the lowest level) in the previous version.
2. If the search begins at a Release Level (including a Sideways Level) in one version, it resumes at the latest Release Level in the previous version. This may be older or more recent in time than the released data in the current version.

Figure 5B:
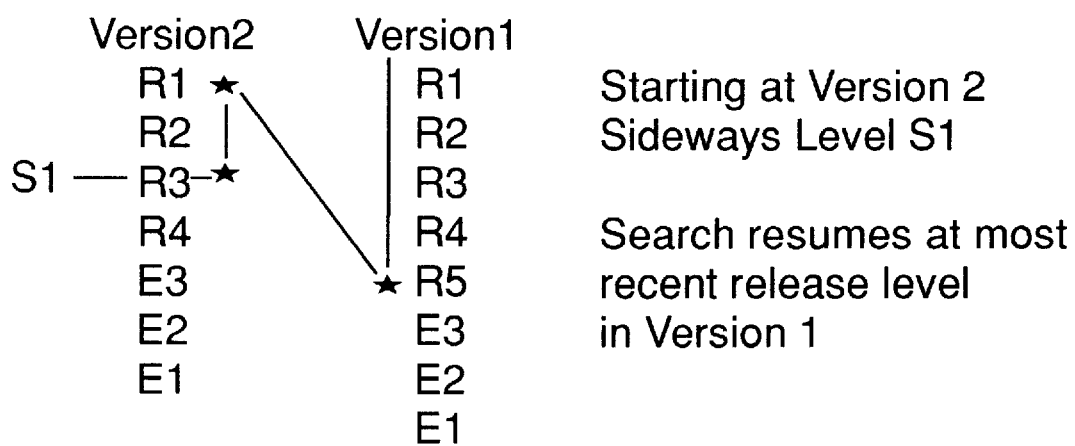
FIG. 5 (illustrated in parts FIG. 5a and 5b) illustrates our preferred Design Control System Library Search Examples.

FIG. 5 shows examples of the Library Search Mechanism. The library search utility is available to designers, Data Managers and third party tools. The interface is both command-line and menu driven to accommodate any environment. In addition to the required parameters of type, level and version, the user has the option of specifying the name of a data object. These additional options exist:

Noacc
This allows the utility to use a temporary cached copy of the search order information for performance reasons. Since this information may be obsolete, the absense of the option results in the actual Design Control Repository being accessed and the search performed from within it.

File
Write the results into an external file.

Various Sorts
They control the way the output is sorted and displayed.

Nosearch
Only list data found at the starting level.

First/All
Indicates whether to include all existences of a particular design component or only the first one in the search order.

Select
Presents a selection list of all candidates so the user can choose those of interest.

Noversion
Prevents the search from tracing back across version boundaries.

Levels
Displays the search order based on the existing level structure.

Versions
Displays the search order based on the existing version structure.

Locks (Section 1.7)

In order to properly control shared data, the DCS supports several types of locking mechanisms. Two of the locks exist to control groupings of files that may comprise a model build. These are known as move and overlay locks. The user can set one of these locks using a utility which allows him to control the scope of the lock based on certain fields. The user can enter specific data or a wildcard, indicating "ALL", for Name of Design Components
Type of Design Components
Level of Design Components
Version of Design Components
Library Name By specifying only a library name and four wildcards, the user is requesting that all data in the library be locked. By filling in all five entries, a specific design component will be locked. Various degree of locking exist in between those extremes.

If the information corresponds to a Bill of Materials (BOM) and the user wants to set the lock on the entire BOM, a BOM Flag will exist allowing him to specify this action. Regardless of how these fields are filled in, all locks will be set individually so they may be removed individually. A lock does not have to be removed the same way it was set. The user will also specify the type of lock, Move, Overlay, or Update (Ownership). The following definitions exist:

Move Locks mean the data can't be overlaid by the same data at lower levels, nor can it be promoted to a higher level. This provides a method for completely freezing an Engineering Level while a model build or large scale checking run is in progress.

Overlay Locks are a subset of move locks. The data can't be overlaid by the same data from lower levels, but it can be promoted to higher levels.

Update (Ownership) Locks are the means by which a designer takes ownership of a piece of data. Update locks are designed to prevent multiple designers from updating the same design component in an uncontrolled way, thus resulting in data corruption or lost information. There are two types of Update locks, permanent and temporary.

A permanent Update lock exists when the designer specifically requests to own a piece of data. This is done through a utility, and the DCS keeps track of this ownership. Other designers may copy and modify the data in their private libraries, but any attempt to promote that data into the public library will fail, unless the designer is a designated surrogate of the owner. The only way these locks are removed are by the owner resigning the lock or a surrogate assuming the ownership of the data, and the corresponding lock. A temporary Update lock exists to facilitate sharing a piece of data among multiple designers. The user can either request a temporary Update lock in advance (i.e. when he begins editing the data), or he can wait until he initiates the promote into the public library. The DCS will first check to see if anyone has a permanent Update lock, and if so, it will only allow the promotion to continue if the user is a designated surrogate. If nobody has a permanent Update lock, then the DCS will issue a temporary Update lock for the time the data remains "en route" to the final promote destination. Once it arrives safely, the temporary Update lock is removed and the data can be claimed for ownership by someone else. Surrogates are "alternate" owners of data. For example, a project may be arranged such that each piece of design is owned by a primary designer, but also has a backup owner (designer) to take over the design during vacations, emergencies, etc.. In this case, the owner can tell the DCS that the backup designer should be a surrogate, thus giving him the right to take ownership of a design component. The surrogate can either use the locking utility to specifically take ownership prior to making any updates, or he can wait until he initiates a promotion. The DCS will check to see if the design component is currently owned, and if so, check to see if the user is a defined surrogate. If both are true, it will give the user the chance to "take ownership" and allow the promote to continue. The original owner would be notified that his surrogate has taken ownership.

Figure 6:
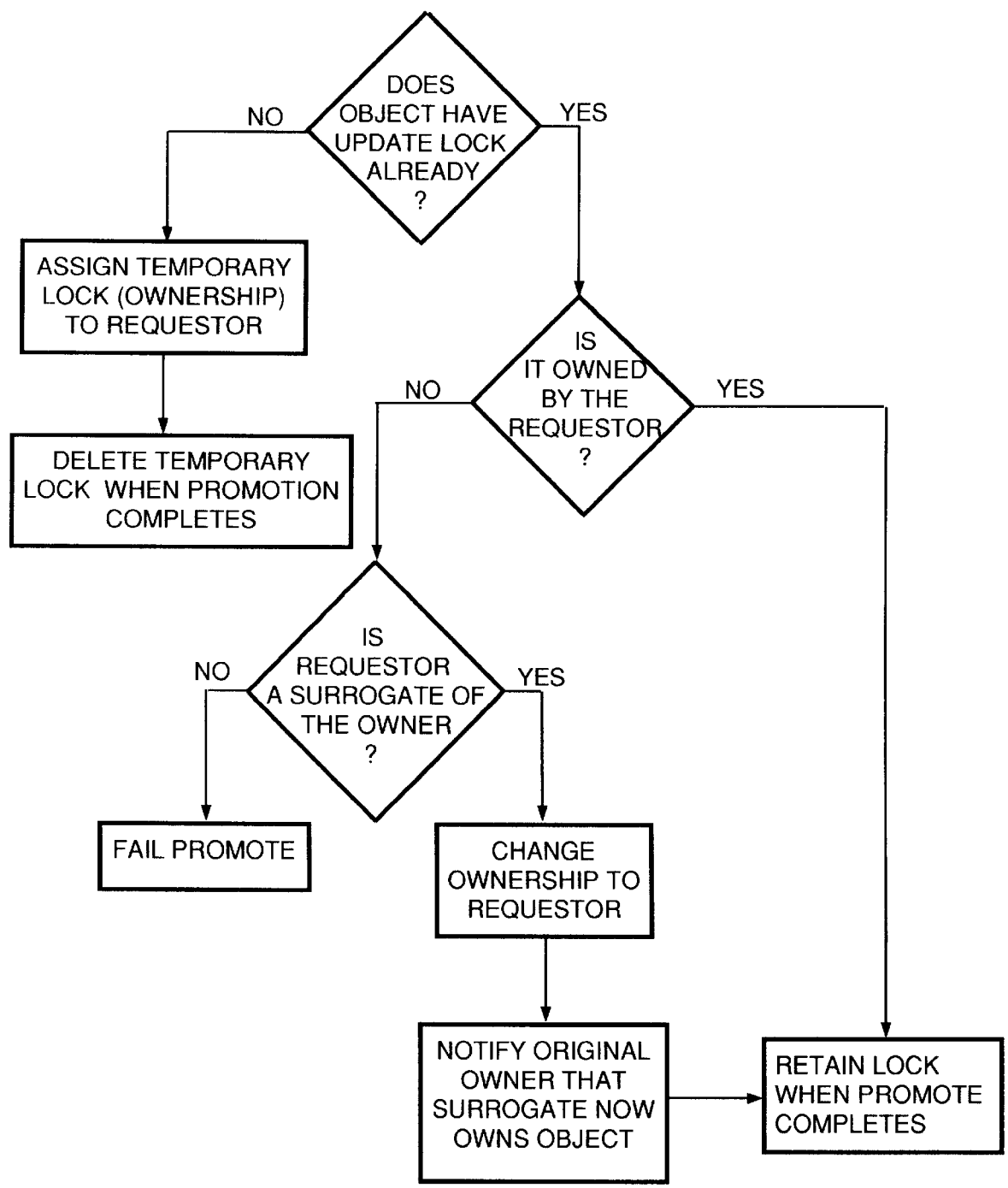
FIG. 6 illustrates our preferred Mechanism for Update Locks.

FIG. 6 illustrates the lock mechanisms for Update locks.

Bill of Materials Tracker (Section 1.8)

The DCS has a built-in Bill of Materials (BOM) Tracker to facilitate tracking many design components in large projects. The main objective of the BOM Tracker is to group certain design components to make it easier to promote them through the library and track their synchronization. This is crucial for data sets that contain some source and some derived files from that source. The following features exist in the BOM Tracker:

It supports automatic data grouping, based on the design component name, with the notion of required and optional data types. One example might be a grouping which consists of a graphical symbol denoting the I/O of a design component, the corresponding piece of entity VHDL and the architectural VHDL. Any changes made to the symbol should be reflected in the entity, so the entity would be required. A change may also be made to the architecture, but it's not always necessary, so the architectural VHDL would be optional. When a promote is initiated to a public library, or between levels of a public library, the DCS checks to see whether a data grouping is defined for the data type being promoted. If so, then all required data types are checked to ensure they exist. In addition, any optional data types are checked for existence and they are also picked up. The entire grouping is promoted to the target level. If a required data type does not exist, the promotion fails. Automatic data groups are programmed into the DCS by the Data Manager. Since they are BOMs, all rules of BOM tracking, invalidation and promotion exist for the members of the grouping.

BOMs are used for two main reasons. First they are used to group many smaller pieces of data into larger more manageable chunks to facilitate movement through the library and increase data integrity by reducing the risk of data getting out of sync. The other main reason is to track the components of a model (i.e. simulation, timing, noise analysis, etc.). The DCS offers a very flexible user interface for creating BOMs in order to satisfy the various scenarios. The user can manually create BOMs by selecting pieces of design interactively, filling in search criteria and initiating a library search, or importing a simple text list. In addition, an API exists for point tools to create a BOM listing and pass it into the DCS.

The power of the BOM Tracker is augmented with our automatic invalidation routine. Once a BOM is created, the DCS constantly monitors for a change to the BOM. If any member is overlaid or deleted, a notification is sent to the owner of the BOM indicating that the BOM is no longer valid. The owner can continue to work with his model, but he is aware that he's no longer using valid data. Even though a BOM is invalid, it can still be moved through the library. This accommodates the occasion where a piece of a model had a relatively insignificant change. If the model builder deems it unnecessary to re-build the model, this feature allows him to continue his work and even move the BOM through the library.

Status on BOMs is and should be accessible in two ways. The first is by automatic notification (e.g. e-mail) to the owner as soon as a BOM is invalidated. The second is by means of displaying the BOM either interactively or in report form. This listing shows the overall status of the BOM, and all members of the BOM with their individual status.

The BOM Tracker also supports the concept of a "support" object. This can be a design component, a piece of information, documentation, etc., that can be associated and promoted with a BOM but never causes BOM invalidation.

BOMs are hierarchical in nature and a BOM can be nested within a larger BOM. Whenever a piece of data is overlaid or deleted, the DCS looks to see if that piece belonged to a BOM. If so, it immediately checks to see if the BOM belongs to other BOMs. It recursively checks all BOMs it encounters until it's at the top of the hierarchy. All BOMs found will be invalidated (if they are currently valid) and the owners notified.

BOMs support move and overlay locks. The user can set a move or overlay lock on a BOM, and the DCS will set individual locks on all the members. If a member is a BOM, all of its members will receive individual locks. These locks can be removed by using the main lock utility and specifying the top-level BOM or filling in the desired fields to individually reset locks.

The DCS supports the concept of a BOM promote, which means the user can request that all the contents of the BOM be promoted simultaneously. This increases data integrity by helping to ensure a matching set of design data traverse through the library in sync.

BOMs can contain members who reside at different levels, different versions and even different libraries. The DCS will only promote those members which exist in the current library, and reside in an Engineering Level below the target level. If a member exists in a different version and is also below the target level, it will also be promoted.

There is separate authorizations for creating and promoting BOMs. This is set up by the Data Manager, so they can have complete flexibility in controlling who can create and move BOMs.

Promotion Criteria and Promotion Mechanism (Section 1.9)

Figure 7A:
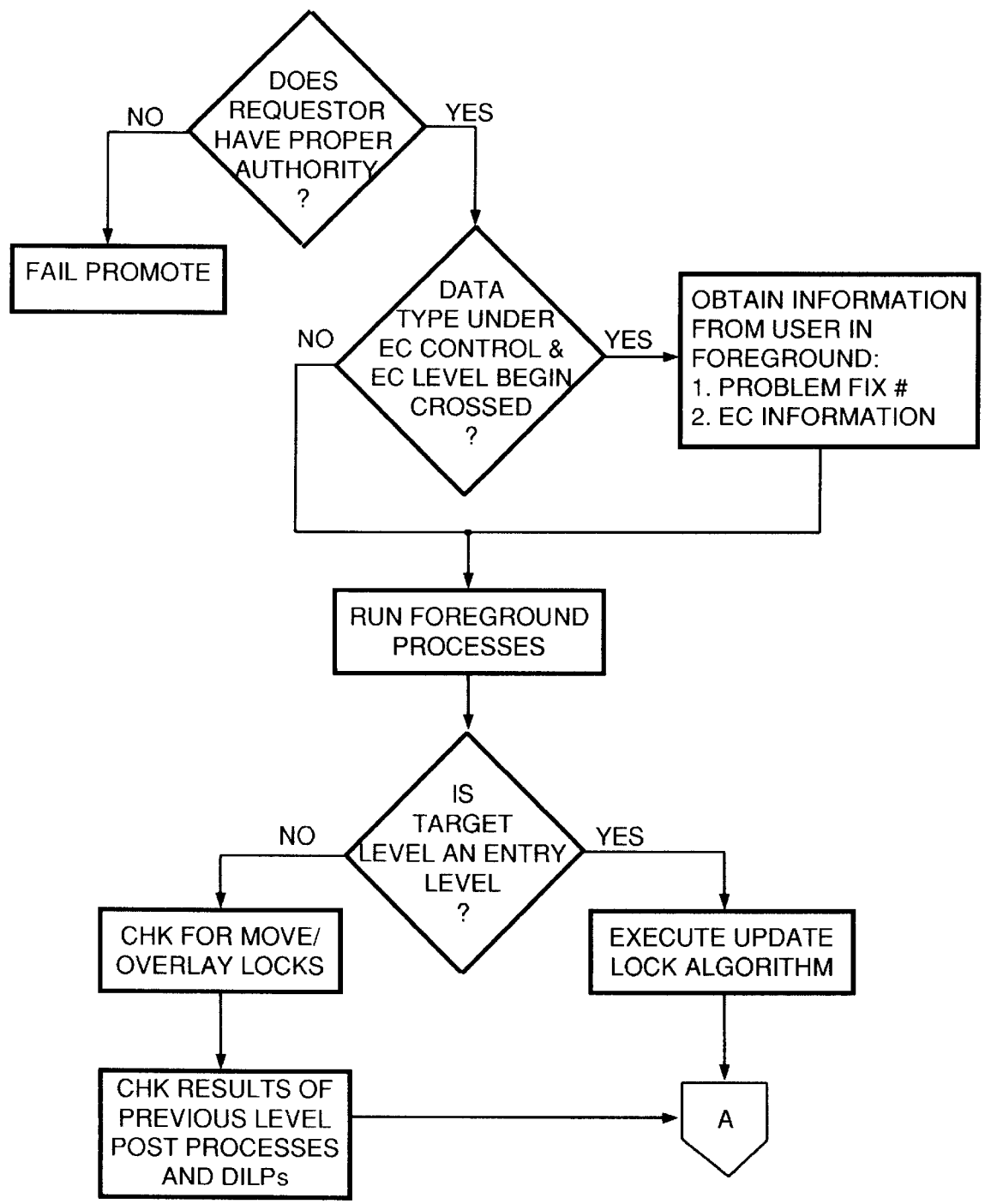
FIG. 7 (illustrated in parts FIG. 7a and 7b) illustrates our preferred Promotion Mechanism.
Figure 7B:
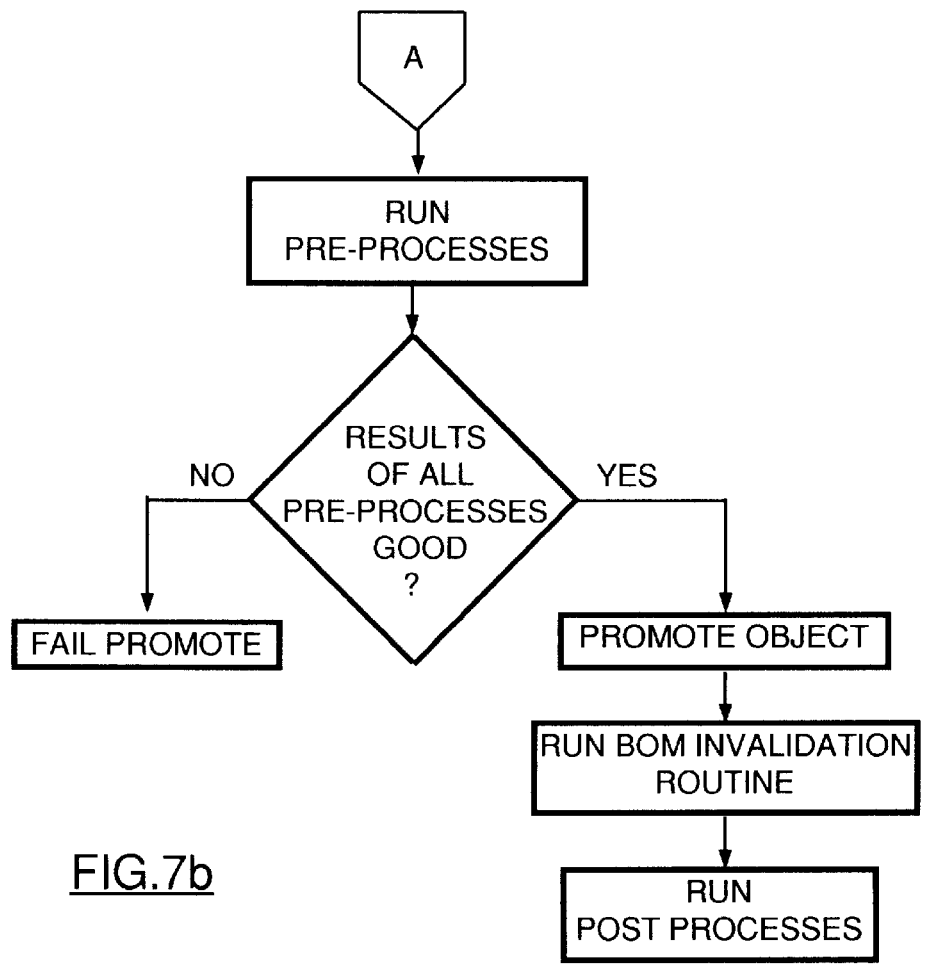

An important aspect of the DCS is that it provides a method for the design to traverse to different levels of goodness. As the design stabilizes at the higher levels, the number of pieces which need to be moved and tracked can be very large. The DCS uses the concept of promotion criteria and robust mechanisms to first determine what data can be promoted, then carry out the task in an expedient manner. The DCS supports two variations, "move" and "copy", promotes. In a "move" promote, data appears to the user like it only exists at the target level once the promote completes. The user is unable to access the copy that existed at the previous level. For example, if a design component is at level E2 and the user promotes it to E3, when the promote is finished and the user refreshes his image of the library, he sees the data at E3 only. In a "copy" promote, the data still appears at the previous level. The user can access it at either location. As new iterations of the same design component are promoted into a level, the old component is not truly overlaid. It is moved off to the side so it can be restored in an emergency. Promotion criteria usually exists in the form of library process or pseudo-process results, but in general it can be any condition that must be met by the object(s) being promoted. It is defined by the Data Manager and can exist for any design component at any level and version. Certain design components don't undergo any formal checking or evaluation in the design process, so they may never have any promotion criteria. Other pieces may undergo the majority of checking so they may have lots of criteria. The objective of the DCS is to track actual results for each design component and use the promotion criteria to determine if the design can attain the next level of goodness. When a design component is overlaid or deleted, all corresponding results are deleted too. The DCS supports an emergency override mechanism which allows the Data Manager to promote data which does not meet the criteria. Invoking an emergency override cause a log entry to be written indicating criteria has been bypassed. The Data Manager determines which results are necessary for which types of design at each Engineering and Release Level. These results may get recorded through "library controlled" or "external" processing. At the time the promote is initiated (whether it be against individual design components or BOMs), the mechanism illustrated by FIG. 7a and FIG. 7b is invoked to determine what pieces should be promoted. There are three types of promote transactions.

1. Promotion of an Individual Design Component
2. Promotion of a Group of loosely-coupled Design Components
3. Promotion of a Group of tightly-coupled Design Components (i.e. BOMs)

Basically, the same mechanism is employed in all three cases, but cases 2 and 3 require additional optimization for high performance. In case 1, each step in the mechanism is executed once and the promotion either succeeds or fails. Case 2 is initiated by a user selecting a group of objects to be promoted. They may or may not have any relation to each other. In this case some optimization is done, but each object is basically treated as if it were initiated as an individual promote. For example, the authority check only needs to be done once since the same user is requesting the promotion for all the objects. However, since each object can have unique locks, criteria, processes defined, etc., most of the steps need to be repeated for each object. Case 3 is the most complicated because the DCS offers a great deal of flexibility. The actual implementation is dependant on the platform of the DCS and the type of control mechanism in place (file-based, object oriented database, relational database, etc.). If the user community wants to eliminate flexibility in return for increased performance, the DCS can enforce rules such as no library processing allowed for members of a BOM. In this scenario, the entire algorithm would be executed on the BOM itself to ensure the proper authority is in place, it meets the promotion criteria, and any processing that's defined is executed. However, each member could bypass some of the checks thus saving a significant amount of time. If the user community opts for flexibility, some optimization can still be performed. For example, if a BOM contains 10 members and the mechanism calls for five checks on each member, there doesn't need to be 50 requests for information. Depending on the platform, it may be optimal to either make one large request for each member (ten total requests) and obtain all five pieces of information in the request. In other cases it may be optimal to initiate a request for a piece of information, but solicit it on behalf of all ten members (five total requests). Since these BOMs can be extremely large, the various kinds of optimizations and trade-offs between flexibility and performance determine the exact implementation. As a convenience feature the DCS supports a multiple promote feature which allows the user to request a promote through multiple levels. For each level the promotion mechanism is followed as stated above. For example, when initiating a promote, the user can specify to move data from E1 to E3 with a single invocation. However, the DCS will internally break it into two separate promotes with the full mechanism being run for the E1 to E2 promote, then again for the E2 to E3 promote.

Library Controlled Processing (Section 1.10)

The concept of Library Controlled processing allows tasks to be launched from a public library, against one or more design components, with the results being recorded against the components. This is an automated method to ensure that tasks, and checks deemed critical to the level of design are run and not overlooked. Since some of these tasks could be third party tools, the actual implementation can vary in sophistication. In its simplest form, Library Controlled Processing consists of the following constituent parts:

Foreground Processing

This is the conduit by which the user enters any information required to run the tool. Menus may be presented or the user may interact in some other way.

Pre-Processing

This refers to a library controlled process that is launched prior to the data being promoted to the target level. The process must finish and complete successfully, based on the promotion critera of that process, if the promote is to continue. For example, if a pre-process is defined at level E2, then when the promote to E2 initiates, the process is launched and the promote "suspends" until the process completes. Once it finishes, the result is compared against the criteria to ensure it's satisfactory. The promote then resumes.

Post-Processing

This refers to a library controlled process that is launched after the data arrives at the target level. The results of the process are used as promotion criteria to the next level.

Designer Initiated Library Processes (DILP)

This is very similar to a post process, but instead of the DCS launching the process, it's manually launched by the designer. DILPs usually exist to retry Post-Processes which failed. This eliminates the need for the user to re-promote the data just to initiate the processing. If a DILP is used to recover a failing Post-Process, and the DILP is successful, the good result will overwrite the bad result from the Post-Process. Just because DILPs are primarily used to recover failing Post-Processes, the DCS doesn't make this a restriction. The Data Manager can set up DILPs as stand-alone processes with no corresponding Post-Process. DILPs that exist to recover failed Post-Processes are optional in that they are not counted as required promotion criteria. Stand-alone DILPs can be optional or mandatory, with mandatory DILPs being required to run successfully in order for the data to promote to the next level. The DCS allows the Data Manager to designate which DILPs are mandatory and which are optional.

Level Independent Pseudo Processes

These are special types of process which are more like process results than actual processes. They exist as a means to record information outside of the scope of results from Library Controlled Processes or External Data Processing. For example, suppose a Library Process exists to run a layout checking program which checks for wiring and ground rule violations. Ultimately the program will return some pass/fail result, such as a return code, which the DCS uses as the process result. The tool may also return other useful information which the designer wants to save, such as the number of wires or cells in the design. Pseudo processes provide a repository for this kind of data. Like DILPs, these can be used as mandatory criteria for promotion, or they can be optional and used solely for information. They can even serve as status indicators for design components progressing through a lengthy process at a particular level. The concept of level independence means the checking program could be run at the E2 level, but the pseudo process results can be stored at E3. In short, the DCS allows a pseudo process to be defined at any level, and it can be set by a process running at the same level, any other level or completely outside of the library. The DCS provides an API for setting level independent pseudo processes. The API can be used by designers, Data Managers or third party tools, and employs a "process search" similar to a library search. This means the API allows the user to specify the name of the process, the data type, level and version. The DCS will use this as a starting level and search for all matching pseudo processes defined at or above this level by following the same library search mechanism as in FIG. 5. A flag also exists to disable the search and set the result for the process specified at that level and version.

Any number of any type of process can be defined by the Data Manager for a given data type at a particular level and version. In addition, processes can be chained together in independent or dependent sequences. In a dependent sequence, each process must complete successfully before the next process in the chain can initiate. For example, when compiling VHDL, the entity must always be compiled prior to the architecture. Thus two compiles could exist as a dependent sequence where the entity is compiled, the result checked, and if successful, the architecture is compiled. In an independent chain, the first process initiates, and when it completes, the next process runs regardless of the outcome of the first process. Processes can also execute using input data other than the object used to initiate the promotion. Using the VHDL compile example, the actual object being promoted could be a simulation BOM which contains that entity and architecture VHDL. The DCS provides a robust system for the Data Manager to define the processes which should be run, and the type of data they should run on. Certain library controlled processes require special resources such as large machines, extra memory capacity, etc.. Therefore, the DCS allows the Data Manager to specify a particular machine or pool of batch machines where the tasks can execute. Either the task is transferred to the specific machine or a request is queued up in the batch submission system. In the event that a task must run on a completely different platform, the DCS provides hooks to launch a library controlled process from one platform which initiates a task on a different platform (i.e. a mainframe). The results are returned back to the original Automated Library Machine and processed. This Cross-Platform capability allows the DCS to encompass a broad and sophisticated methodology utilizing tools on many platforms. Regardless of how the process is launched, the results must ultimately get recorded within the DCS. To accomplish this, the DCS provides an Application Program Interface (API) through which third party tools can communicate. When the task completes, the API is used to convey the results and the pedigree information back to the DCS. The DCS provides both an interactive means and a report generator to view process results. FIG. 7a and FIG. 7b illustrate the method by which promotions and library controlled processing interact.

External Data Processing (Section 1.11)

External Data Control is very similar to the Designer Initiated Library Process in that the user launches a task against some design component(s). However, unlike DILPs which require that the design components be under the control of a Public Library, this type of processing is done on data in Private Libraries and designer's work spaces. External processing is the mechanism whereby the DCS captures the results of the process along with pedigree information concerning the input data, output data and any necessary software support or execution code. This pedigree information is stored along with the design component for which the designer initiated the process. When the designer promotes that component at a later time, the DCS checks the pedigree information to ensure nothing has changed. It then checks to see if the external processing matches any of the defined library processes which are required for the promote. If so, and the external processing results meet the criteria, the library process results are set (as if the library process just ran automatically) and the promote proceeds. If no matching process can be found, the external results continue to be saved with the design component as the process may match that at a later level. The concept of External Data Processing exists to increase productivity by allowing the designer to save, and later apply, results obtained during the normal course of design rules checking to the "official" results the DCS uses to determine the level of goodness. Overall data integrity can easily be breached if a proper mechanism for calculating pedigree information is not implemented. For this reason it's imperative for the DCS to ensure that all the proper input, output and software data are included in the pedigree information. External Data Processing occurs in two phases. In the first phase, the designer runs some tool or process and if the results are acceptable, he runs a utility to designate the data for external processing. The role of the utility is to create the Pedigree information which contains a listing of the input and output data, the results, and some type of date identification code for each member of the Pedigree and the Pedigree itself. A simple identification code is a cyclic redundancy check. The utility can be independent of or incorporated into the actual third party tool. The second phase consists of librarying the data and the results. The designer invokes a special form of a promote which first does the following:

1. Check the data identification code (i.e. CRC) of all members in the Pedigree
2. Check the data identification code of the Pedigree itself.

These 2 steps are designed to ensure the same data used to generate the result is indeed being libraried. The identification code of the Pedigree ensures that the contents of the Pedigree weren't manually altered. From this point on, the normal promotion mechanism in FIG. 7a and FIG. 7b is followed with one exception. The boxes where Foreground, Pre and Post Processing occur are all bypassed. Rather than simply checking existing results to see if they meet criteria, the DCS makes a list of all Pre-processes for the target level and Post processes for the previous level. It then checks the Pedigree information for evidence that equivalent processes were run and achieved acceptable results. If any processes exist in the DCS for which no corresponding Pedigree results exist, or any Pedigree result does not meet the prescribed criteria, the promote fails.

Authorities (Section 1.12)

The DCS permits the Data Manager to establish a wide variety of authorities which gives him great flexibility in managing the library. Each type of authority can be defined very loosely (the user is authorized for all design components, at all levels, in all versions) to very tightly (the user is authorized on an individual design component basis). The utility for granting authorities works in one of two modes:

- In one mode the Data Manager is offered a screen in which he can fill in the design component name, type, level, version, user ids, and the type of authority. For any field, except for the user ids, he can default it to "ALL".
- In the other mode an authority profile can be called up and executed. An authority profile allows the Data Manager to pre-define the types of authorities for a given type of job. For example, profiles may exist for Designer, Technical Leader, Model Builder, etc.. This information is contained in an editable ASC file in which the Data Manager defines the kinds of authority to varying degrees of restriction. Once the profiles are created, the Data Manager uses this mode to either add/delete users to/from the profile and process the changes within the DCS.

Authorities exist for the following tasks

Setting Locks (Move, Overlay, Update, ALL)

Promoting design components and/or BOMs into levels (Engineering Levels, Release Level.

Creating BOMs

Initiating Library Processes

Setting Pseudo Process Results

Data Manager GUI User Interface (Section 1.13)

The DCS contains a robust Data Manager interface which is used to "program" the library. It's configured as a series of sub-menus arranged under higher level menus. Each sub-menu has fields to fill in and may employ Predefined Function (PF) keys for additional features. Graphical elements such as cyclic fields, radio buttons, scrollable windows, etc.. may be used to further enhance usability. Utilities exist to:

Define the library properties

The user is afforded a means to enter the path of the repository where the data resides, the userid of the Data Manager and any alternates, the userids of any Automated Library Machines, and whether the library is under Design Fix or Part Number and EC control. If the library is under any type of control, additional entries are made for the data types which should be tracked by Part Number, the data types which should be tracked by Design Fix number, the EC control level, and a field for a generic problem fix number. For any ALMs, the DCS will automatically add the proper authorities (including operating system authorities) to permit the ALM to store data and record results.

Define the structure (levels, versions and their interconnections).

This is the means by which the Data Manager adds and deletes levels and versions. It also enables him to defined the interconnections of the levels, and the dependance of versions on other versions. A minimum interface consists of one screen for level structure and one for version structure. The level structure screen displays the current structure.

Define the types of data which will be under library control.

For all data types known to the DCS, this enables the Data Manager to select those managed in this particular library. The screen displays all known data types in the system with a flag indicating whether it's being tracked by this library. Each data type also has a field for an alternate storage location. This solves the problem caused by certain data types that can be very large. Therefore, problems may arise in trying to store these data types along with the all the other types in a particular level. By specifying an alternate storage location, these large data types can be further segregated.

Manage Library Controlled Processes

For each level, the Data Manager can add, modify or delete processes. For each process information is required about the type of machine it can run on, any necessary arguments, the result criteria, disposition instructions for the output, whether it's dependent on another process, and whether it should be deferred. The DCS provides Process Specific Boilerplates which can be used to manage process configurations for an entire project. Necessary and required information for each process can be programmed into the DCS, so when a Data Manager attempts to define that process to his library, some of the fields appear with default data already filled in. He can override any of the data.

The information for each process can be entered/edited individually on a menu containing all the above fields or a utility exists to load "process groups" which are pre-defined library controlled processes. The Data Manager simply selects a process group and attaches it to the appropriate data type, level and version. The process groups are ASC based files which contain the necessary process information in a prescribed format. They can be created using any ASC editor.

Set up authorities

See the previous Section 1.12 for details.

Define automatic data groupings (Subset of BOM Tracking)

This enables the Data Manager to define a data group which consists of a master object and member objects. Each member object can be required or optional. For each master object entered, the user must enter a list of member objects with their required/optional flag. In addition, an Erase-To-Level flag exists which determines the outcome of the following scenario: a data group, comprised of optional members, exists at a level. The same data group, without some of the optional members, exists at the next lowest level. Upon promotion of the lower level data group, the DCS will either erase the members of the upper level data group or leave them, depending on the Erase-To-Level flag. By leaving them in place, it allows members of newer data groups to join with members of older data groups.

Design Fix Tracking (Section 1.14)

One of the most powerful aspects of our DCS is provided by the process used to track fixes to design problems. This is accomplished by tightly or loosely coupling the DCS to a problem management database. Typically, a problem is found and entered in the problem tracking database. Once the design components are identified which require updating, the DCS is used to attach the problem number to those design components. Ideally this should be done prior to the design components entering the library, but it can be done as part of the promote. It's often redundant to track all design components with problem numbers, so the DCS can be programmed to only enforce Design Fix Tracking on certain data types. Whenever a promote is initiated, the DCS checks to see if the library is in Design Fix Tracking mode (which means some data types require Fix problem numbers to enter the library), and looks to see if any of the data types included in the promotion are being tracked. For those that are, a screen displays all known problem fix numbers for that design component. The user can select an existing one or add a new one to the list. At this time, the DCS will check to see if the EC control level is being crossed (or bypassed via a fast path promote). If so, it will attempt to associate the problem fix number to an EC identifier. If it can't automatically determine this association, the user is prompted to enter the EC identifier for the selected problem fix number.

If the designer chooses to do the association in advance, a utility exists which allows him to enter a problem fix number or choose a default number. The status is immediately reflected as "working". Once the promotion is initiated the status will switch to "libraried". The DCS offers utilities to view or print reports showing which design components exist for a problem or which problems are fixed by a design component. The report generator allows the user to enter the problem number and see which design components are associated to it. Or the design component can be specified to see which problems it fixes. Finally, and EC identifier can be specified and all problem numbers and design components associated with the EC can be displayed.

Part Number/EC Control(Section 1.15)

In addition to tracking design fixes, the DCS can track the design by part number and/or EC. For projects which assign part numbers to various design components, the DCS provides utilities to generate and associate these part numbers to the design components. In addition, the DCS supports Engineering Changes where successive tape-outs are assigned an EC identifier. All design components participating in an EC are associated with the EC identifier. Since part numbers are assigned to specific design components, the DCS uses the links between components design fixes and EC's to track the association of part numbers to ECs. The DCS uses the concept of a PN/EC control level to permit the Data Manager to determine at which level PNs and Design Problem numbers get associated with EC numbers. As design components cross this level, the DCS checks to see whether a problem number or PN exists for the component. If so, and the system is able to determine which EC that number is associated with, it automatically connects the component to the EC. Otherwise, if no EC information can be found, the user is asked to enter it. The rules for Design Fix and EC control are as follows:

One EC can contain multiple Design Fixes;

Any single Design Fix # (number) can only be associated with a single EC;

One design component can have many Design Fix numbers, but they must all belong to the same EC; and Variations of a design component can exist in multiple ECs, but each must have a unique set of Design Fixes.

Figure 8A:
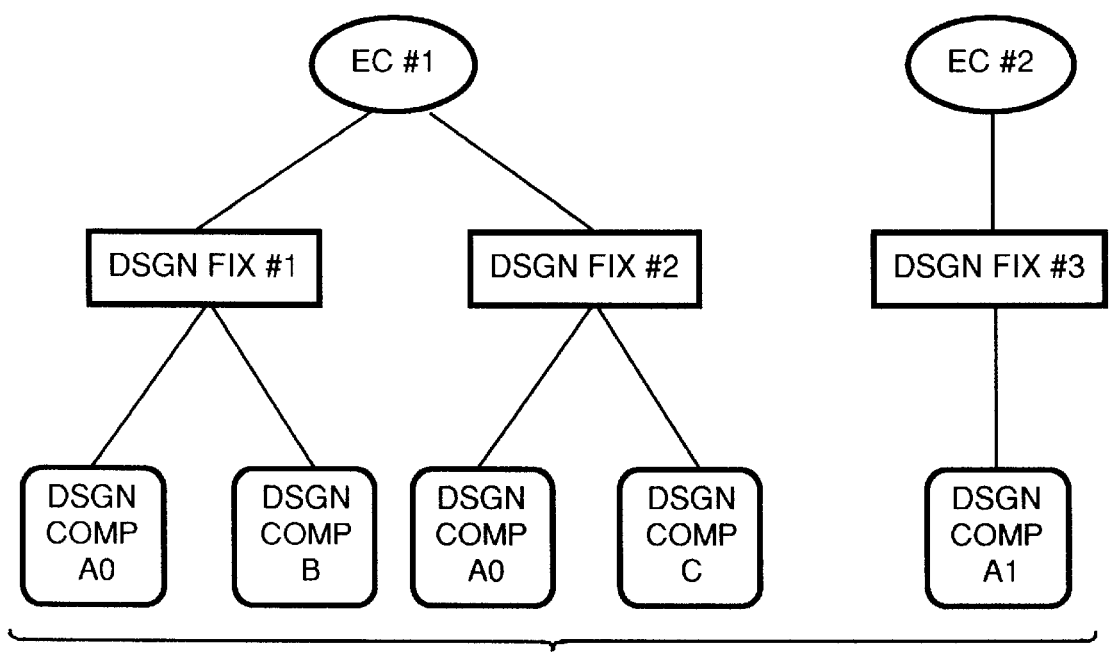
FIG. 8 (illustrated in parts FIG. 8a and 8b) illustrates our preferred Design Fix Management and EC Control.
Figure 8B:
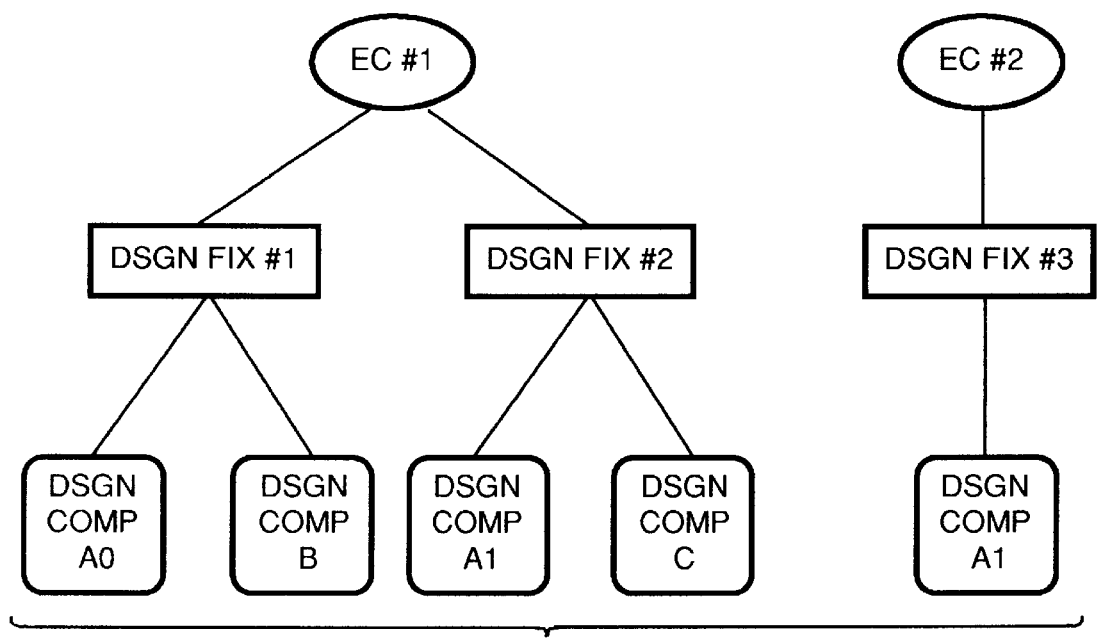

FIG. 8a illustrates a legal example. It shows two EC's where the first contains two design fixes and the second contains a single design fix. There are three design components, of which the one denoted A0 is associated with Design Fix #1 and Design Fix #2. Design component A1 is a different variation of design component A0 The example shows how the two versions of design component A must belong to separate ECs. In FIG. 8b the rules have been violated since design component A1 is associated with Design Fix #2 which belongs to EC #1. The DCS detects this condition and alerts the user to either move Design Fix #2 over to EC #2, or detach design component A1 from Design Fix #2. In addition to tracking all the part number and EC information the DCS is capable of generating a variety of reports including one listing all the part numbers for a given EC. This report can be sent to manufacturing in advance so the foundry can manage their resources.

RAS and Security (Section 1.16)

The DCS is designed in such a manner that provides maximum security for the control data. None of this data is present in simple ASC files residing in a writable repository. All updates to this information must be made through the proper utilities by authorized people. Libraried data only exists in repositories where the Data Managers or owners of the data have write permission. This prevents other users from modifying another desinger's data outside of the DCS. Nearly continuous availability is achieved by implementing the DCS in the following manner:

If the primary DCS server fails, the system can be brought up on another server with minimal human intervention. The physical locations of all libraries are determined by the Data Manager which permits the data to be strategically located throughout the network to improve availability.

Multiple paths exist to request information from the Control Repository.

They provide alternate routes in the event of network or router problems. Archiving and backing up data is accomplished with the following features:

The Design Control Repository can be archived onto tape or backed up to another repository by the Data Manager as often as deemed necessary. In the event of corruption, this back up copy can be restored into the primary repository.

All libraries can be archived to tape or backed up to alternate repositories defined by the Data Manager as often as deemed appropriate.

The DCS provides a utility which checks to see it a backed-up or archived copy of the Design Control Repository is in sync with a backed up or archived copy of a library. During the archiving procedure, the system assigns unique identification codes (i.e. CRC codes) to each data object. These codes are used during the recovery to ensure the data was not tampered with while dormant on the back-up repository.

The system provides a method for restoring individual data objects from backed-up or archived repositories in the event the data object is deleted from the active library.

GUI User Interface (Section 1.17)

The User Interface consists of all the menus, dialog boxes, and screens by which the designers interact with the DCS. They all have the following characteristics in common:

They are user friendly with convenient on-line help.

They share a common look and feel to make it easy for the user to find common features.

When something fails or the user makes an entry error, the system clearly indicates the error with an English description of the problem, and suggestions on how to fix it.

A command line interface exists to perform any operation that can be done through the graphical user interface.

Various designer utilities exist to:

Initiate promote requests

The minimum interface requires the user to enter the name of a design component or select from a list, enter the level from which to begin the promote, the target level where the promote should terminate, a flag indicating whether it's a BOM promote, and the version.

Send results from External Data Processes to a library

This utility allows the user to enter the name of a Pedigree and the target level and version to which the Pedigree information should go. Set up and manage a private library.

The utility has fields where the user can specify the name of the library (if one is to be created), the library path where the repository will reside, the userids of the owners, and either the userids or authorization groups of those who can access it. These properties can be called up for modification at any time. Whenever the owner or access fields are altered, the DCS automatically updates the authority records within the Design Control Repository as well as the operating system (i.e. AFS) permissions of the directory where the library resides.

Create and monitor a Bill of Materials

The utility offers two modes of operation. In the first, the user identifies the Bill of Materials, and enters the names of all design components to be added as members. This same utility will display any existing information for a BOM, so members can be modified or deleted. For each member, the user must indicate whether it's an input, output or support member. For an existing BOM, a function exists to revalidate all members, but this can only be done by the BOM owner. The second mode builds the BOM by reading all the information from an ASC text file written in a prescribed format. This mode can be used by designers, Data Managers, and third party tools. Regardless of how the BOM is created, a newly created BOM will result in the valid flags being set for all members. The user who creates the BOM using the first mode is automatically the owner, whereas the input file used for the second mode contains the owner information.

View process and pseudo process results

The user specifies the design component, data type, level and version. He can specify the exact process or obtain a list of all processes. For each process, the display shows the result (if it exists), the date and time it was set, how it was set (library controlled process, external process, or manually) and the criteria. These results can only be changed by the Data Manager.

Associate design problem numbers to design components

The designer uses this to pre-associate problem fix numbers to design components before they are promoted into the library. This way technical leaders and other designers can determine if a particular problem is being worked on. The interface requires the user to identify the component by name and type. Since it's not in the public library yet, it has no level or version. The user must also supply the problem fix number. The DCS automatically assigns the "working" status to it. Later, when the designer wants to promote the component, the problem fix number will appear on the selection list, and after the promote completes, the status will change to "libraried". The DCS allows the Data Manager to define a generic problem number which designers may select to associate with miscellaneous design changes that have no corresponding design problem.

WWW/Internet Access (Section 1.18)

The DCS provides a mechanism which permits access to all process and psuedo process results through the World Wide Web. Key quality control indicators can be exported out of the DCS into an accessible format by users on the WWW. Usually these results would exist in a secure repository which could only be accessed by WWW users who are working on the project. In addition to accessing information, the ALMs can receive special e-mail requests from users to perform these tasks:

Generate various status reports on topics such as PN-EC and Design Fix Tracking, Process & Pseudo Process Results, or BOM information. The DCS would generate the report on the fly and return it to the user's Internet or e-mail address.

If the user has the proper authority, he can submit e-mail requests to add pseudo-process information into the DCS. The contents of the mail would contain a specifically formatted command which the DCS can interpret to set the appropriate results. This could be used by people remotely connected to a project (such as the chip foundry) to send status information directly to the DCS.

The DCS permits an authorized user to send commands through the Internet Common Gateway Interface (CGI) to query information from the DCS or invoke Designer Initiated Library Processes (DILPs).

Actors & Objects (Section 1.19)

Figure 9:
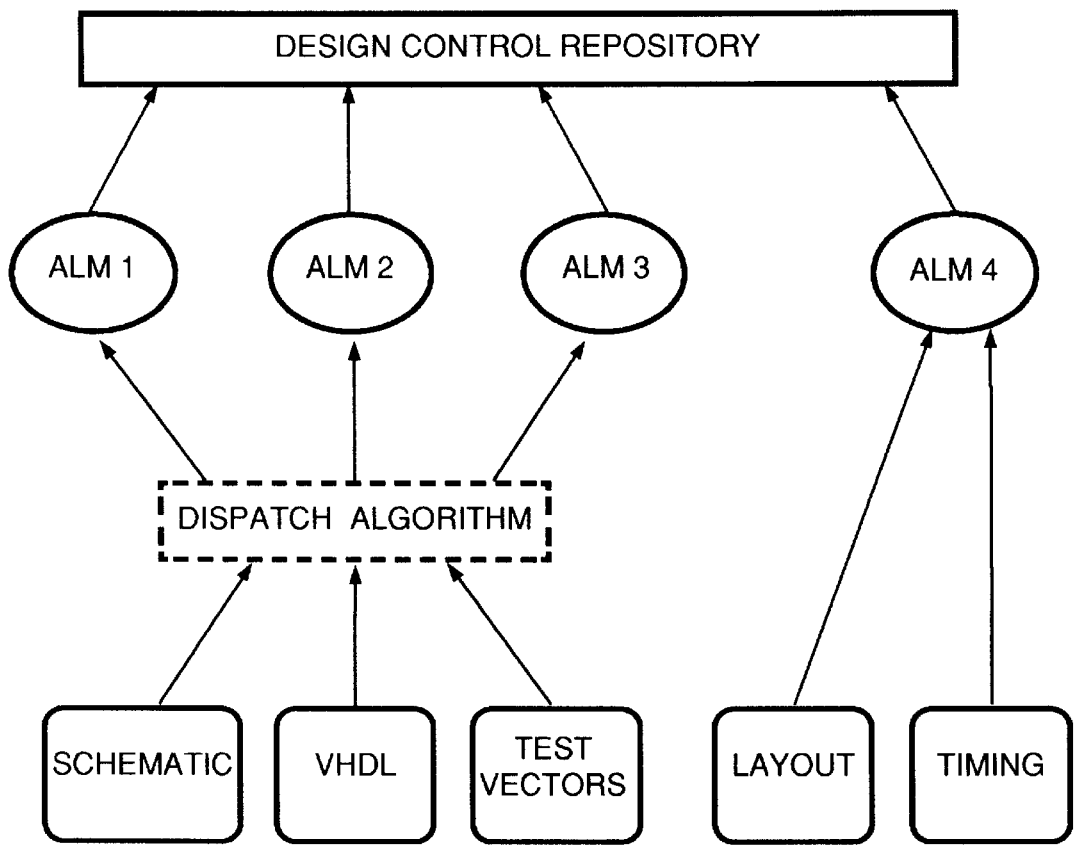
FIG. 9 illustrates our preferred DCS Using an Actor/Object Environment.

In the event of a project where a single large design team or multiple smaller ones, require their data to reside in a single repository, the potential exists for a performance bottleneck in the Automated Library Machine. The DCS offers a feature called Actors & Objects to combat this. Actors & Objects allow the Data Manager to define an alternate structure in which designers tasks are dispatched to a pool of Automated Library Machines (Actors). No design data is stored on any of them; they merely execute the tasks then store the results and data into the Design Control Repository (Object). The Data Manager can control the types of jobs each Actor is allowed to perform by creating Actor Lists. These lists contain information which the DCS uses to determine which ALM to route a particular job to. FIG. 9 shows an Actor/Object environment with four Actors. Jobs involving the data type of layout and timing are segregated to ALM4. All remaining work is sent to ALMs 1 through 3. The DCS determines which to use based on a mechanism which tries to find either a free ALM or choose one that may be able to spawn a parallel process (assuming the operating system supports it).

Importing and Tracking Data (Section 1.20)

Internally the DCS tracks all data by component name, data type, level, version, library and most importantly a file reference (fileref) number. These six attributes give every piece of data in the system a unique identity. In a private library, all data is tagged with a DCS identifier as part of the filename, but the identifier may or may not be unique. This is because private libraries don't have a concept of levels, versions or file references. They are merely working areas for the designer, and only require the data to be identified by name and type. The system permits the designers to have multiple copies of a design component by using iteration numbers to distinguish between recent and older data. However, even though the concepts don't apply, the DCS still assembles an identifier and tags the data. There are two methods by which a piece of data can appear into a private library.

1. The designer creates the data from within the private library using some tool (Schematic editor, text editor, circuit simulator).
2. The data is created by some tool completely outside of the private library, but the designer wishes to import it into the library.

In either case, the tool (or user) chooses the filename. By default, this is the design component name. In the first case, the designer will be asked to specify the data type either prior to, or during invocation of the tool. In the second case, the user will be prompted for the data type during the import. In both cases of a data type entry requirement the DCS will automatically default the version, level and file reference number in order to assemble a uniform identifier code. This code will be appended to the design component name and will become the new name of the object. Upon promotion from a private library into a public library, the DCS will automatically assign a real file reference number to the object. Based on the destination version, and level, the DCS will assemble a new identifier and rename the object accordingly. The file reference number remains the same for the life of the object. As the object traverses through the levels of the library, the level is the only piece of the identifier that changes. In addition, the DCS maintains the same identifier information internally. This is considered the official tracking information and is always updated first during a promotion or installation of a new object into a public library. The object renaming is done afterwards. Appending the identifier to the object name serves two purposes:

It increases data security by providing a way for the DCS to check data integrity during promotions. The information contained internally must match the external identifier at the start of a promote. A mismatch signifies possible tampering of the data outside of the DCS, and the Data Manager is alerted to the mismatch.

It provides an alternate way for a user or another tool (such as the library search mechanism) to ascertain the version, level, and data type of an object simply by looking at it. This contributes to the availability by providing a means to locate and access data even if the Design Control Repository is unavailable (i.e. server down).

Figure 10:
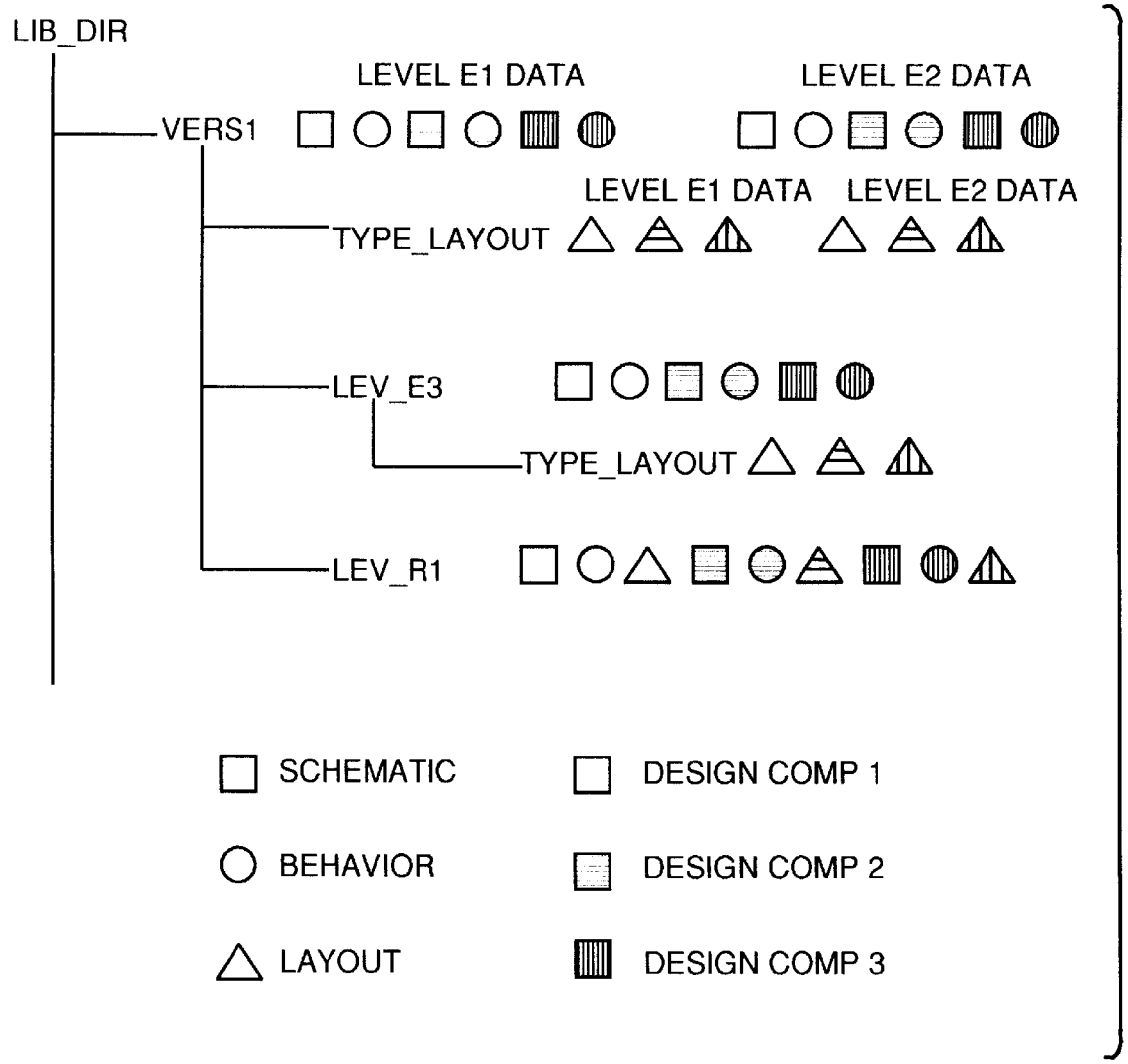
FIG. 10 illustrates our preferred Example of Location Independent Data Tracking.

One major advantage to this tracking scheme is it's independent of the physical location of the data. The DCS permits the Data Manager to establish as many repositories as he needs down to any level of granularity. For example, all data for a library could reside in one physical directory, the data could be segregated by version only, or there could be separate directories for each type of data. This level of flexibility allows the Data Manager to optimize the library to a given environment. For example, he can define his repositories in such a way that the data which moves most often is located on a single volume on his fastest server. Data which never moves (i.e. Release Level data) can be located on slow servers or spread out over multiple servers. As the Data Manager defines his library structure, he can specify the locations for every level of each version. In addition, if he has specific data types that he wishes to further segregate, he can specify a location for them. Finally, the DCS supports a feature called Automatic Component Grouping in which all data types for a given component name will automatically be located in a subdirectory off of the level directory. FIG. 10 illustrates a portion of a library directory structure with different levels of storage granularity. LIB_DIR is the primary directory for all data in the library. Under it, data is segregated by version where version 1 data resides in the subdirectory VERS1. At this point the diagram illustrates three examples of further segregation. In the VERS1 directory are the schematics and behaviors which comprise level E1 and E2 for all 3 design components. Although they are physically mixed together, their unique identifiers allow the DCS and users to tell them apart. The diagram shows the circuit layouts to be further segregated by data type. So they reside in subdirectory TYPE_LAYOUT Once data reaches level E3, it is segregated by level and type. LEV_E3 contains all the schematics and behaviors for the E3 level, but the layouts reside in the TYPE_LAYOUT directory under LEV_E3 The final example shows data segregated only by level with no regard to type. This is seen in the release level repository LEV_R1 By offering this kind of flexibility, the DCS permits the Data Manager to group the data in the most advantageous way. In addition, the Data Manager could invoke Automatic Component Grouping, which would result in further subdirectories under VERS1, LEV_E3 dnd LEV_R1 to segregate the pieces by component name.

Note: This is unnecessary in the TYPE_LAYOUT directories since the only difference between the objects is the component name. In order to boost performance, every time a structural change is made to a library which involves repositories, the DCS automatically generates a master cross reference between library/level/version/type and physical location. This table is used by mechanisms such as the library search engine to locate data without requiring extensive querying of the Design Control Repository. It also enables library searches to occur in the event the Design Control Repository is unavailable.

Preferred Embodiment of our Design Control Repository and System

Methods (2.0)

The present invention is designed to work specifically with a Data Management or Design Control system. It employs various mechanisms for launching processes while data is stable or moving through the system. Data integrity is maintained before, during and after process execution even if processes are executed in parallel, on different software machines, in different environments or in a deferred manner.

Incorporated into this invention are two independent approaches to executing and tracking processes in a quality controlled environment. The first approach, denoted Automated Library Processing, allows any application, program or tool to be launched using input data from a Data Management system. These tools interface with the present invention through a robust Application Program Interface, which enables the process to record results and store output data into any Data Control Repository. This repository may be constructed out of flat files or an apparatus such as an object oriented or relational database.

These process results can be used as criteria to control movement of data through the system, or they can simply be status indicators for informational purposes. The results can even be used to control data movement at levels other than that at which the process is invoked.

Software processes can be invoked and executed in a user's environment, or the user may send requests to automated service machines which actually perform the processing. The Data Manager, who is responsible for defining the processes, has a choice of arranging the service machines in three different configurations to maximize process efficiency.

Processes can be defined to be launched automatically upon movement of data through the Data Management system, or they can be initiated by the user while the data remains stable. A sophisticated interlocking mechanism ensures processes are executed in the proper order regardless of the arrangement of the service machines. In addition, data integrity is maintained throughout the operation, and results are automatically invalidated or eradicated upon updates or removal of the source data. The present invention interacts with the Lock Manager to ensure source data is properly locked while processing is underway.

Different processes may be defined for different types of data or for the same type of data residing at different levels and/or versions of a given Data Management library. Each process has it's own set of criteria, which can be any boolean type of expression that evaluates to true/false state. The criteria can be defined as loosely or as tightly as desired by the Data Manager to achieve an infinitely adjustable quality level for the system. Each process can have a unique set of run-time parameters defined by the Data Manager, but able to be overridden by a user at the time of initiation. Lastly, each process can possess unique run-time environment requirements, such as required disk storage space or memory.

Included in the present invention a Data Manager utility for defining and editing the processes which can be arranged to run prior to movement among levels, after movement among levels, with no movement of data. In addition each process can be executed upon initiation or deferred to a programmable time. The processes can be defined to run on multiple operating system platforms since our invention incorporates a cross platform communication device for transferring data and work requests to software machines running on different platforms. The utility also interacts with the Authority Manager to provide a means for authorizing users to run any or all of the defined processes and setting results. This authority can be very broad thus allowing a user to initiate any process in the system, or it can be limited to processes for a specific level, version and data type within a particular library.

The second approach employed by the current invention is denoted External Data Control. This apparatus is means of providing a secure controlled environment to transfer results and data into a Data Management system from a process executed outside of a Data Management system. Although the Application Program Interface mentioned in the first apparatus can encapsulate almost any third party tool, there are times when it's advantageous to permit results generated outside of a Data Management environment to be used as quality control records. External Data Control allows this by providing a mechanism to safely package and transport all data and results involved in a process into a Data Management system.

The present invention permits these external results to replace or override any existing Library Process. In certain processes, especially hardware design environments, designs must be iteratively exercised numerous times before a satisfactory result can be achieved. To improve design control, it's often necessary to repeat these tasks under a controlled environment so the result can be officially recorded. External Data Control improves efficiency by allowing the result generated outside of the environment to become the "official" result, thus eliminating the need to repeat the task.

Since significant time may pass from the completion of the task and the desired transfer of results into the Data Management system, a mechanism exists to detect changes made to the data or any critical resources required to execute the process. Thus data integrity is maintained by ensuring that the result corresponding to the data and resources used to achieve the result are still valid.

In addition to simply storing results, it enables results to be compared against predefined criteria prior to entry into the Data Management system. These results can be used as promotion criteria to control data movement through the system, or simply as informational status indicators.

External Data Control provides interfaces to permit the creation of an Aggregate Bill of Materials, ensure proper ownership of data entering the Data Management system, and allow problem, part number and release tracking information to be associated with the data.

Automated Library Processing

Our invention incorporates a concept called Automated Library Processing which enables an Automated Library Machine to launch or execute tasks and record results against files residing in the Data Management System. These tasks can be specifically written to run as Library Processes or they can be third party tools which are encapsulated into a Library Process via the Application Program Interface provided with the Process Manager. Our invention permits Library Processes to reference or modify existing data in the DMS, or create new data and deposit it back into the DMS.

In our preferred embodiment, Library Processes run on Automated Library Machines because this gives the Data Manager incredible flexibility in balancing workloads and taking advantage of the various configurations available. The following configurations are supported by the Automated Library Processing algorithm:

Conventional System

In this arrangement a single ALM performs all Library Processing as well as file manipulation (promotions, deletes, installing new files, etc.). Suppose a file needs to be moved from Level A to Level B and once at Level B a process is required to run against the file. In a conventional system a single ALM would accept the promote request, promote the file from Level A to Level B, and execute the Library Process. If the process results in new data being generated, this ALM would also install the new file into the DMS.

Remote Execution Machines

This arrangement is a Conventional System with additional ALMs who only perform Library Processing. Our invention supports an infinite number of remote execution ALMs. The Data Manager can direct any process to any ALM, including the main ALM, which performs the file manipulation. In this environment all requests begin at the main ALM, and if necessary, Library Processes are distributed to the remote ALMs. Upon completion of the tasks, all output data is returned back to the main ALM for deposit into the DMS.

Actor/Object

This environment is the most advanced as it permits an unlimited number of ALMs arranged in any combination of file manipulation and Library Processing machines. The arrangement can consist of a pool of ALMs which handle file manipulation and any Library Processing required as part of the manipulation. In other words, each machine is a full service machine who performs all the steps necessary to manage the data. However, a more complex arrangement would consist of a pool of full service ALMs coupled with a pool of remote execution machines. This allows the Data Manager the flexibility to reserve certain machines for dedicated processing.

Although our invention accompanies all of the Automated Library Machine configurations stated above, it can also support an environment with no Automated Library Machines. Since the algorithm only requires a formatted request file and libraried data as input, one skilled in the art could envision a very simple client/server environment where a Library Process is manually initiated on a client machine, and all communication with the DMS is done directly through the client machine. Of course, some of the more robust features such as automatic recirculation of requests would be replaced with manual intervention.

At the user level there are two methods for initiating a Library Process. One way is automatic processing triggered by file promotion. Our invention permits two types of processing to support Library Initiated Processing:

Foreground Processing refers to any processing run on the user's client machine. This processing is interactive and may require the user to enter information required by the Library Process. For example, a Library Process which performs physical design checks on a circuit may use a Foreground Process to present a menu of available checks for the user to select from. The Foreground Processes are automatically launched as part of the File Promotion algorithm.

Background Processing (Pre and Post) refers to the processing actually executed on the ALM. Pre proces are executed prior to the promotion and are used as promotion criteria for the target level. In other words, if the Data Manager defines the physical design checks process as a Pre at Level B, then the file must pass those checks according to defined criteria in order for the promotion to complete successfully. Post processes are executed after the promotion of the file to the target level. These processes are used as criteria for promotion to the next level. Referring to the physical design checks example again, redefining it as a Post would permit the file to be promoted to Level B regardless of whether the checks passed or failed the criteria. However, the file would not be allowed to promote to the level above B if the checks fail the criteria.

The second method is known as Designer Initiated Library Processing or DILP. Unlike the first method which requires file movement to trigger it, this method operates on stationery files residing in the DMS. The user invokes a utility which allows the user to select the desired processes. If the selected processes require foreground processing, it is immediately invoked. In our preferred embodiment a request file is generated and sent to an ALM for background processing. As stated above, an ALM is not required as one skilled in the art could envision the foreground step presenting the request to the background step within the user's client machine.

In order to facilitate encapsulation of third party tools into Library Processes our invention provides a Library Process Application Interface. This API permits the author of a Library Process to communicate with the Process Manager to acquire the input files to process and deposit the process result and any output data into the Data Management System.

The API addresses input arguments in the form of a standard linkage which acts as a port to enable the Library Process. There are 10 standard parameters plus any optional parameters which the Process Manager makes available to every Library Process. Each parameter may consist of one or more tokens to convey the necessary information depending on the environment. They are described in the following table:

Table 1 is a list of the 10 standard input parameters of an LP.

TABLE 1

Standard LP Parameters

| Parm Number | Parm Name | Parm Description/Meaning |
|---|---|---|
| 1 | DIL | Type of Data Information Library.<br>Parm values are:<br>• "DIL-R" - with Relational Database |
| 2 | Temp Space | Location of the temp-disk on which data can be R/W |
| 3 | LIST_FILE | FileID of list of files to be processed |
| 4 | MSG_FILE | FileID of file for messages |
| 5 | OP | Type of DIL-R operation being performed.<br>Parm values are:<br>• "PUT" - Put a file into an 'entry' level of the library<br>• "PROM" - Promote a file to the "next" level of the library<br>• "MPRO" - Promote a BOM to the "next" level of the library<br>• "DILP" - Designer initiated LPO of an already libraried file |
| 6 | PP | Indicates WHEN this process is invoked with respect to file movement.<br>Parm values are:<br>• "PRE" - Library account execution prior to file movement<br>• "POST" - Library account execution after file movement |

TABLE 1-continued

Standard LP Parameters

| Parm Number | Parm Name | Parm Description/Meaning |
|---|---|---|
|  |  | • "DES" - Designer account execution (foreground) (for FLIP and foreground part of DILP)<br>• "LIB" - DIL-R Library account execution (background) (for background part of DILP)<br>• "CHECK" - trial execution of LP in "check-mode" for file synchronization |
| 7 | FRLL | From library-level |
| 8 | TOLL | To library-level |
| 9 | REQR | E-Mail address of sender of request, or requestor |
| 10 | '(' | Optional parm delineator |
| 11+ | LP args | DIL-R default parms and override argument parms and/or another '(' plus DIL process options |

Note: For a DILP, ]frll ≠ parm equals ]toll ≠ parm.

As stated above, the third parameter denotes the input file list. This list is generated by Step 38504, submit Jobs, in FIG. 15*a*. For any Foreground processing, including the foreground portion of a DILP, the list contains one record for every file being processed. The following information about each file is included in the record:

Filename

Library

Filetype

Version

Level

During Background processing, the list contains all the above for each file plus the File Reference number.

Upon completion of the Library Process, the LP author is required to follow certain rules which ensures the output will be properly handled by the Process Manager's Background Processing Algorithm in FIG. 15.

The LP must complete with a return code which is known as the LP result.

The author may return a 120 character message or comment which must be preceded by the keyword *MESSAGE*. This must be returned prior to any output files, and will be recorded in the process tables with the LP result.

The author may instruct the Library Manager to set a result against a "sister" LP by returning the keyword *OVERRIDE* followed by the name of the LP, the result, and an optional message.

If the LP encounters terminal errors, the author can return error messages in lieu of output data. Otherwise, if the LP completes successfully, the only thing returned after the optional message should be output data.

If the LP generates output files, the filename and filetype must be returned in the same line. If nothing else is specified, then the Version and Level information stored with the process definition will be used to dispose of the file. Otherwise the LP author may use one of the disposition types defined below to specify a different Level and/or Version. The LP may also return a list of 1 or more Source Reference numbers which are the File Reference numbers of the any input files used to generate the output data. These numbers are placed on the same line as the output filename and filetype, but are separated by a left parenthesis. If more than one Source Reference is returned, they should be delimited by commas.

The keyword Now may be used to force an immediate disposition of the file.

The keyword Norefs may be used when an existing file is being modified to force the DMS to retain the same File Reference number while depositing the modified file into the repository.

If the LP author desires to use the High Performance Install, then one file must be installed using the Anchor option and the remaining files can use the Component option. In addition, if the Anchor option is used to install an output file of a different type from that which the process is defined against, a special Inst keyword must also be included in the record.

If the LP is a Create DILP, the output file for which the result should be recorded must use the Create option.

The following disposition types are supported. Keywords in angled brackets "< >", are optional.

Install <Now> <AT Level Version> <Norefs>
Store <Now> On repository
Send To e-mail_address
Anchor <AT Level Version> <Norefs> <Inst>
Component <AT Level Version> <Norefs>
Create <AT Level Version>

Note: The Norefs and Inst keywords are not both permitted with the Anchor type of disposition.

Our LP API provides a pre-check capability which allows the LP author to indicate to the Process Manager any file dependencies which may be required to complete the process. In order to use this capability the first record of the LP must contain the keyword @Check!. Upon encountering this keyword, the Process Manager Background Processing Algorithm will run the LP in check mode which means the sixth argument passed in will be Check. The author should code the LP to immediately return a list of file information, which should include the Package, Version, Level and Filetype of each file required for the LP to succeed. These files are in addition to the input files being processed.

DILPs also serve as recovery mechanisms for failed Post-Processes. Since a failed Pre-Process prevents the promotion of the file, the recovery mechanism is as simple as fixing the problem and retrying the promote. However, for Post-Processes, the file has already reached its destination. If a Post-Process fails, this would necessitate checking the file out of the repository and re-promoting it just to initiate the Post-Process again. DILPs eliminate this inefficiency by allowing the user to initiate the Library Process without requiring file movement. The detailed algorithm demonstrates how a good result from a successful DILP can be used to override a bad result from a failed Post-Process for purposes of promotion criteria.

Most of the time it's desirable for the DILP result to be associated with the input data files used to drive the process. However, there can be occasion where it's advantageous to record the DILP result against the output file created by the DILP. Our invention offers this capability through a feature called a Create DILP. Since all DILPs must execute against libraried files with valid File Reference numbers, our preferred embodiment uses a "dummy" file as the catalyst to drive the steps in FIG. 11. The user enters the name of the output file, and that information is used in the Background Processing Algorithm to invoke a special file disposition routine which not only deposits the information into the Control Repository, but transfers the result of the DILP from the dummy file to the output file. An alternate embodiment could also use a special keyword in place of a "dummy" file, which could permit the DILP to execute and properly associate the DILP result with the output file.

Figure 11:
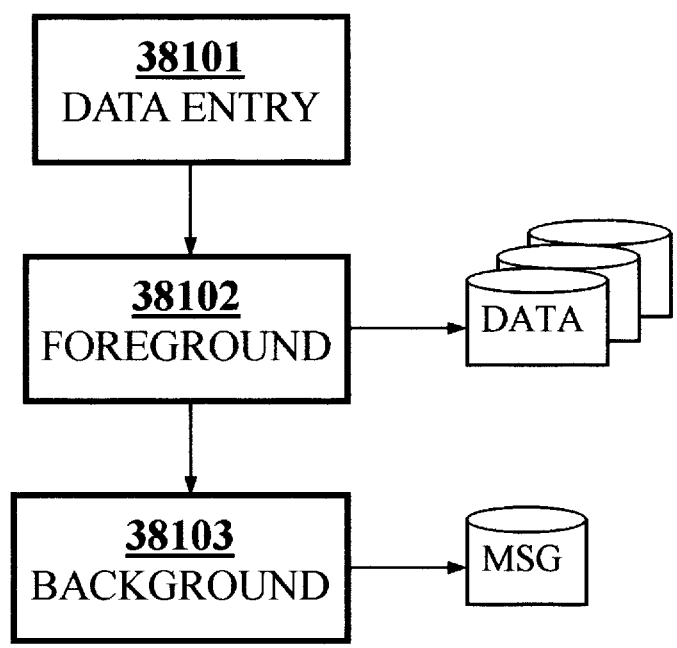
FIG. 11 shows the high level flowchart for a Library Process

FIG. 11 shows the flow of a DILP. Step 38101, Data Entry, presents the menu illustrated in FIG. 12 to the user. The data entry screen gathers all the necessary information regarding the file(s) to be processed. This information is passed to Step 38102 for Foreground Processing. Our invention also permits Step 38102 to be invoked directly through command line arguments or via a third party tool. The only requirement is that the same information gathered in Step 38101 is included in the invocation. Once the appropriate information is gathered in the foreground, it's transmitted to Step 38103 for Background Processing. Step 38103 is depicted in more detail in FIG. 15*a* and is also used to execute Library Initiated Processes.

Returning to Step 38101, our preferred embodiment presents the user screen in graphical environment where the user engages pull down menus, pop-up menus, drop-down lists, radio buttons, push buttons, fill-in fields, and mouse interaction. It should be noted, however, that all functions discussed further in the preferred embodiment can be implemented using simple text screens, or more advanced data entry systems such as touch screens, voice commands or 3-D graphics. The preferred embodiment depicts the method most conducive to the Motif(tm), Windows(tm), and OS/2 (tm) application environments.

Figure 12:
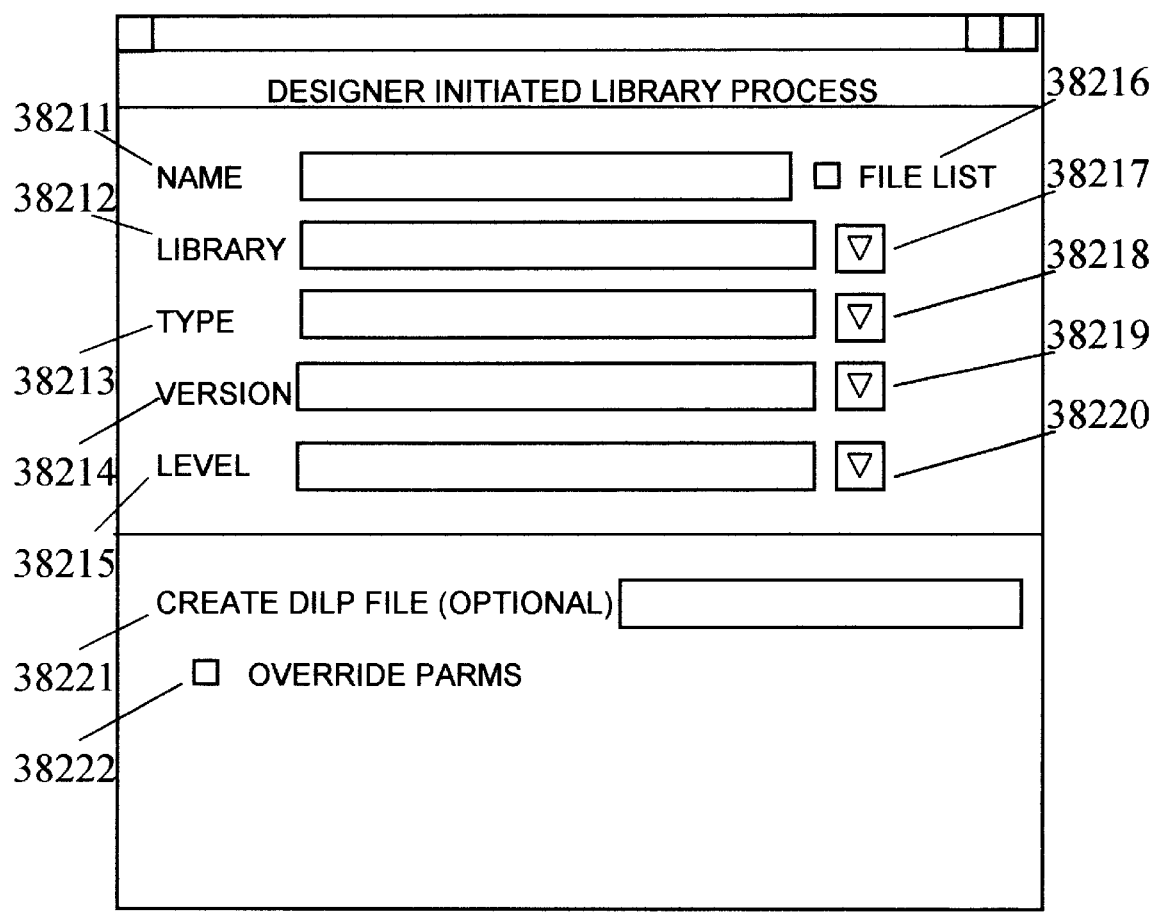
FIG. 12 shows the Data Entry screen for a user to launch a Designer Initiated Library Process FIG. 13 diagrams the algorithm for Library Foreground Processing.

The screen, depicted in FIG. 12, contains five data entry fields, labeled 38211 thru 38215. Field 38211 is where the user types in the Name of the file. The user may type the name in directly or leave it blank to generate a selection list which allows the user to choose multiple files to process. Field 38212 denotes the Name of the Library where the file(s) reside. This function is only intended for data tracked in a public library, therefore this field must contain the name of a valid public library. Drop down menu button 38217 can be used to obtain a list of all the public libraries in the DMS.

Fields 38213 thru 38215 are used to enter the Library File Type, Version Level where the file(s) reside. Button 38218 will display a list of the valid Library File Types used in the Library, button 38219 will show all valid Versions and button 38220 will display all valid Levels. This information is used to initiate a library search for the file specified in field 38211. If the file is specified, but doesn't exist at the specified location, the program displays an error message and gives the user a chance to correct it or abort the program.

If field 38211 is left blank, a selection list resulting from the library search will be displayed and the user may select as many files as desired. If more than 1 file is selected the user is prompted for the number of requests to be initiated. For example, if the user selects 6 files, and responds to the prompt with an answer of 2, then 2 requests with 3 files in each will be initiated. This feature permits the user to break a grouping of files into multiple jobs to exploit a parallel processing environment. For each request initiated, Steps 38102 and 38103 of FIG. 11 will be executed in their entirety. The File List button, 38216, is used to indicate that Filename field, 38211, contains the name of a text file which contains a list of libraried files to process. This allows third party tools to create a list of files to run DILPs against. In this special case, all the information relating to Library, Version, Level and Filetype is acquired from the text file, and fields 38212 thru 38215 are ignored.

Field 38221 is optional for regular DILPs and only pertains to Create DILPs. It allows the user to fill in the Filename of the Create DILP output file. The user must have advanced knowledge of the Create DILP process to ensure the proper name is filled in. This information is transmitted to the background and used to transfer the process result from the dummy input file to the specified file, after it is created and safely deposited into the repository.

The only option is button 38222, Override Parms. When selected, this enables a special screen to be displayed which contains the process run-time parameters for any selected processes. The screen is editable and allows the user to override or change these run-time parameters. A notification is sent to the Data Manager from the background processing algorithm. Upon hitting enter, control is transferred to Step 38102 of FIG. 11.

Figure 13A:
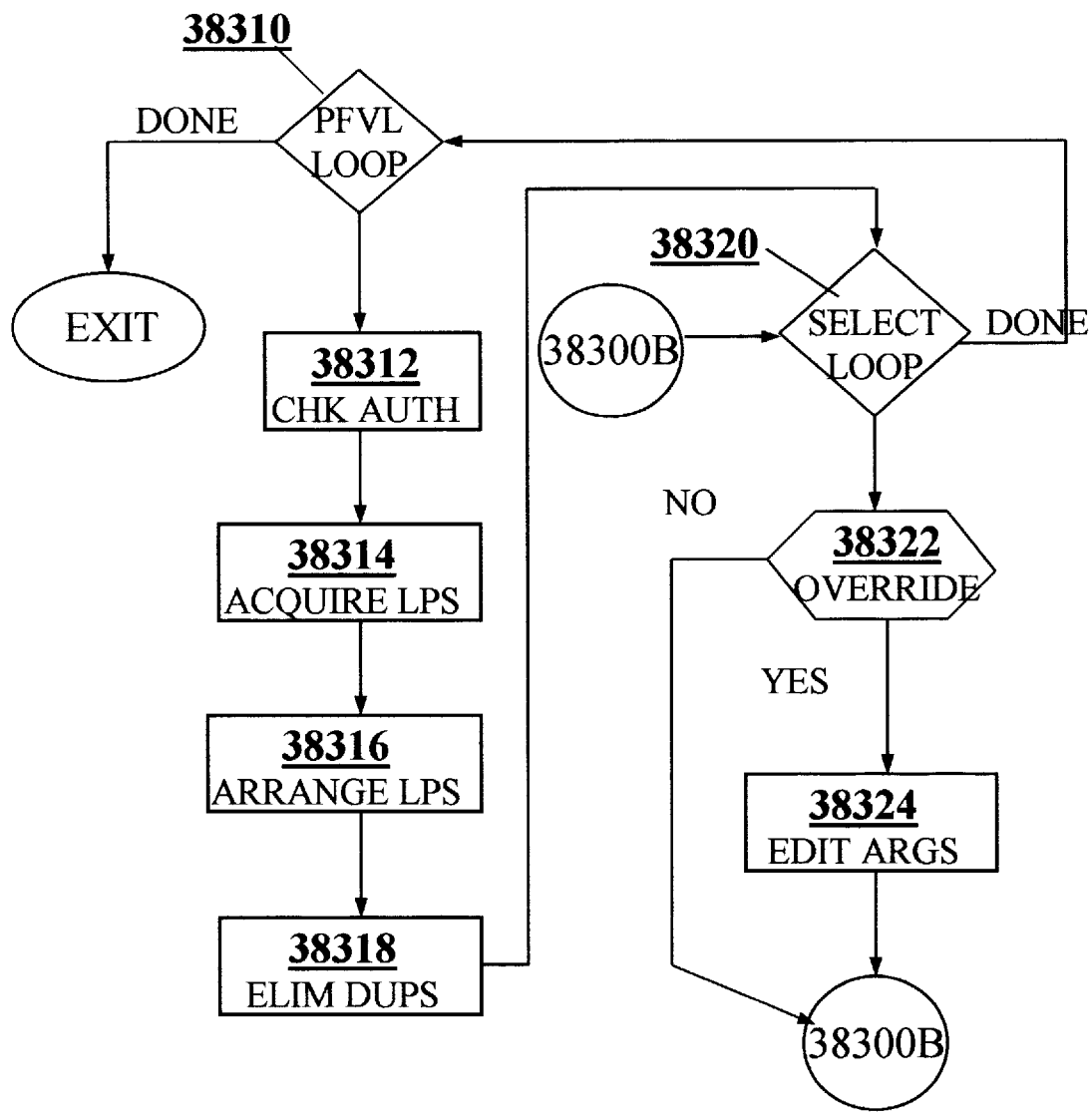

The detailed implementation of Step 38102, Foreground Processing begins with Step 38310 in FIG. 13*a*. Since a DILP can be requested for a list of files that could belong to different Package, Version, Level and be of different types, Step 38310 is employed to establish a PVFL Loop. If the request is only for a single file, the loop will have a duration of one pass. However, if a list of files is presented, the list will be sorted by Package, Version, Filetype and Level, and all of the steps in this algorithm will be executed for each PFVL.

Step 38312 Checks User Authorization to ensure the user is permitted to request a DILP for the given PFVL. This requires a query to the Control Repository which responds with the authentication. If the user is not authorized, the foreground processing is terminated with an error message displayed to the user. If the user has global DILP authority (ie. can request a DILP for any Level, Version and Filetype in this Package), this is remembered so any subsequent passes through the PFVL loop for files of the same Package would not require additional queries to the Control Repository.

Once the user has been authenticated, Step 38314 is employed to Acquire Library Processes. Once again a request is made to the Control Repository to return a list of all the DILPs defined at the current Package, Version, Filetype and Level. Step 38316 immediately follows to Arrange Library Processes into single independent processes or dependent process strings. A user is only permitted to select the first process in a dependent string, so this arrangement becomes the basis for a Bucket. Once the processes are arranged into Buckets, Step 38318 is invoked to Eliminate Duplicates Since the DMS permits two identical Library Processes or LP dependent chains to exist in the same Package, Version, Level and Filetype, Step 38318 improves user friendliness by ensuring only unique choices will be presented to the user.

At this point the algorithm determines whether a specific Library Process was requested via a command line parameter. Our invention permits Step 38102 of FIG. 11 to be initiated through a command line interface that includes a Nomenu option followed by the name of an existing Library Process. If this invocation is used, Step 38320 results in a single pass loop. On the other hand, if Step 38102 of FIG. 11 is driven by the data entry screen in FIG. 12, then Step 38320, Selection Loop, of FIG. 13*a* will display a selection screen of the Buckets assembled in Step 38316. The user can select any independent process or the first process in any dependent chain. Any attempt to select any other process in a dependent chain prompts the user to select again.

Upon selecting a valid candidate, Step 38322 checks to see if the Override Option is requested. If so, this results in Step 38324, Edit Args displaying another screen with the process arguments for the selected process. The user can edit any of these arguments, and the new arguments will be transmitted and used in the background. Since these arguments may potentially violate a rule or regulation, notification is sent to the Data Manager when the process executes in the background.

Figure 13B:
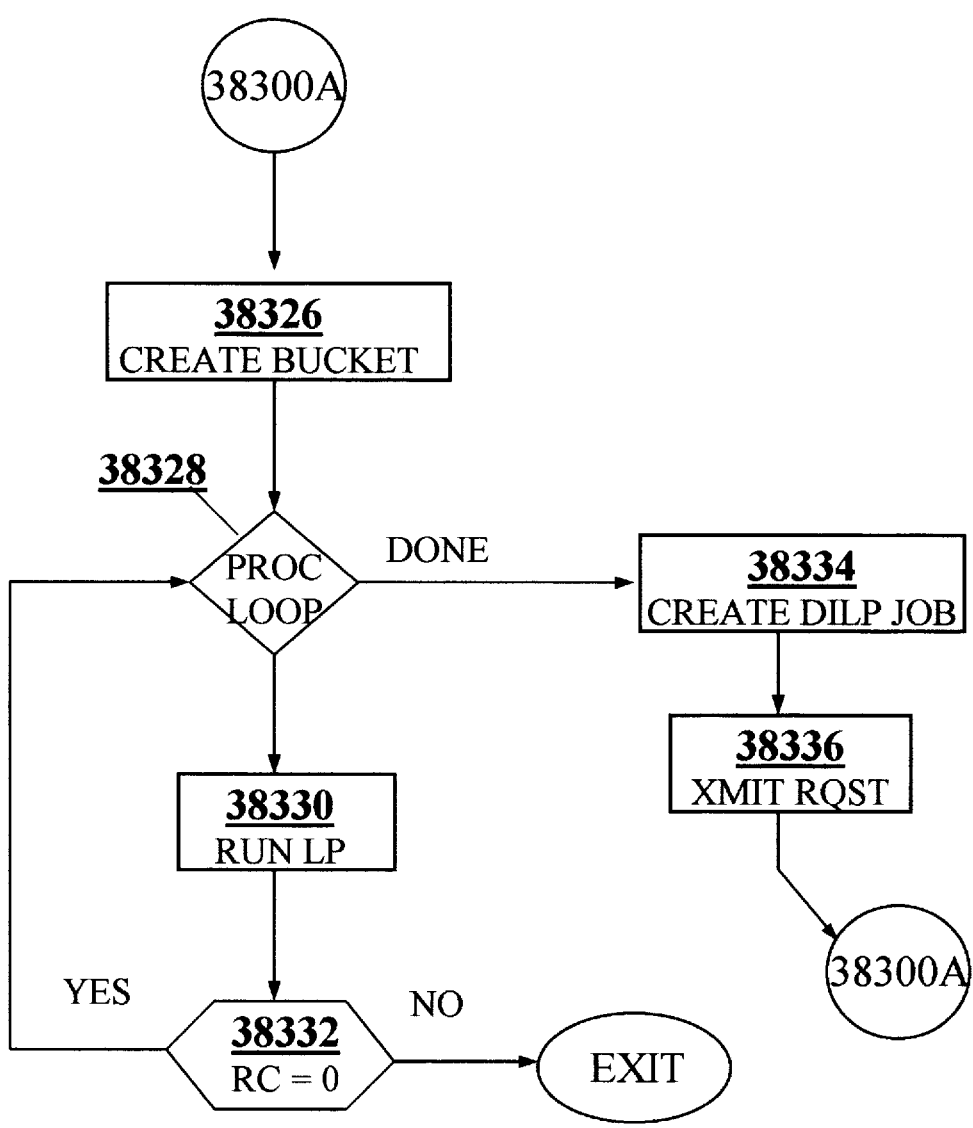
Figure 14A:
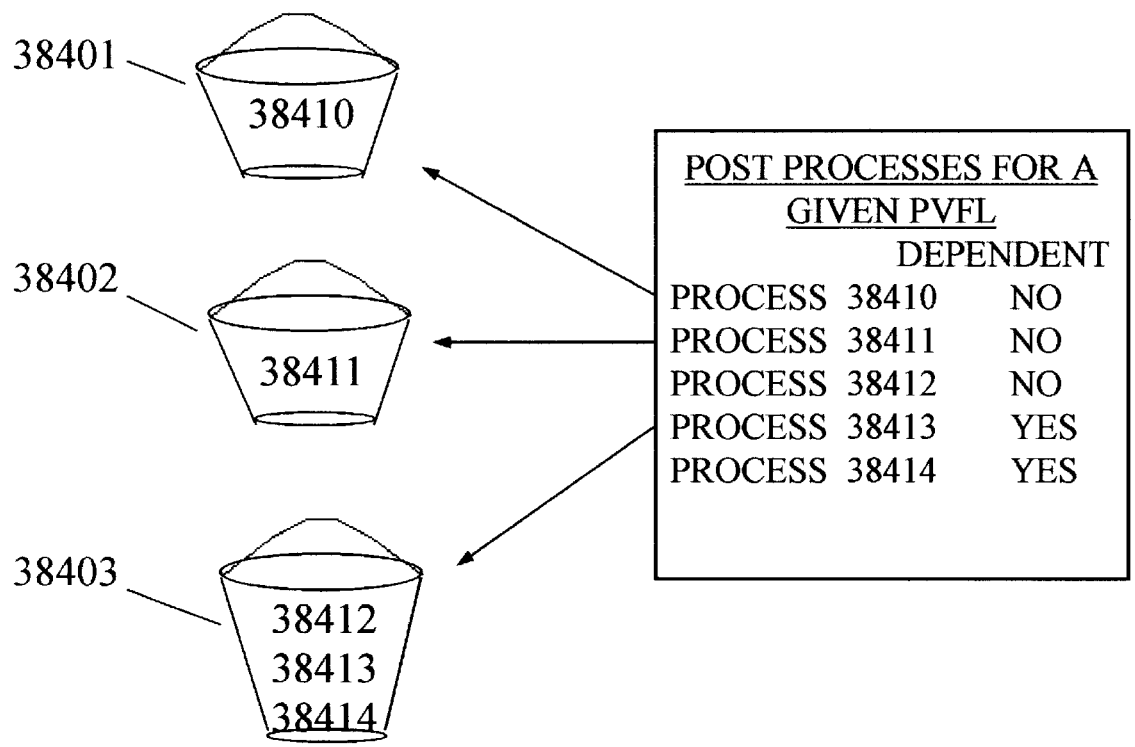
FIG. 14 illustrates the concept of Buckets with their informational content.
Figure 14B:
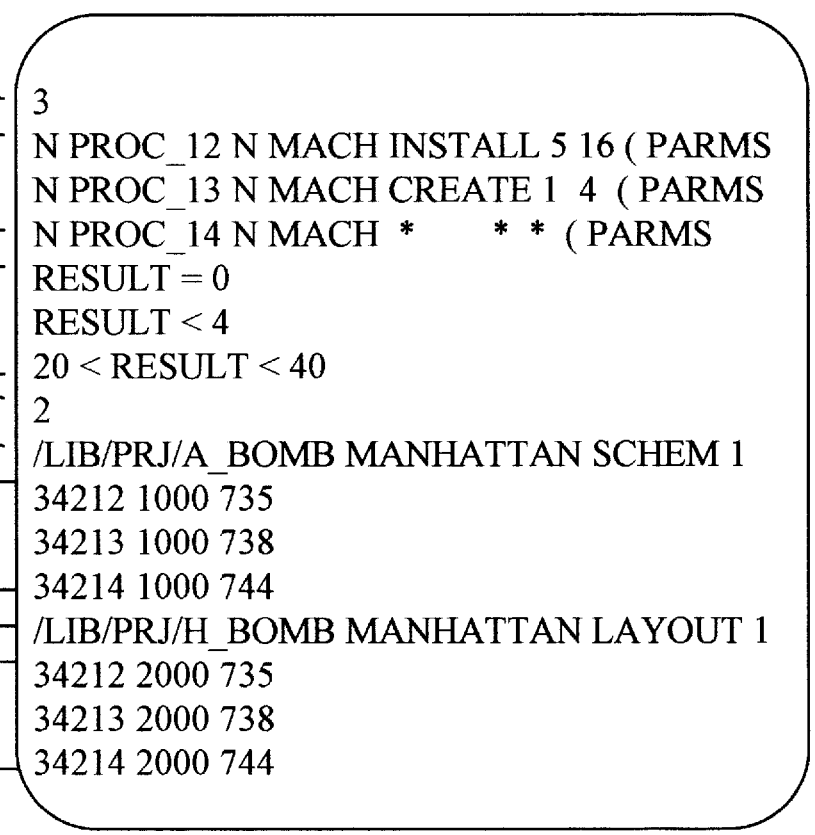

At this point control proceeds to Step 38326 in FIG. 13*b* to Create Buckets. A Bucket is a formatted file containing all the necessary information to execute a single independent Library Process or all the LPs in a dependent string. FIG. 14*b* depicts a Bucket in detail, and the contents are described later.

Note: The File Reference numbers are absent from DILP Buckets due to the fact that a file list can be created without accessing the Control Repository. The Process Manager allows this since Step 38519, in FIG. 15*c*, of the Background Processing Algorithm will acquire and insert the correct File Reference numbers. Once the Bucket is created, all the files selected for processing are written into a DILP LIST. The API requires a DILP LIST to exist for reference by the Library Processes in the Bucket.

Step 38328 establishes a Process Loop in order to execute Steps 38330 and 38332 for each process in the Bucket. Step 38330, Run Library Process, actually runs the Library Process in Foreground mode. This permits the LP to interact with the user in order to gather any information required to run the process on the ALM. The foreground processing is optional and can be bypassed if the LP doesn't require any user input.

In Step 38332, the return code is examined to see if RC=0. The API requires the LP author to return a zero completion code from the foreground portion of the DILP if all requested information is successfully gathered. Otherwise any non-zero return code causes the program to terminate. A return code of zero returns control to the top of the Processing Loop in Step 38328, and the loop repeats until all Library Processes in the Bucket are executed in the foreground.

Upon completion of the Processing Loop, control proceeds to Step 38334 which Creates the DILP Job File. The Job File contains all the Bucket information in addition to a header indicating the type of request and any run-time options to be employed in the background. Control proceeds to Step 38336, Xmit Request, which is responsible for sending the Job File to the appropriate ALM's reader. In our preferred embodiment, this ALM can be a Conventional Library Machine, Remote Execution Machine or an Actor employing an Automated Reader mechanism to queue and process Job Files.

Returning to FIG. 11, the information collected during the Foreground Processing in Step 38102 is transmitted to Step 38103 for Background Processing. In our preferred embodiment, this would be performed on an Automated Library Machine, but one skilled in the art would see this can also be directly executed in a client environment that has access to the DMS. Since this step is identical for Library Processing initiated by a DILP or Promote request, the detailed algorithm is discussed later.

Most of the time it's advantageous to execute Library Processes as soon as they are initiated. However, there are times when it's desirable for the user to request a process to be deferred to a later time. Our invention supports deferred processing whereby the request is received and partially processed. A special deferred request is generated and distributed to the appropriate ALM. The ALM accepts the request, but rather than executing the process it holds onto it. Incorporated into every ALM is an automatic timer that wakes up every hour and looks for any deferred requests. Upon finding one, it reads the first record to determine if the requested start time is equal to, or later, than the current time. If not, then the time hasn't arrived to initiate the process, and the code exits leaving the deferred request intact. However, if the time criteria is met, the code reads the remaining control information into a Job File and separates any foreground processing information into the ALM's working space. Control is then passed to the Background Processing Algorithm at Step 38540 in FIG. 15e. This algorithm processes the request as if it were just initiated. It is discussed in more detail later.

Our invention also permits processes to be independent or chained together as a string of dependent processes. This can be illustrated with an example where two Processes A and B are defined for a given Package, Version, Library File Type and Level. If they are defined as independent, then both will be executed regardless of their outcome. If they are defined as a dependent string, then the first one in the chain is executed. It must complete successfully in order for the other process to be attempted. By definition, successful completion of one process in a dependent chain implies that all previous processes in the chain completed successfully.

The Data Manager can define any Library Process to be a Pre, Post, or DILP. In addition, multiple Library Processes can be grouped into any combination of independent and dependent strings. Finally, any independent LP or dependent string of LPs can be defined to run immediately or to run in the deferred mode. The Data Manager uses our Data Manager Configuration Utility to define a Library Process.

Occasionally it's necessary for a file or group of files to be exempt from processing. Our invention provides a simple mechanism to mark files for process exceptions without the need to remove or alter the process definition. It's done through in interactive File Exception Utility. FIG. 16 illustrates the File Exception Screen which depicts fields 38211 thru 38215 which are identical to the DILP data entry screen in FIG. 12. Also present on FIG. 16 are drop down menu buttons 38217 thru 38220 which are also identical to those found in FIG. 12. The difference is the radio buttons, 38623, which comprise the Process Type selection. The user is required to choose Pre, Post or Designer Initiated. Upon hitting enter, the program checks to see whether the Filename field, 38211, is blank. If so, a library search is initiated to present a selection list of files to the user. On the other hand, if a filename is filled in, the Control Repository is queried to ensure the file really exists. If not, the user is notified and the program aborts.

Upon resolving the file(s), the Control Repository is queried to return all the processes of the chosen type for the given PFVL. The user selects the processes that are to be exempt for the selected files. The Control Repository process tables are updated to list the excepted files. Each time the Process Manager invokes a process it compares the exception list to the files being processed. If there's a match, the file is excluded from the processing list.

Figure 15A:
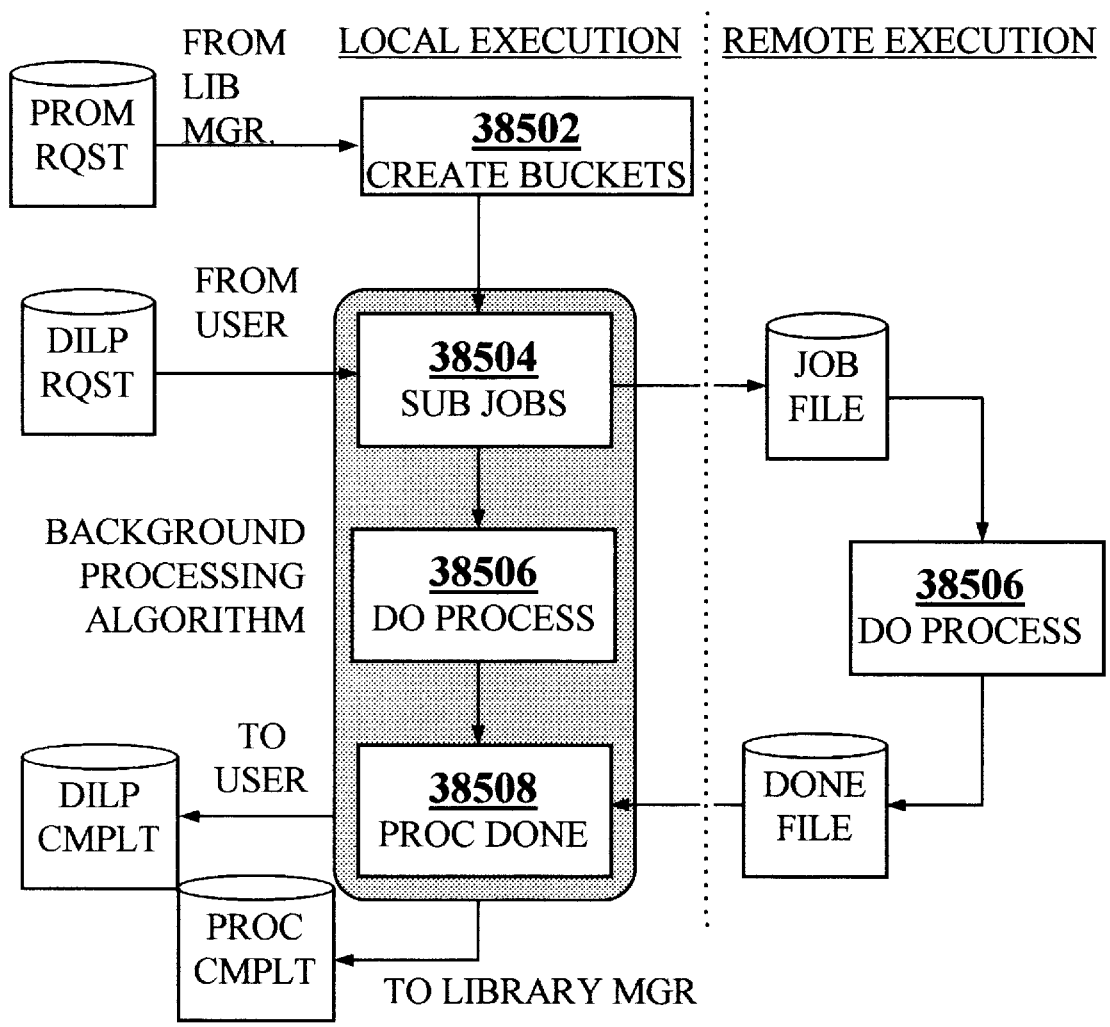
FIG. 15 diagrams the algorithm for Library Background Processing. This algorithm is used by Step 38103 in FIG. 11 or it can be initiated by promotion (movement) of a file through the Data Management System.

FIG. 15a illustrates the overall flow of a Library Process executing in an Automated Library Machine environment. As previously explained, the process can be initiated by the Promotion algorithm or by the Foreground Processing of a DILP from FIG. 11. Steps 38504 thru 38508 must be executed for any Library Process regardless of point of origination. Step 38502 is only executed for LPs initiated by a promotion in progress. In a simple Conventional Library System or an Actor/Object environment, all steps are executed on the same ALM. However, if Remote Execution Machines are used, Job Files transmit the work request to the remote ALM, and Done Files transmit the results back to the dispatching ALM. Once Step 38508 completes, control is either returned to the Promotion algorithm, or a DILP complete message is returned to the user.

In order to handle processing invoked by the Promotion algorithm, the Process Manager employs Step 38502 to Create Buckets for the processes that need to be executed. Buckets are the means by which all information required to run Library Processes are distributed and communicated among any Automated Library Machines involved in the processing. Step 38502 begins with a list of files being promoted to a certain level. This list may contain files of different types and from different Packages and Versions. In our preferred embodiment, the Promotion algorithm has already broken the request down by level and type (Pre or Post) prior to invoking the Process Manager. The request list is further segregated by Package, Version and Library File Type since this is the manner in which all Library Processes are stored in the Control Repository.

For a given Package, Version, Filetype, Level (PFVL) and process type (Pre or Post), the algorithm queries the Control Repository for the matching Library Processes. The Control Repository returns all the necessary information to run all the Processes. This includes the Process Name, Process Number, the Execution Machine, Results Disposition, Completion Criteria, Run-time Parameters, Environmental Parameters such as required memory or disk space, and the deferred flag. In addition, the information is presented in such a way that identifies any dependent process chains.

Our invention requires each independent process to have its own Bucket. Dependent process strings are contained within a single Bucket. FIG. 14a illustrates this by indicating two independent Processes 38410 and 38411 each residing in self-contained Buckets 38401 and 38402. Furthermore, a dependent string consisting of processes 38412 thru 38414 are all contained within Bucket 38403. The algorithm creates the necessary number of Buckets until all PFVLs in original request list are exhausted.

The anatomy of a Bucket is described in FIG. 14b which illustrates an example Bucket. Record 38421 contains the number of dependent processes held in the Bucket. The next section contains one record for each process. Thus in this example, records 38422 thru 38424 represent the process information. Each record can be parsed into separate tokens with the following definition:

Done Flag where N indicates process has not yet completed and Y indicates completion.

Process Name

Deferred Flag where N indicates process should be initiated immediately and Y indicates it will be deferred.

Machine Name where the process should execute. It must either be * which indicates the process should run locally or it can be a valid ALM where the process will be dispatched to.

Output Disposition which may be * to indicate no disposition necessary or it can be one of the following:
Install <Now> <AT level version>
Store <Now> <Nobackup>
Create
Anchor
Component
Send To Note: Optional keywords are denoted by angled brackets < >.

Temporary Disk Space is a numerical representation of a disk storage metric applicable to the current environment. A * indicates no special storage requirement for this process.

Temporary Memory is a numerical representation of a random access memory metric applicable to the current environment. A * indicates no special RAM requirement for this process.

Run Time Parameters which can be any number of tokens following a right parenthesis. The parameters are passed directly to the Library Process upon invocation.

The next section contains one record of criteria information for each process. Thus in this example, records 38425 thru 38427 depict the completion criteria for each of the three processes. A completion criteria can be any valid boolean expression where the keyword Result denotes the final return code of the process.

Record 38428 denotes the number of files being processed by this Bucket. The next section contains multiple records for each file being processed. In this example, two files are being processed, so there are two sub-sections. Each sub-section contains one record denoting the file information. Record 38429 denotes the name of the first file in the first token. The second through fourth tokens represent the Package, Filetype, and Version associated with the file.

Immediately following are a block or records equal in number to the number of processes in the Bucket. Our example has three processes, so records 38430 thru 38432 finish the sub-section. This sub-section has three tokens which represent the Process Reference number, File Reference number, and Log Reference number.

Record 38433 is identical to record 38429 but represents the file information for the second file being processed by this Bucket. Records 38434 thru 38436 are identical to records 38430 thru 38432, except they pertain to the second file. As expected the only difference between these sub-sections is the File Reference token. The Process and Log Reference numbers are identical in records 38430 and 38434 since these records refer to Process_12. The same is true for records 38431 and 38435, and also for records 38432 and 38436. The arrangement of the information employed in our invention permits a single format to convey an endless combination of Library Process configurations and parameters.

Step 38504, Submit Jobs, is the first step in the Library Process Background Processing Algorithm. It can be entered from Step 38502 or from the Foreground Processing step in FIG. 11. In either case information is presented in Bucket form. The detailed algorithm for Submit Jobs begins with Step 38510 in FIG. 15b. Here a Bucket Loop is established to perform Steps 38511 and 38512 for each bucket. In Step 38511, ALM Check, buckets containing a dependent string of processes are checked to ensure all processes are defined to run on the same Automated Library Machine. If not, the program terminates with a message sent to the user. Step 38512, ALM List, organizes the Buckets by ALM in order to facilitate distribution of any Buckets which will run on a Remote Execution Machine. This step simply consists of creating a data structure for each new ALM discovered in the looping process, and assigning the Bucket to it. Any Buckets containing deferred processes are exempt from the ALM List and a flag denoting their existence is set for future use in Step 38517.

At the conclusion of the Bucket Loop in Step 38510 the algorithm checks the type of processing to see if it's a Pre-Process in Step 38513. If so, Step 38514, Check ALM List is employed to ensure there's only one ALM list. This is because our invention requires all Pre-Proces to run on the same ALM regardless of their dependence or independence on one another. If more than one ALM List was generated in Step 38512, an error message is sent to the user, and the program terminates.

Step 38515 establishes an ALM Loop in order to execute Steps 38516 and 38518 thru 38525 against each ALM List generated in Step 38512. If there is only one ALM List, the Buckets associated with this list may need to be distributed to a Remote Execution Machine or they may be permitted to run locally on this ALM. However, if more than one ALM List exists, some Buckets will be distributed.

Step 38516, Get ALM resolves the exact machine where the current list of Buckets will run. If the Data Manager is running a Conventional System or an Actor/Object system, the default for any process is to run locally unless otherwise specified by the Data Manager. If the Buckets can run locally, a flag is set. For configurations involving Remote Execution Machines, the Data Manager can specify a specific machine name, or a Select List. If a machine name is specified, it will be used for distribution. Otherwise, if a Select List is identified, the algorithm will attempt to locate the list. The list is a text file where each record contains the name of a Remote Execution Machine. Step 38516 will read the first record, use that name as the recipient of the Buckets, and rewrite the list putting the current machine at the bottom. This results in the machines receiving work in a simple round-robin fashion.

Figure 15B:
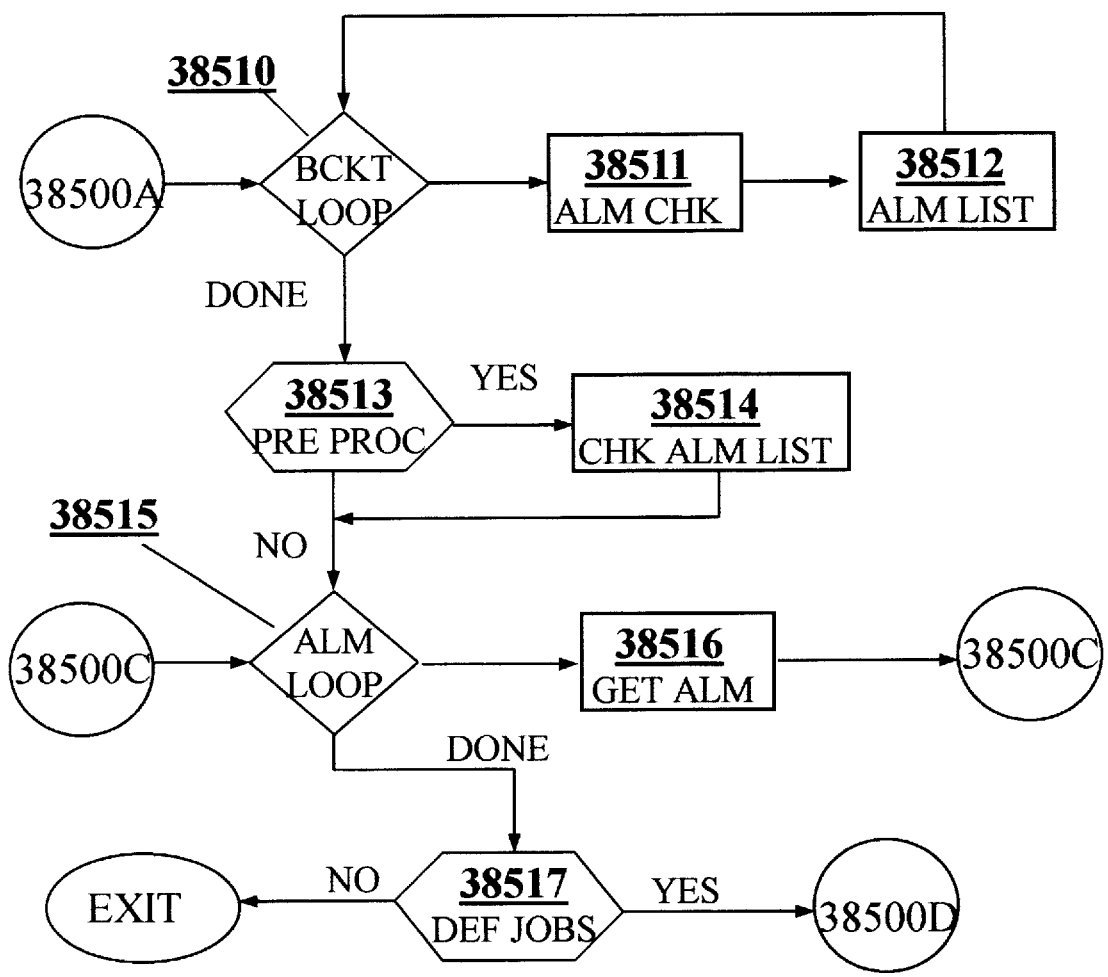
Figure 15C:
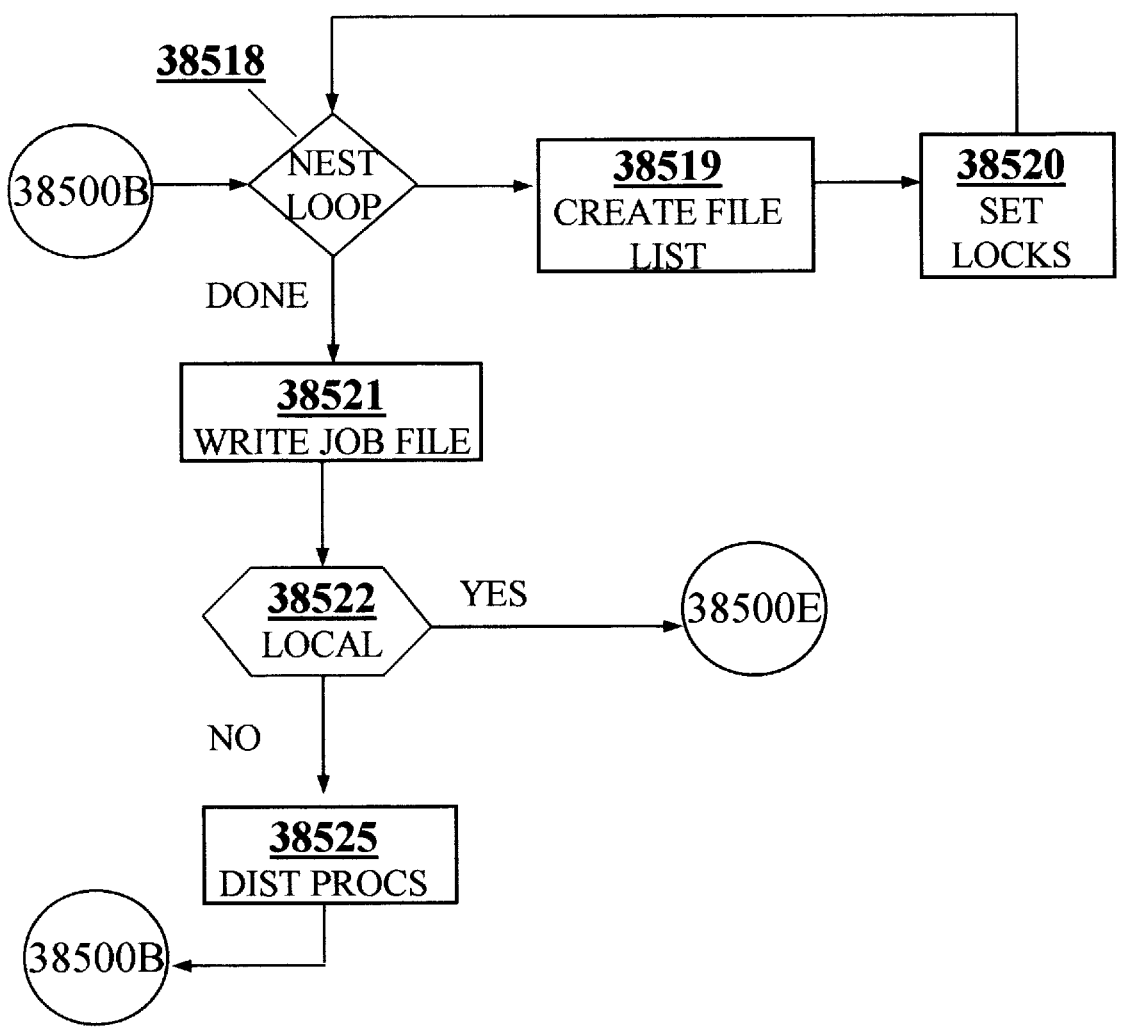

Control proceeds to Step 38518 in FIG. 15c where a Nested Loop is established. The nested loop consists of an outer loop of all the Buckets within the current ALM List, and an inner loop of files contained in each Bucket. All of this is still occurring within the big overall ALM Loop established in Step 38515. Next, Step 38519 is employed to Create A File List for the current ALM. In most cases where multiple Buckets exist, the same files will be repeated in many of the Buckets. To improve efficiency, the files are grouped into one master list for the ALM. Their records within the various Buckets are replaced by pointers to their respective positions within the master file list. All remaining Bucket information is retained, and travels with the newly created file list if any distribution is required. If the processing is initiated by a DILP request, the File References for the files are absent since DILPs can be initiated without the assistance of the Control Repository. Therefore, the corresponding Bucket records are missing this piece of information. Step 38519 will resolve this by requesting missing File Reference numbers from the Control Repository and placing them into the appropriate position in the Buckets.

Step 38520 is used to Set Processing Locks against all files belonging to any Buckets that will be distributed to a Remote Execution Machine. These are Overlay Locks set with a specific Reason Code using our lock setting utilities.

Since the request may be delayed in the Remote Execution Machine's queue for some time, the processing lock prevents any movement or overlaying of the files being processed. At the same time the Control Repository is being used to set these locks, it's also returning the Lock Reference numbers for the files. These are inserted into the File List along with the other file information.

At this point the Nested Loop initiated in Step 38518 is repeated until all files within all Buckets are exhausted for this ALM. Step 38521 is then invoked to Write the Job File. The Job File contains all information in the Buckets along with the Master File List. Next, Step 38522 runs to check whether the current list of Buckets can be executed locally. If so, control proceeds to Step 38540 in FIG. 15e where processing is initiated immediately. If not, Step 38525 is employed to Distribute the Job File. In order to improve efficiency, the ALM List created in Step 38512 is re-ordered at the beginning of Step 38515 to ensure the local ALM, if it exists, is last in the loop. Since Library Processes can tie up an ALM for a long period of time, it's advantageous to distribute any remote processes prior to executing the local processes. The ALM Loop is repeated until all ALM Job Files are dispatched and/or initiated locally.

If processes can be executed locally, the algorithm passes control from Step 38522 to Step 38540 where all steps in the main body of the algorithm execute until the processing completes. Control is then returned to Step 38515 where the loop exits and proceeds to Step 38517.Otherwise if no local processing can be done, control proceeds immediately to Step 38517.

In Step 38517 a test is performed to see if there are any Deferred Jobs. If any of the deferred flags were set in Step 38512, control proceeds to Step 38526 in FIG. 15*d*. Step 38526 establishes a Deferred Buckets Loop, where all the deferred Buckets can be transformed into deferred job requests.

In Step 38527, Create Deferred Jobs, Jobs Files similar to those formed in Step 38521 are created. These files contain all the Bucket information with the exception of the input file names. Instead a Master File List is created for each ALM, and their records in the Buckets are replaced with pointers to the positions of the file names within the Master File List. The one difference is this Job File contains information in the first record which denotes the time that the process should execute. This information is stored with the process definition in the Control Repository process tables. As the algorithm proceeds through the Deferred Buckets Loop a new File List is created for each new ALM encountered. If the same ALM is encountered multiple times, the file names are appended to the Master List without duplication.

Next, Step 38520 is again invoked to Set Processing Locks against all the input files. This ensures they won't be overlaid before the time comes to execute the deferred process. In Step 38529, Append Data any input data that was transmitted from a Foreground Process is also appended to the Deferred Jobs File. This ensures that all the data necessary to run the process will exist in an easily accessible location at the scheduled run time.

Once the Deferred Buckets Loop is exhausted, Step 38530 is employed to Distribute the Deferred Jobs.

Figure 15D:
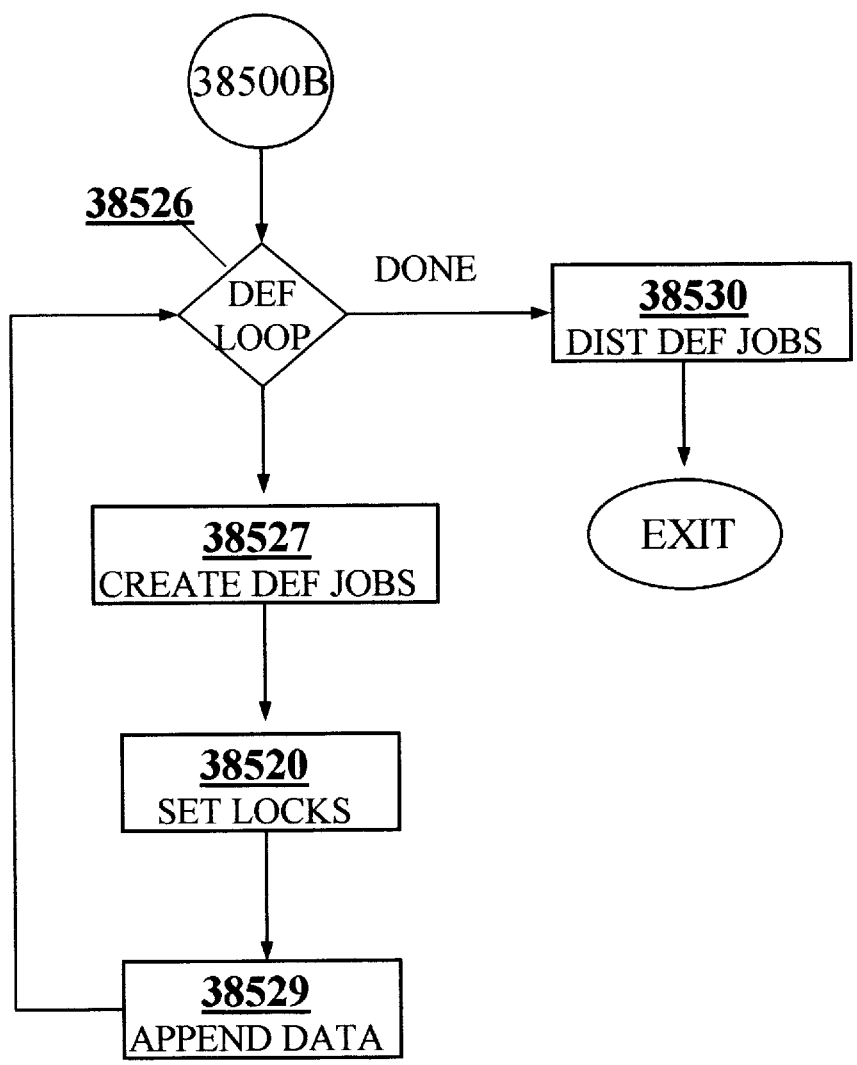

For processes requiring distribution to a Remote Execution Machine, FIGS. 15*b* thru 15*d* represent the Job Submission portion of the algorithm. The Remote Execution Machine would receive a Job File which would initiate the main processing body of the algorithm beginning in FIG. 15*e*. For processes that execute locally, this control is passed to FIG. 15*e* as soon as any distributed processing is handled. In either event, control must eventually encounter Step 38540.

Returning to FIG. 15*a* Step 38506, Do Processing represents the main processing portion of the Background Processing Algorithm. It begins with Step 38540 in FIG. 15*e*. Here the algorithm Reads the Job File and stores the information into various data structures. At this point connections are made with the Library Manager to ensure any information transmitted from a Foreground Process is in a location accessible to this ALM. Regardless of how Step 38540 is initiated (either by receiving a request on a Remote Execution Machine or reading a locally generated Job File), the current ALM now has all the information it needs to run the processes contained in the Buckets.

Step 38541, Check Process Queue, exists mainly for requests that need to be recirculated due to a file interlock. In this step, the Control Repository is queried to see if any files are locked waiting to be installed into the DMS. If so, this list is compared against a dependency list of files required to run the current set of processes. Normally during the first pass of a job request, this dependency list is empty. In some cases, a dependent process relies on the output from the previous process to be installed prior to execution. In this case, the required files would be added to the dependency list and the job request will recirculate until the install completes. It is Step 38541 that determines when the interlock is cleared so processing may continue. If there is a dependency list in the Job File, and any files in that list match those in the Process Queue, the request is simply recirculated.

Frequently, Library Processes require temporary disk space to store transient results and data until the process completes. Our invention allows the Data Manager to specify the required temporary space during process definition. Step 38542 is a safeguard which Checks Disk Space to ensure the current ALM has access to enough total disk storage to satisfy all the processes in all the Buckets. The algorithm loops through all the process information within all the Buckets looking for temp space requirements. For each one found it updates a running total. Once complete, it compares this against the total amount of available space. If the available space is insufficient, the processing is aborted and an error message is returned to the user. This ensures a large Bucket or numerous small Buckets won't abend prematurely and jeopardize data integrity.

At this point, Step 38510 is again executed to establish a Bucket Loop In Step 38543 a File List is created by writing the names of all input files associated with the current Bucket into a special File List. This information is different from the Master File List contained in the Job File in two ways. First, this list only contains files used in the current Bucket which may be a subset of the Master File List. Second, the format is more convenient for the intended user of the list. The sole purpose of this file is to act as the input list to drive the actual Library Processes in the Bucket.

Figure 15E:
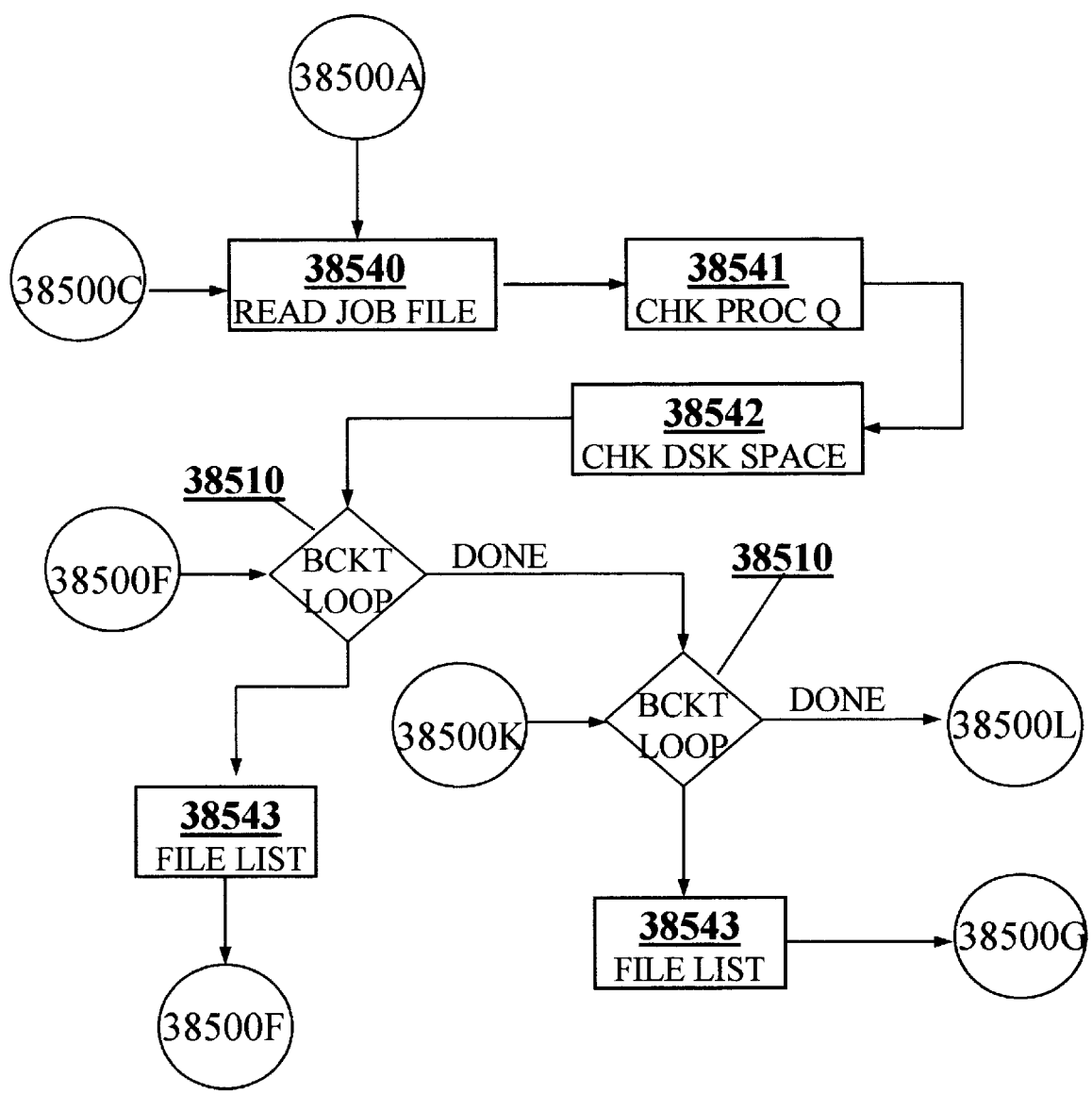
Figure 15F:
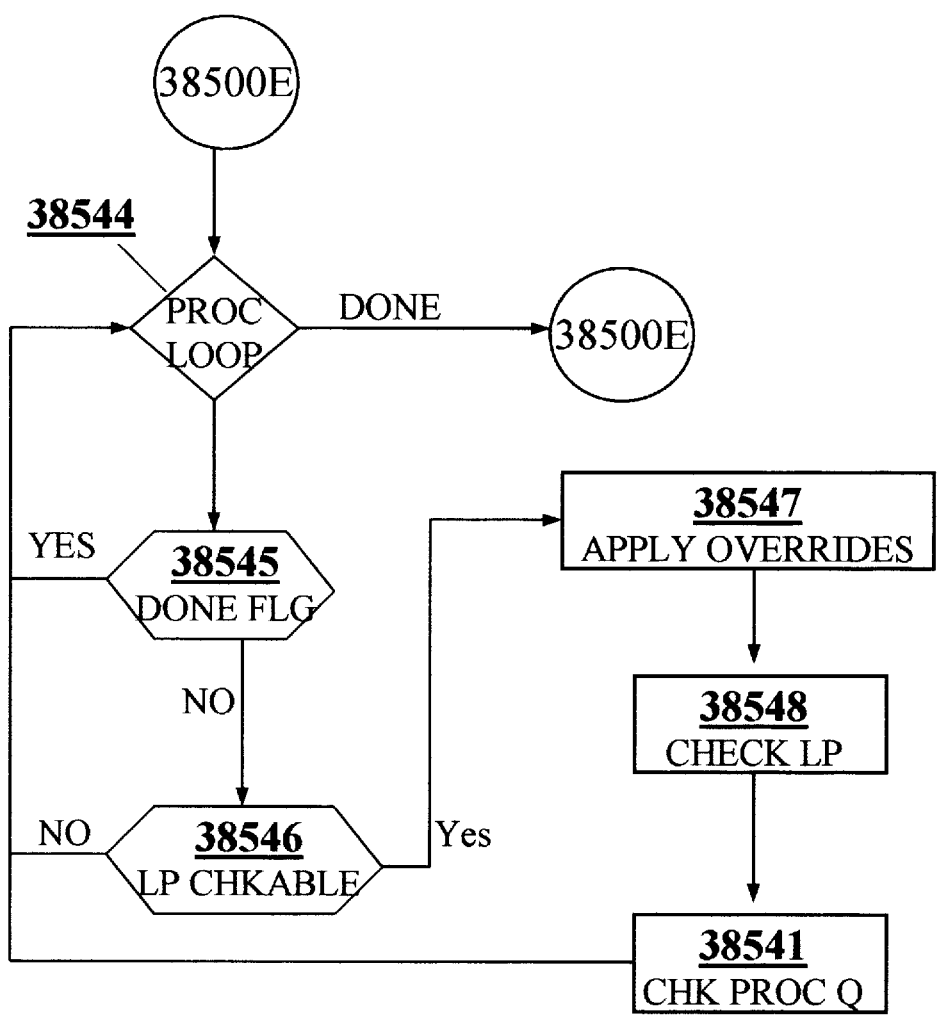
Figure 15G:
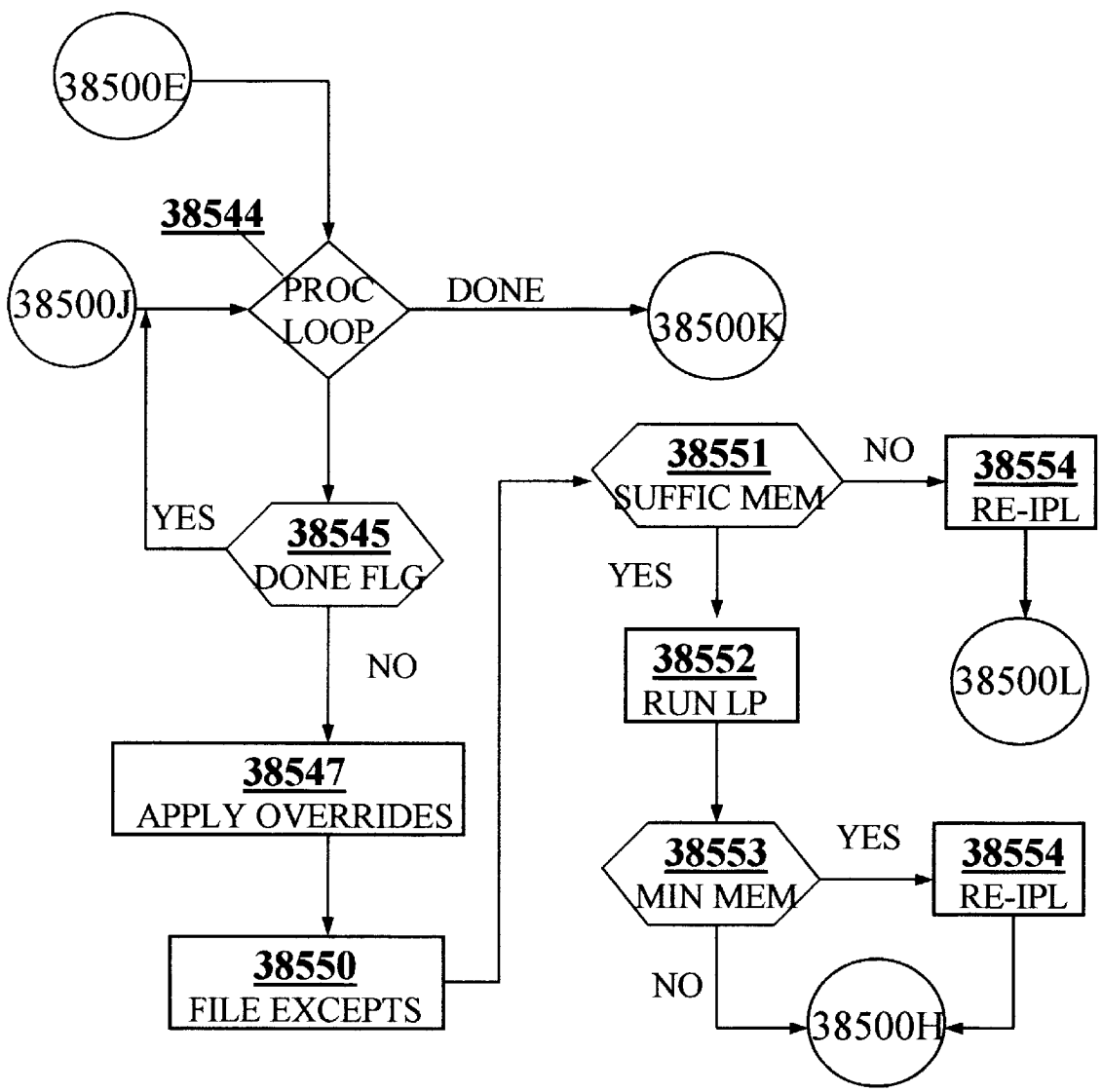

Control is now passed to Step 38544 in FIG. 15*f* where a Process Loop is established in order to execute Steps 38545 thru 38548 against each process in the current Bucket. Step 38545 tests the Done Flag for the current process. If the process has already completed, which could be the case for a recirculated job request, then control is returned to the top of the Process Loop, and the next process is examined.

If the Done Flag is off, Step 38546 is invoked to test if the LP is Checkable. Our invention provides an API which permits the author of a Library Process to write a dependency check. For example, if a Library Process requires some file, other than the input files, to complete successfully, the author can specify this in the LP. The LP is written in such a way that it can be run in Check Mode, which means the LP will only execute the dependency code. Not all LPs have this special dependency, so a keyword is inserted into any LPs that should be run in Check Mode. Step 38546 examines this keyword. If the LP is not checkable, control returns to the top of the Processing Loop.

If the LP is checkable, Step 38547 is invoked to Apply Parameter Override Whenever a user initiates a Library Process either through the DILP menu or via a Promote request, they have the option of overriding any of the processing parameters defined by the Data Manager. This permits processes to be run in a "test" or "experimental" mode without requiring the Data Manager to continually redefine the process. Any overridden parameters are transmitted to the ALM with the other Foreground Processing information. Step 38547 applies those overrides prior to calling the LP in Step 38548.

In Step 38548, Check LP, the algorithm executes the Library Process in Check Mode. The LP will return the dependency list which is used n to employ Step 38541 again to Check the Process Queue If a match is found, the job request is recirculated until the interlock clears.

Once all the LPs in the current Bucket are exhausted, control is returned to the top of the Bucket Loop in FIG. 15*e*.

Steps 38543 thru 38548 are repeated until all Buckets are exhausted. Successful completion of this loop indicates that all dependencies for all processes in all Buckets can be satisfied. As seen from FIG. 15*f*, if any dependency can't be satisfied the entire job request is recirculated. The purpose of this is to maintain data integrity by ensuring that any newly created file that is required for a task can be safely deposited into the DMS prior to task execution.

At this point Step 38510 is again invoked in FIG. 15*e* to establish the Bucket Loop. Step 38543 is again employed to create the File List. Control is now passed to Step 38544 in FIG. 15*g* to initiate another Processing Loop. This loop is established to actually run the Library Processes. In preparation for this, Step 38545 and Step 38547 are executed again to test the Done Flag and Apply Parameter Overrides respectively. During this pass of Step 38547, notification is sent to the Data Manager regarding the parameter overrides invoked by the user. A permanent log entry of the event is also recorded for historical tracking.

Next, Step 38550 is invoked to mark any File Exceptions. Our invention permits the user to exclude any files from processing. For example, if a promote request for files A, B and C require an LP to execute as part of the promotion criteria, and for some reason file C can't be subjected to that LP, the user can mark the file for exception prior to initiating the promote request. Step 38550 looks for any file exceptions in the Bucket information, and for any that exist, the file is temporarily removed from the File List.

Step 38551, Sufficient Memory, is used to query the amount of available RAM. If it's below a threshold amount that the Data Manager can optionally specify when defining an LP, then the request is recirculated. In our preferred embodiment, all Library Processes run on Automated Library Machines constructed as AutoReaders. This permits the Process Manager to send the ALM an instruction in Step 38554 to Re-IPL or re-initialize the environment. In addition control proceeds to Step 38574 in FIG. 15*l* so the current Job File can be recirculated into the ALM's reader. The Re-IPL request is given a higher priority so the ALM will process it first, followed by the current Job File. If the environment doesn't support this, manual intervention will be required to regain the necessary RAM.

Assuming enough RAM exists to run the LP, control proceeds to Step 38552, Run Library Process. The Library Process is launched with the File List (excluding excepted files) and parameters (including overrides) passed in. As stated previously, the LP may be a simple shell which loops through the File List and launches a third party program against each file. The LP can also be a program specifically written to run only as a Library Process. In either case, the API provides a mechanism to pass the input information to the program and capture the results. At the conclusion of the Library Process, the algorithm captures the result of the process and records it into a Process Log.

Since the possibility exists for a Library Process to leave the ALM in a low memory state, Step 38553 is invoked to check for Minimum Memory Like Step 38551, a memory snapshot is taken, but this time it's compared against a predefined threshold established by the Data Manager for this particular ALM. Since ALMs perform many tasks in addition to running Library Processes, they require a certain amount of RAM to function. If Step 38553 determines that the available RAM is too low, it invokes Step 38554 to send a Re-IPL request to the ALM's reader. The pre-defined threshold is calculated such that a Re-IPL will be requested before the ALM memory falls below the minimum amount necessary to perform basic functions.

Figure 15H:
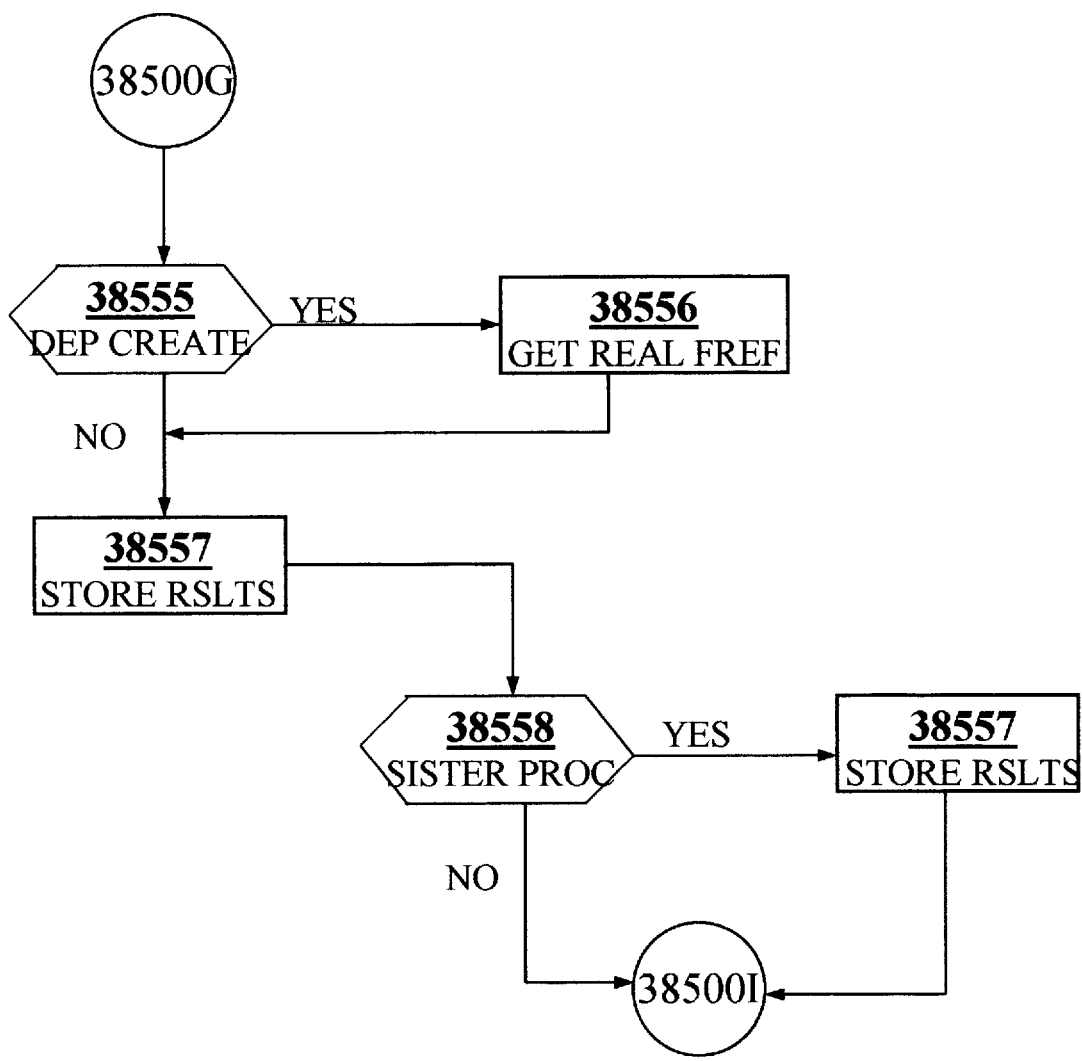

Whether an IPL is required or not, control proceeds to Step 38555 in FIG. 15*h*. Step 38555 is designed to handle the case where the current process is a Dependent Process of a Create DILP. Whenever the Data Manager defines a dependant string of processes where the first process is a Create DILP, it is implied that all subsequent processes should have their results set against the output file generated by the Create DILP. If this situation is detected, control passes to Step 38556, Get Real Fref, where the File Reference of the Create DILP output file is acquired from the Control Repository. This File Reference is inserted into the appropriate position in the Bucket and saved for use in later steps.

Next Step 38557 is invoked to Store Results of the Library Process into the Control Repository. This step requires the File Reference number of the file against which the result should be recorded. In all cases except dependant processes of Create DILPs, this File Reference number is contained in the Bucket information. For the aforementioned case, the File Reference was acquired in Step 38556.

Our invention presents a mechanism which enables a process of one type to override the same process of a different type. For example, if the Data Manager defines a process to run as a Post-Process, but also defines the same process to run as a DILP, the mechanism will link them together such that a good result for one will impart a good result on the other. In this example, the processes are referred to as Sister Processes since they are designed to override each other. The most common application of such a mechanism is using a DILP to recover a failing Post-Process. This improves efficiency by eliminating the need to re-library the file just for purposes of initiating the Post-Process a second time.

Step 38558 will determine if there are any Sister Processes define for the current Library Process. There are two ways Sister Processes can be denoted. The first is via the Library Process itself. The API permits the LP author to specify a Sister Process directly. If the LP does not specify any Sister Processes, the algorithm will automatically look for a matching DILP if the current process is a Post, or a matching Post if the current process is a DILP. If any of these conditions are true, Step 38557 is again employed to Store the Process Results against the Sister Process.

Figure 15I:
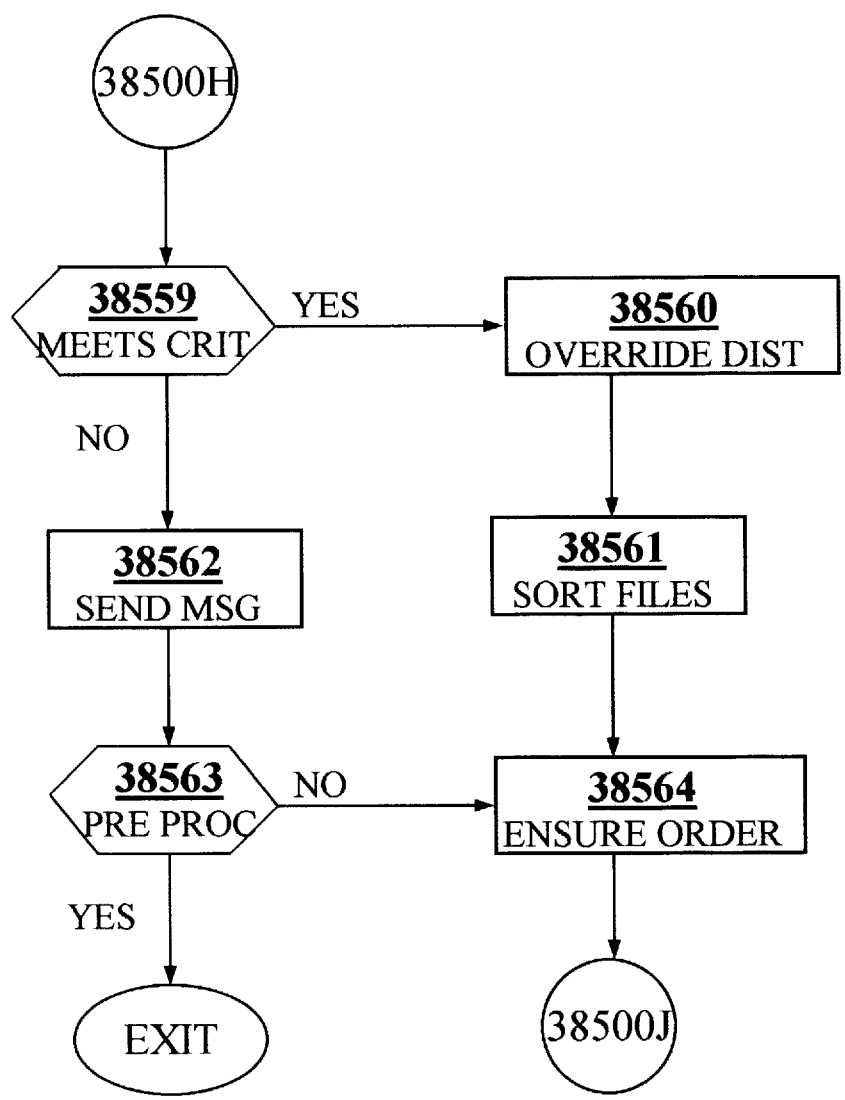

At this point control proceeds to Step 38559, Meets Criteria in FIG. 15*i*, where the process results are compared against the predefined criteria. This criteria can be any complex boolean expression. Our preferred embodiment allows the Data Manager to define an "optional" process by using the equivalent boolean expression of <boolean expression for result> OR RESULT="%". The DMS will interpret this as "the process meets criteria if any recorded result satisfies the boolean expression for the result OR if no result exists at all. This, in effect, makes the process optional since all new files begin with empty process results. In Step 38559 the process is tested against the criteria. If the process Meets Criteria, control is passed to Step 38560. If not, Step 38562 is employed to Send an Error Message to the user.

If the current process is a Pre-Process of a promote request, then the test in Step 38563 is true and the program terminates. This is because ALL Pre-Processes must satisfy the criteria in order for the promote request to continue. A failing Pre-Process will cause a failing Done file to be sent to the ALM who initiated the process. Eventually control will return to the Promotion algorithm where the promote will cease. For any type of process other than a Pre-Process, the algorithm proceeds with Step 38564, Ensure Order.

Returning to Step 38560, Override List, the program checks to see if any special disposition instructions were returned by the LP. The LP API permits the author of an LP to specify exactly where any output should be installed into the DMS. This may not match the default results disposition defined by the Data Manager. If this is the case, the program will use the disposition instructed by the LP.

Step 38561, Sort Files, is designed to improve efficiency by maintaining one overall list of files to be disposed of into the DMS. As the algorithm loops through each process in each Bucket, it adds new output files to the list. Since it's possible for a multiple processes to produce the same output file, Step 38561 is careful not to include duplicates. This improves efficiency by not wasting time installing the same file twice.

Control ultimately arrives at Step 38564, Ensure Order. In this routine, the algorithm looks for an Aggregate Install where a large group of files need to be deposited into the DMS. Our invention permits a special type of install where one file in the group is designated the Anchor and the rest are Components. The Anchor undergoes the same install procedure as regular files, but the components use a special high performance install procedure. Since the Process Manager guarantees that all components are derived from the same source and subjected to the same criteria checks as the Anchor, this high performance install is permitted to skip some of the checking in lieu of performance. The LP author can request use of this special installation procedure through the LP API. Step 38564 will detect this request and ensure that the Anchor file is always disposed of immediately, and ahead of, any related components.

Figure 15J:
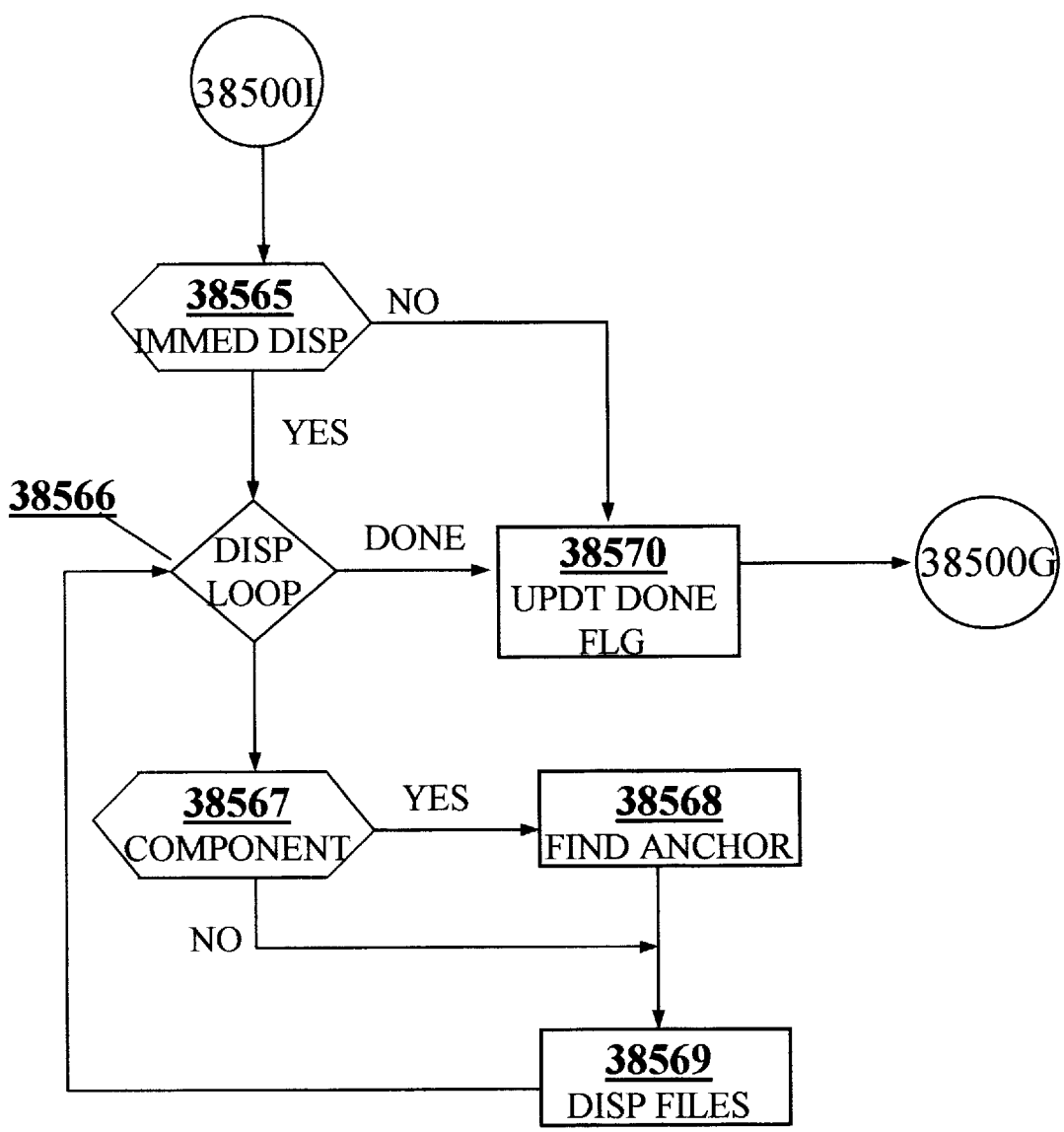

At this point control proceeds to Step 38565 of FIG. 15*j* where the output from the LP is examined to see if it requires Immediate Disposition. The Library Process API permits the LP author to indicate that the output must be deposited into the DMS before any subsequent LPs can be initiated. This is frequently the case if a string of dependent processes exist where the output of one process is used as input to the next. This step will automatically test positive if an Aggregate Install was detected in Step 38564 because this requires the Anchor file to be disposed of immediately. It will also test positive if the current output file is from a Create DILP, since that output may be used as input to subsequent processes. The Create DILP scenario requires the file name and PFVL of the newly created file to be written into a special file along with the Process and Log Reference numbers and the process result. This file is referenced by the Install algorithm in the Library Manager in order to properly dispose of the file and set the process result.

If Immediate Disposition is required, Step 38566 is employed to establish a Disposition Loop. This allows the algorithm to handle LPs which produce multiple output files.

Next, Step 38567 tests for any Components to be installed into the DMS. If so, Step 38568 is employed to Find the Matching Anchor file. If one can't be found it's an error, and the program terminates with a message being sent to the user. If the matching Anchor file is found, a list is made of all the Components associated with that Anchor. This list is used by the high performance install procedure in the next step. In addition, all the components are removed from the overall disposition list which improves efficiency by reducing the number of passes required through the Disposition Loop.

The last step in the loop is Step 38569, File Disposition. This step first determines the type of disposition. There are six types of dispositions:

Regular Install

Deposits the output into the DMS under full data control. The output file may or may not be assigned a File Reference number and completely tracked by the Control Repository. Once installed, the file can be processed like any other file in the DMS. The install can be immediate, whereby the install is initiated and further processing suspends until it completes, or the install can be delayed which means further processing may continue while the Library Manager processes the install request.

High Performance Install

Similar to a Regular Install, except it deals with groups of component files. This occurs during an Aggregate Install which always begins with an Anchor file undergoing a Regular Install, followed by all the related components undergoing a High Performance Install. The information necessary to install the group of files is conveyed through a special file created in Step 38567. This type of install is always delayed.

Create DILP Install

Used only on the output file of a Create DILP. This install is identical to a Regular Install with some additional steps that assign the process result to the output file once it's safely in the DMS. The necessary information is passed to the Install algorithm through a special file created in Step 38565. This type of install is always immediate.

Regular Store

Deposits the output into the Data Repository, but the file is not tracked by the Control Repository. These files exist for some other reason than data management, and don't require any DMS operations (promote, library processing, problem tracking, etc.). This type of disposition can be immediate or delayed.

Send

Simply forwards the output to the designated electronic address. The output is not libraried in any repository. Usually the output is in the form of a notification that something occurred during the Library Process.

DILP

Permits the output of one Library Process to be used as input to initiate a DILP on another ALM. The LP author can specify the Library Process which should be initiated. Rather than depositing the current output into the DMS, the Process Manager will use it as an input file to launch a DILP request to the specified ALM. The target ALM will receive the request as if it has been initiated by a user in the normal fashion.

Regardless of the type of install, the code first checks to ensure no lock other than a processing lock exists on the file. This interlock mechanism ensures a particular file is always processed in order if, for example, it is in the process of being promoted while an LP is initiated to update it. Next, an Install Request file is created which contains the target Level and Version, the name and type of the file being installed, the userid for whom the request is servicing, a checksum, the Level Reference number and all Source Reference numbers.

If an immediate install is requested, the Process Manager will determine if the current ALM is capable of performing the install. If so, the Install Algorithm described in the Library Manager disclosure # PO996-0010 is executed, and control will eventually return to Step 38569. If an error occur during the install, a message is sent to the user and the program terminates. If the current ALM is unable to perform installs (ie. a Remote Execution Machine in a Conventional System), then a processing lock is set to indicate an outstanding install request. The install request file is then forwarded to the responsible ALM along with any special files such as those needed for Create DILPs or High Performance Install. It is sent with the highest priority so the receiving ALM will service it ahead of all other Promotes or new job requests. In the meantime, the algorithm adds the output file to the dependency list, rewrites the Job File, and recirculates the request. The current ALM will continue receiving the request and executing Steps 38540 and 38541 in FIG. 15e until the dependency list clears the Process Queue.

Steps 38567 thru 38569 are repeated until all output files from the Library Process are disposed of. Control then passes to Step 38570 to Update the Done Flag in the current Bucket. If the request needs to be circulated again after this step, the algorithm will not rerun the current process. Control proceeds to the top of Step 38544, Process Loop, in FIG. 15g until all processes in the current Bucket have been completed.

Figure 15K:
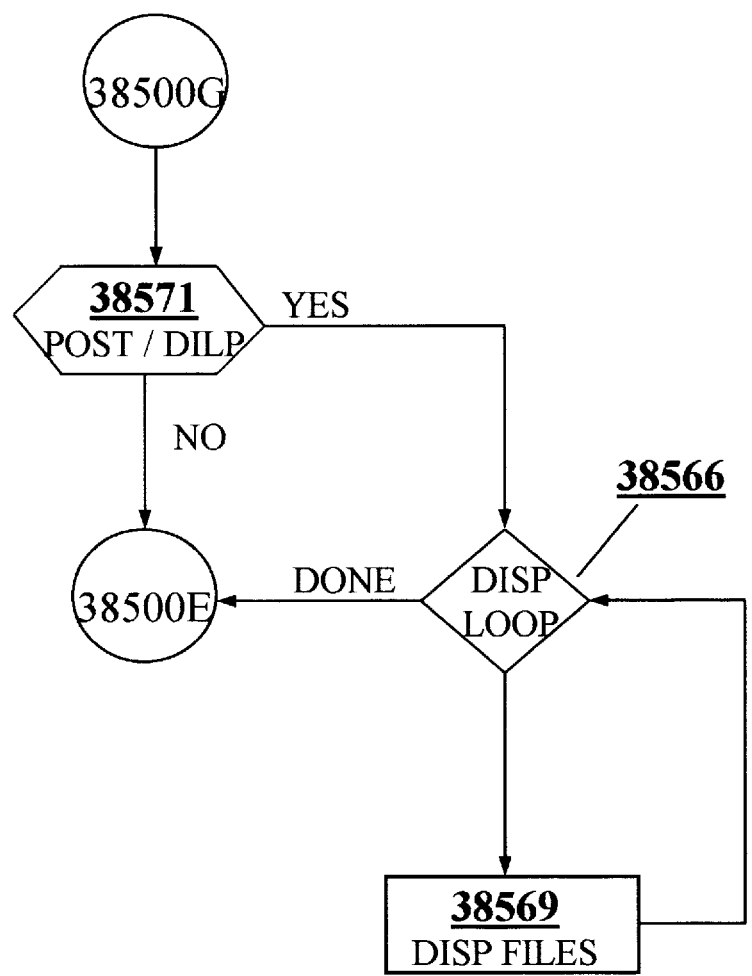
Figure 15I:
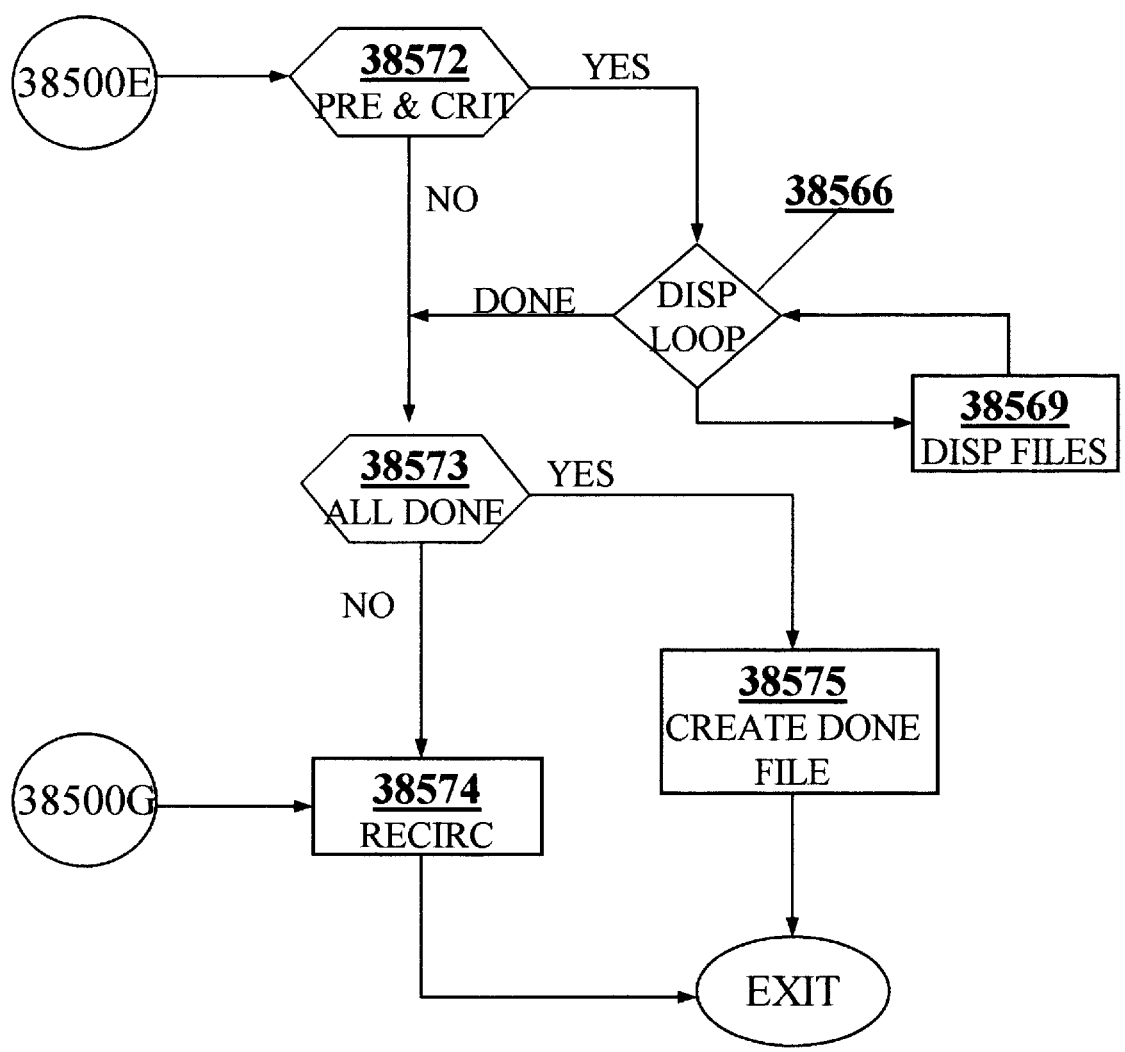

Upon completion of the Process Loop, control passes to Step 38571 in FIG. 15k. If the current request is a Post-Process or a DILP, Step 38566 and 38569 will be invoked to deposit the output from all the processes in the current Bucket. Different Buckets in a Post-Process or DILP are independent of each other, and their output will be disposed of as the Bucket completes.

However, if the process is a Pre-Process, control returns to the Bucket Loop, Step 38510, in FIG. 15e to ensure ALL processes in ALL Buckets are executed successfully. This is a prerequisite for promotion to the next level. Once all Buckets are exhausted, Step 38572 in FIG. 15l is invoked to see if the current request is a Pre-Process and Each Process Meets Criteria. In this case, Steps 38566 and 38569 are employed to deposit all output files into the DMS. Otherwise, if any criteria is not satisfied, no time is spent installing the output since the promotion is destined to fail. Once all output is either deposited or sent to the appropriate ALM to be deposited, Step 38573 is invoked to check if the current job is All Done. This entails checking for any pending installs and ensuring no process failed criteria. In this case, the request needs to be Recirculated in Step 38574 until the pending installs complete and the Process Manager can ensure all processing is complete for this job. Step 38574 rewrites the Job File with all updated Bucket information, install dependency lists, error messages, etc.

Once all processing completes, Step 38575, Create Done File constructs a Pre-Done or Post-Done file depending on the type of request. The file consists of header information similar to the initial request, the return code, the number of files being processed, and a list of the files. If the current ALM is an Actor in an Actor/Object environment, or the Master ALM in a conventional system, then the control will be passed to Step 38508 in FIG. 15a where the Done file will be processed based on the type. On the other hand, if the current ALM is a Remote Execution Machine, the Done file is transmitted to the Master ALM.

Returning to Step 38508 in FIG. 15a, the algorithm is identical whether the Done file is generated locally or transmitted from a Remote Execution Machine. If Step 38508 determines that the Done file is a Pre-Done, control proceeds to Step 38576 in FIG. 15m. Otherwise it will be handled by Step 38576 in FIG. 15n.

Figure 15M:
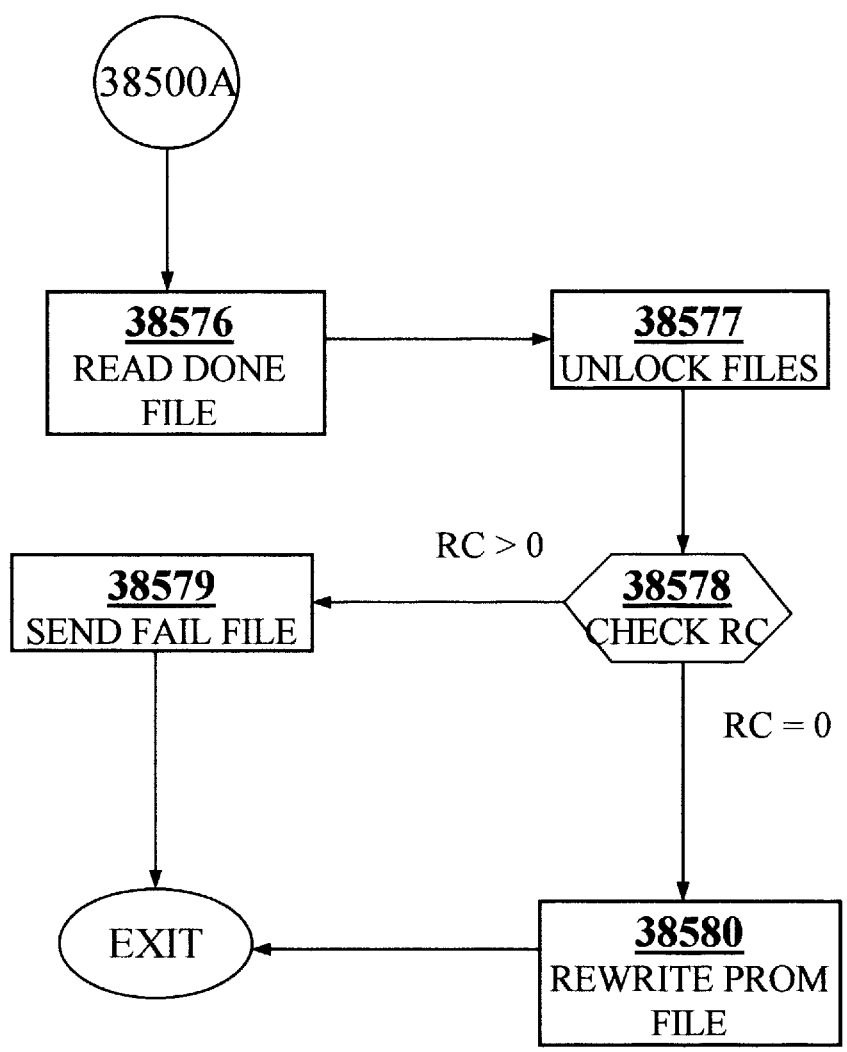

FIG. 15m begins with Step 38576, Read Done File. Here the contents of the Done file are read into a data structure. Next, Step 38577, Unlock Files, resets the Overlay locks that were set in Step 38520 in FIG. 15c. Control proceeds to Step 38578, Check RC, which reads the result contained in the Done file. If it's non-zero, the processing failed, and Step 38579 is invoked to Send a Failure File to the user. However, if the result is zero, then Step 38580 is employed to Rewrite Prom File. The algorithm regenerates a new promotion request and adds the File Reference numbers to the list of files. In either case, control is returned to the promotion algorithm in the Library Manager.

Figure 15N:
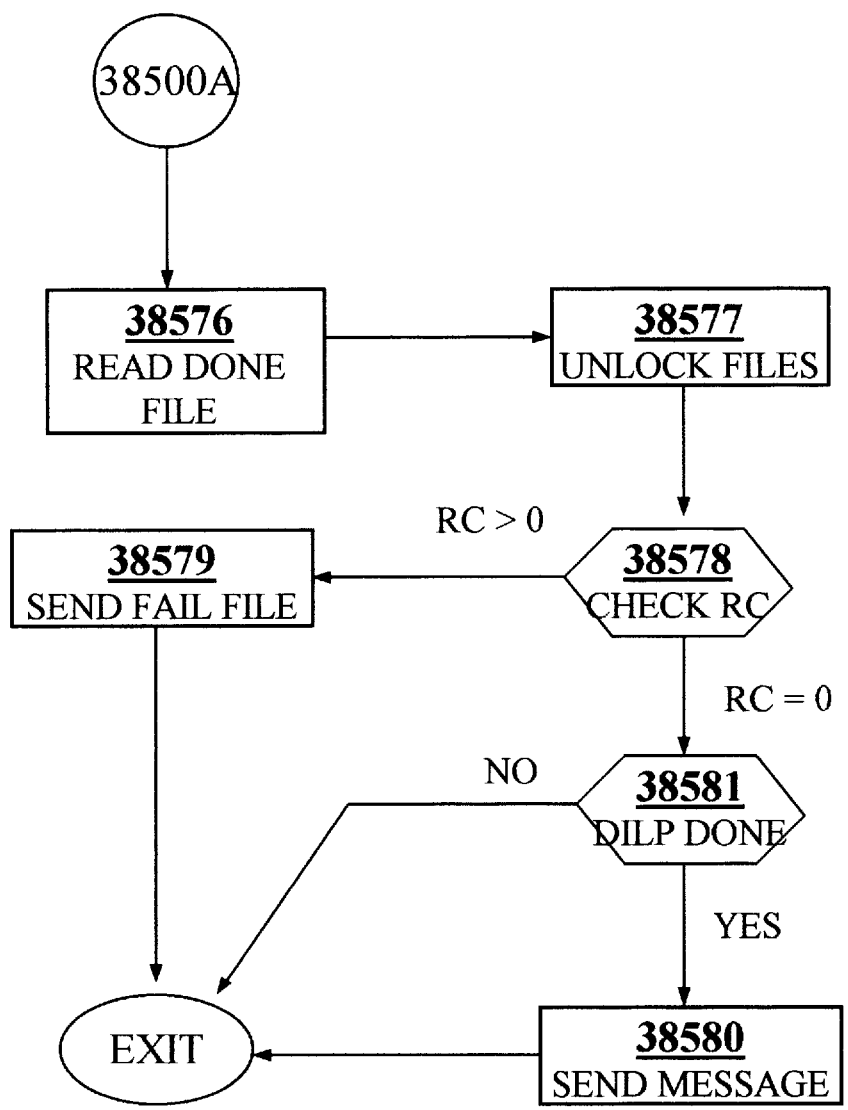

FIG. 15n is very similar to FIG. 15m. It also begins with Step 38576, Read Done File. Here the contents of the Done file are read into a data structure. Next, Step 38577, Unlock Files, resets the Overlay locks that were set in Step 38520 in FIG. 15c. Control proceeds to Step 38578, Check RC, which reads the result contained in the Done file. If it's non-zero, the processing failed, and Step 38579 is invoked to Send a Failure File to the user. However, if the result is zero, then Step 38581 is employed to check for a DILP-Done. In the case of a DILP, the user is notified that the process completed successfully via Step 38580, Send Message. Successful Post-Processing does not result in any notification since lack of a Failure notice implies the file will be allowed to promote to the next level.

At this point, the Library Process complete and the Process Manager returns control to the originator which is always the promotion algorithm in the Library Manager or a user.

In addition to regular Library Processes which are always executed and recorded in a controlled environment, our invention supports another type of process known as a Pseudo process. Pseudo processes can be used as promotion criteria or simply as informational indicators. They have criteria like regular processes, but they do not represent programs, third party tools, or any type of executable task. Instead they are pieces of data associated with a Package, Version, Level and Filetype and recorded for a specific file in the DMS. An important and powerful feature is that the Level of the Pseudo process does not have to be the same level where the file resides. For example, if a file is at Level A and runs a process which calculates a piece of data, Pseudo Processes can be used to store that result at Level B. Eventually, when the file reaches Level B, that result can become promotion criteria. Since the level of the Pseudo can be different from the current level of the file, we call this Level Independent Pseudo Processes.

Figure 17:
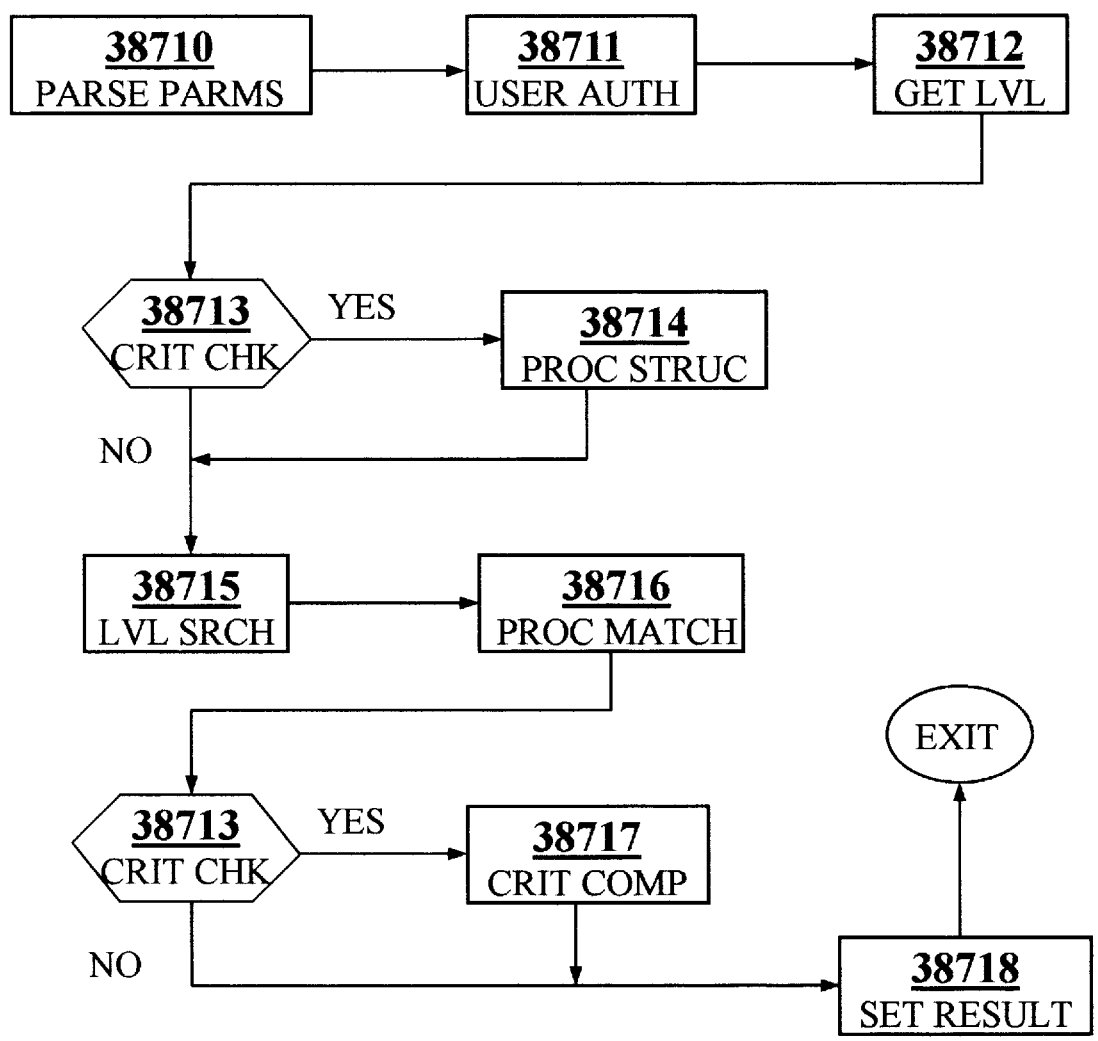
FIG. 17 diagrams the detailed algorithm for setting Level Independent Pseudo Process results into the Control Repository.

Our invention offers a utility specifically designed to set these Level Independent Pseudo Process results. It can be invoked from a command line by a user, or from any third party tool including Library Processes. The algorithm is illustrated in FIG. 17 and begins with Step 38710, Parse Parms. The utility requires the process and file information which can be any combination of process name or Process Reference number and file name of File Reference number. The invocation must also supply the result to be recorded and our interface also allows an optional 120 character message or comment. If the user elects to use a process name, the name is checked to ensure it's a Pseudo process and not a regular process. Our preferred embodiment requires Pseudo processes to begin with an "*" in the first character. Assuming it's a valid Pseudo process name, the Control Repository is queried to ensure a process by that name is defined for that Filetype in that Package. Otherwise, if a Process Reference number is provided, a Log Reference number must also be present. The Control Repository is checked to ensure it's a valid Process/Log Reference pair and that the pair describes a Pseudo process. The checks for the file information are similar. If a File Reference is provided it's checked to ensure it's valid. Otherwise,the Control Repository is asked to return the File Reference number corresponding to the given file name. The supplied file name must include Package, Version, Filetype and Level as well as the name.

If all checks in Step 38710 are passed without error, control proceeds to Step 38711, User Authority. If any error is encountered anywhere in the algorithm, the program terminates with an appropriate error message. In Step 38711, the Control Repository is queried to ensure the user has the proper authority to set Pseudo process results. This authority is granted by the Data Manager using our Data Management Configuration Utility.

Immediately following Step 38711, Step 38712, Get Level, is invoked to Acquire the Level and Version for the current File Reference number. The Level and Version where the file currently resides will be referenced throughout the remainder of the algorithm.

Step 38713 determines whether a Criteria Check is necessary. This is an option requested during invocation of this utility. If so, Step 38714 is employed to query the Control Repository to return all criteria information for all processes in this Package at this Version. Along with the actual criteria are the corresponding Process and Level Reference numbers which are all stored into a Process Data Structure. Control eventually moves to Step 38715 where a Level Search is performed using the current Level as the starting level. All levels returned by the repository excluding frozen release levels, are saved into a level list. Next, Step 38716 is employed to find all the Matching Processes at or above this level. This is accomplished by querying all processes for this Filetype and Package, and matching Process Names and Level Reference. numbers returned from the Control Repository against the desired Process Name and the level list. Any process that matches are kept in a "hit" list.

Step 38713 is again employed to test if a Criteria Check is required. If so, Step 38717, Criteria Compare is invoked. Here the Process Reference number from the hit list is compared against the Process Reference numbers in the criteria data structure from Step 38714. For each process that matches, the criteria expression is evaluated and the current result is tested. If the result fails the criteria for a process defined at any level, the program terminates with a message sent to the user.

Once all occurrences of the process at the various levels has been checked against the criteria (if so ordered), the Control Repository is queried to set the result. This algorithm works fine for a small number of results that need to be recorded. However, there are times when a large number of Pseudo process results need to be recorded either for the same file or a large group of files. Our invention provides a high performance option which allows the invocation to pass is an infinite list of quads, where a quad consists of process information, file information, a result, and an optional message or comment. The process and file information can be the same combination as previously described. Each quad is separated by a special delimiter.

The same algorithm applies when this high performance option is used, but some extra steps are taken in the interest of performance. Each quad is treated as a separate invocation of the utility whereby Steps 38710 thru 38717 are repeated in a Quad Loop. The difference is any step which queries information from the repository also caches it into a local data structure. Thus, if another file with the same Package, Version, Level and Filetype appears in a later quad, or the same process appears in a later quad, the information can be acquired from the data structure. Once Steps 38710 through 38717 is executed successfully for all quads, a special query is made to the Control Repository in Step 38718 which passes the results for all quads in a single call.

Once a result has been recorded in the Data Management System, our invention offers a utility to view and edit process results. The interactive screen is shown in FIG. 18, and it's almost identical to the Library Process Exception screen in FIG. 16. It contains fields 38211 through 38214 which are supplemented by drop down menu buttons 38217 thru 38219 exactly like FIG. 16. Field 38215 and button 38220 are also identical in operationto FIG. 16 even though the field name is expanded to specifically denote the File Level. The bottom of the screen offers radio buttons 38826 to choose the type of process results, Pre, Post, DILP or Foreground. The only difference on this screen is the addition of field 38824, Process Level with supporting drop down menu button 38825. This screen must offer a means for the user to signify the Level where the file should be located and the Level where the process resides. Since the file moves through various levels, it may be necessary to view results from a level where the file no longer resides. Our preferred embodiment uses the level in field 38215 as a starting library level to perform a library search for the file. The user is then told where the file is located. Field 38824 must be entered correctly, as no level search will be done for processes.

Upon hitting enter, the algorithm finds the closest file to the level specified in field 38215 and attempts to retrieve all processes of the type chosen in field 38823 and at the specified Process Level in field 388 The list of processes with their current results are displayed on a subsequent screen. If the user has the proper authority, our invention permits Pseudo Process results to be edited on this screen. The user may actually change a current value and save it back into the Control Repository. A message is automatically recorded indicating a manual override of the Pseudo process result. This operation is never permitted for regular process results.

To support these processes the Library Manager maintains the following tables in the Control Repository.

CRI_EXCEPTION_LOG
CRI_EXCEPTION_LOG - Log of changes to Criteria table

| Column | Description |
| --- | --- |
| REF | |
| REASON | Reason for log entry |
| USERID | User causing entry |
| DATE | Date of log entry |
| TIME | Time of log entry |
| FILEREF | Pointer to file for which there is an exception |
| FILENAME | Name of file for which there is an exception |
| LIBTYPE | Library filetype of file for which there is an exception |
| LEVEL | Level of file for which there is an exception |
| VERSION | Version of file for which there is an exception |
| PROCESS_REF | Process reference for which there is an exception |
| PROCESS_NAME | Process name for which there is an exception |

TABLE 3

CRITERIA
CRITERIA - Promotion criteria

| Column | Description |
| --- | --- |
| REF | |
| LEVEL_REF | Pointer to level |
| PROCESS_REF | Pointer to process |
| OBSOLETE | Y if this process is obsolete |
| EXPRESSION | Expression to interpret result |

TABLE 4

CRITICAL_EXCEPTION
CRITERIA_EXCEPTION - Criteria exceptions

| Column | Description |
|---|---|
| REF | Reference |
| PROCESS_REF | Pointer to process for which there is an exception |
| PROCESS_LOG_REF | Pointer to process log reference for which there is an exce |
| LEVEL_REF | Pointer to level for which there is an exception |
| FILE_REF | Pointer to file for which there is an exception |
| LOG_REF | Pointer log entry |

TABLE 5

CRITERIA_LEVEL
CRITERIA_LEVEL - Join of CRITERIA and LEVELS tables

| Column | Description |
|---|---|
| CRI_REF | Pointer to Criteria entry |
| LVL_REF | Pointer to level |
| PROC_REF | Pointer to process |
| EXPRESSION | Expression to interpret result |
| PACKAGE | Package id |
| FILETYPE | Library file type |
| LEVEL | Level id |
| VERSION | Version |

TABLE 6

CRITERIA_LOG
CRITERIA_LOG - Log of changes to Criteria table

| Column | Description |
|---|---|
| REF | Reference number |
| CRITERIA_REF | Reference nubmer of criteria being logged |
| REASON | Reason for logging, A-Add, D-Delete, M-Modify |
| LEVEL_REF | Pointer to level |
| PROCESS_REF | Reference number of process being logged |
| OBSOLETE | Y if this criteria is obsolete |
| USERID | Userid of person making change to Criteria table |
| DATE | Date Criteria entry was changed |
| TIME | Time Criteria entry was changed |
| EXPRESSION | Expression to be evaluated |

TABLE 7

CRITERIA_PROCESS
CRITERIA_PROCESS -

| Column | Description |
|---|---|
| CRI_REF | |
| PRO_REF | |
| EXPRESSION | |
| LVL_REF | |
| LOG_REF | |
| POSITION | |
| PROCNAME | |

TABLE 8

PROCESS
PROCESS - Automatic Processes

| Column | Description |
|---|---|
| REF | Reference number |
| LEVEL_REF | Point to level |
| LOG_REF | Pointer to process long entry - used for consistency check |
| OBSOLETE | Y if this process is obsolete |
| NEXT | Pointer to next process in sequence |
| POSITION | B before promote, A after promote, F foreground, P sometime after |
| DEFER | Y process invocation can be deferred |
| ASYNCH | Y if this process is asynchronous |
| PROCNAME | Process name |
| OVERIDES | Parameter list overides |

TABLE 9

PROCESS_DEF
PROCESS_DEF - Process Definitions

| Column | Description |
|---|---|
| REF | Reference number |
| PROCNAME | Process name |
| COMMAND | Process Command |

TABLE 10

PROCESS_DEF_LOG
PROCESS_DEF_LOG - Log of changes to Process definition table

| Column | Description |
|---|---|
| REF | Reference number |
| REASON | Reason for log entry, ADD, DELETE, MODIFY |
| USERID | Userid making change to the Process definition table |
| DATE | Data Process definition entry was changed |
| TIME | Time Process definition entry was changed |
| PROCDEF_REF | Pointer to process definition being logged |
| PROCNAME | Process name |
| COMMAND | Command line |

TABLE 11

PROCESS_LEVEL
PROCESS_LEVEL -

| Column | Description |
|---|---|
| REF | Reference number |
| LEVEL_REF | Pointer to level |
| POSITION | B before promote, A after promote, F foreground, P sometime after |
| DEFER | Y process invocation can be deferred |
| ASYNCH | Y if this process is asynchronous |
| NEXT | Pointer to next process in sequence |
| LOG_REF | Pointer to process log entry - used for consistency check |
| PROCNAME | Process name |
| OVERIDES | Parameter list overides |
| PACKAGE | Package id |
| FILETYPE | Library file type |
| LEVEL | Level id |
| VERSION | Version |

TABLE 12

PROCESS_LOG
PROCESS_LOG - Log of changes to the Process table

| Column | Description |
|---|---|
| REF | Reference number |
| REASON | Reason for log entry - ADD, DELETE, MODIFY |
| USERID | Userid of person making change to Process table |
| DATE | Date Process entry was changed |
| TIME | Time Process entry was changed |
| PROCESS_REF | Pointer to process being logged |
| LEVEL_REF | Pointer to level |
| OBSOLETE | Y if this process is obsolete |
| NEXT | Pointer to next process in sequence |
| POSITION | B before promote, A after promote, P sometime after promote |
| DEFER | Y process invocation can be deferred |
| ASYNCH | Y if this process is asynchronous |
| PROCNAME | Process name |
| OVERIDES | Parameter list overides |
| RESULTS_SAVED | Y Results saved on modify |

TABLE 13

PROCESS_NAME_LOG
PROCESS_NAME_LOG - Process Name Log

| Column | Description |
|---|---|
| REF | Reference number |
| REASON | Reason for log entry |
| USERID | Userid causing entry |
| DATE | Date of entry |
| TIME | Time of entry |
| NAMEREF | Reference number of process name entry |
| PROCNAME | Process name |
| AUSERID | Authorized userid |

TABLE 14

PROCESS_NAMES
PROCESS_NAMES - Process Names

| Column | Description |
|---|---|
| REF | Reference number |
| NAME | Process name |
| USERID | Userid authorized to add and delete process |

TABLE 15

PROCESS_QUEUE
PROCESS_QUEUE - MVS Process Queue

| Column | Description |
|---|---|
| REF | Reference number |
| PROCREF | Pointer to process |
| FILEREF | Pointer to file |
| LOGREF | Pointer to log entry |
| LOCKREF | Pointer to lock entry |
| ACTION | MVS Action |
| FILENAME | CMS filename |
| FILETYPE | CMS filetype |
| MAXTIME | Maximum allowable process time in hours |
| DATE | Date this entry was created |
| TIME | Time this entry was created |

External Data Control

Figure 19:
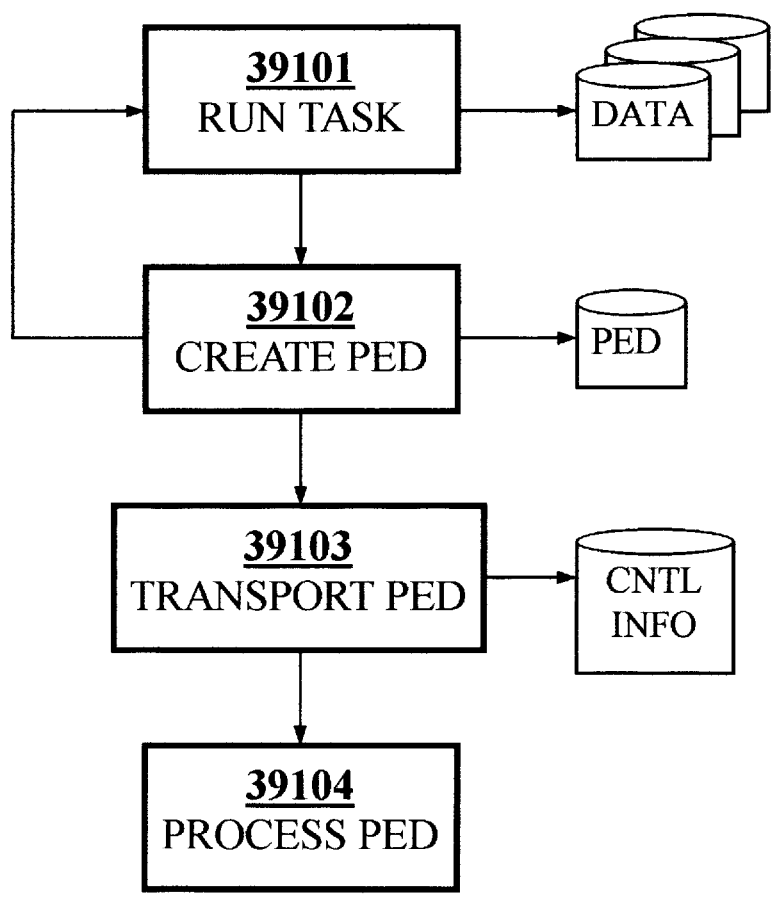
FIG. 19 shows the overall flowchart for External Data Control.

Our invention allows users of the Design Control System to record the results of tasks performed outside of the DMS through the use of External Data Control. The advantage is the user can perform the tasks as often as necessary until desirable results are produced. These results, along with the files that produced them, are then libraried and recorded in the control repository. Although the tasks are performed outside of a controlled environment, our invention maintains data integrity throughout the entire process. The preferred embodiment shown in FIG. 19 consists of four main Steps. In Step 39101 the user runs a task in the usual manner. The task could be a checking program which operates on some input and only produces a result as output, or the task could be the automatic generation of some output data that needs to be tracked by the DMS. If the output fails, or is in some way undesirable, the user can make as many updates as necessary to rectify the problem.

Steps 39102 through 39104 essentially package the tasks results with the data, transport them to the Library, and store them into the DMS. During the entire process, interaction takes place with other routines within the Process Manager, as well as various routines in our Aggregation Manager, Problem Fix Manager, Authority Manager, and Library Manager facilities.

Step 39102 in FIG. 20 can be run each time Step 39101 is executed, or optionally under the control of the user. In Step 39102, the task from Step 39101 creates a Pedigree or PED file. This file holds all the control information necessary to transport the files to the library, record the results in the Control Repository and maintain data integrity. The main components of a PED file are the Header Record, the Member Records, the Results Records, the Support Records and the Master Pedigree Record.

FIG. 20 illustrates an example of a PED file. This example shows 8 tokenized records. Record 39201 must be the Header Record which consists of 3 tokens. The first is an "H" to indicate it's the header record. The second is the filetype that would be used to create a Bill of Materials in the library, if a one is desired. The third token is used to determine the type of BOM if one will be created. Possible values are FULL, INC (for incremental) or NONE. Records 39202 thru 39204 are the Member Records which always begin with an "M" as the first token. The number of member records depends on the task that is executing. There is one record for every input and output file that will be libraried. The second token of a Member record is the actual filename. In a network environment, this is the full path name since input and output files may be scattered across multiple directories. The third token is the library filetype which may not be obvious from the filename. Since the DMS requires that all data be uniquely identifiable by Package, Filetype, Version, and Level (PFVL), the filetype must be determined during PED creation. The fourth token is the BOM Member Type. Possible values are "A" for Anchor file, "I" for Input file, "O" for Output file and "S" for Support file. If the process requires a BOM to be created, the Member records contain all the necessary information. The fifth token is the File Identification Code (FIC). In our preferred embodiment, a Cyclic Reduncany Check is used as the FIC, but any available algorithm that assigns unique identifiers to files, based on their contents, could be used. Record 39205 of the PED file in FIG. 20 is the Result Record. It contains an "R" as the first token. The second token is the name of Process within the Control Repository where the result should be recorded. The third and fourth tokens contain the filename and library filetype of the file for whom the process result should be associated with. The fifth token is the actual result and must be in a form that the Control Repository can accept. Records 39206 and 39207 are Support Records whose first token is always a "K". These are important files that are used in the task, but won't be transported to the library. The most frequent examples are executables, binaries, technology and rules files. These records are simple in format. Besides the first token, the second token is the name of the file, and the FIC is the third token. The last record, record 39208 in FIG. 20, is the Master Pedigree Record. It's denoted by a "P" as the first token. The second token is the filename of the Pedigree file and the third token is the library filetype of the PED file. The fourth token is a special FIC. Aside from the first record being a Header record, the remaining records can be in any order. In our preferred embodiment it is desirable to have the Master Pedigree Record as the last record to simplify the special FIC creation.

In order to assure complete data integrity, all files listed in the PED must have File Identification Codes to ensure the files used in the task in Step 39101 remain unchanged when the result is recorded in the Control Repository. In addition, the PED file itself is given a FIC to ensure the PED file does not change during the interim period. This FIC is stored in the "P" record.

The actual creation of the PED is closely associated with the task performed in Step 39101. The contents of the PED are determined by the type of process being run. Depending on the process and the environment, the PED may be created by the process itself, or it may be created by external code which is executed after the process completes. This code could be written in any language. In a typical automated design environment, tasks are launched from within a frame work. Usually these frameworks offer a script or batch language which can be used to launch the task, and capture all the information necessary to create the PED file.

Step 39103 of the External Data Control method is the act of transporting the PED and all associated data to the Design Control System in a controlled manner. This user may invoke this Step immediately after, or long after, the PED is created in Step 39102. If the delay is substantial, the chances of a data integrity violations increase. Step 39103 is employed by the algorithm illustrated in FIGS. 21a and 21b. Turning our attention to this algorithm, we see 14 major Steps which must be executed. The algorithm can be written in any high level language such as "C" or Rexx, and it must be capable of communicating with the Design Control Repository.

Figure 21A:
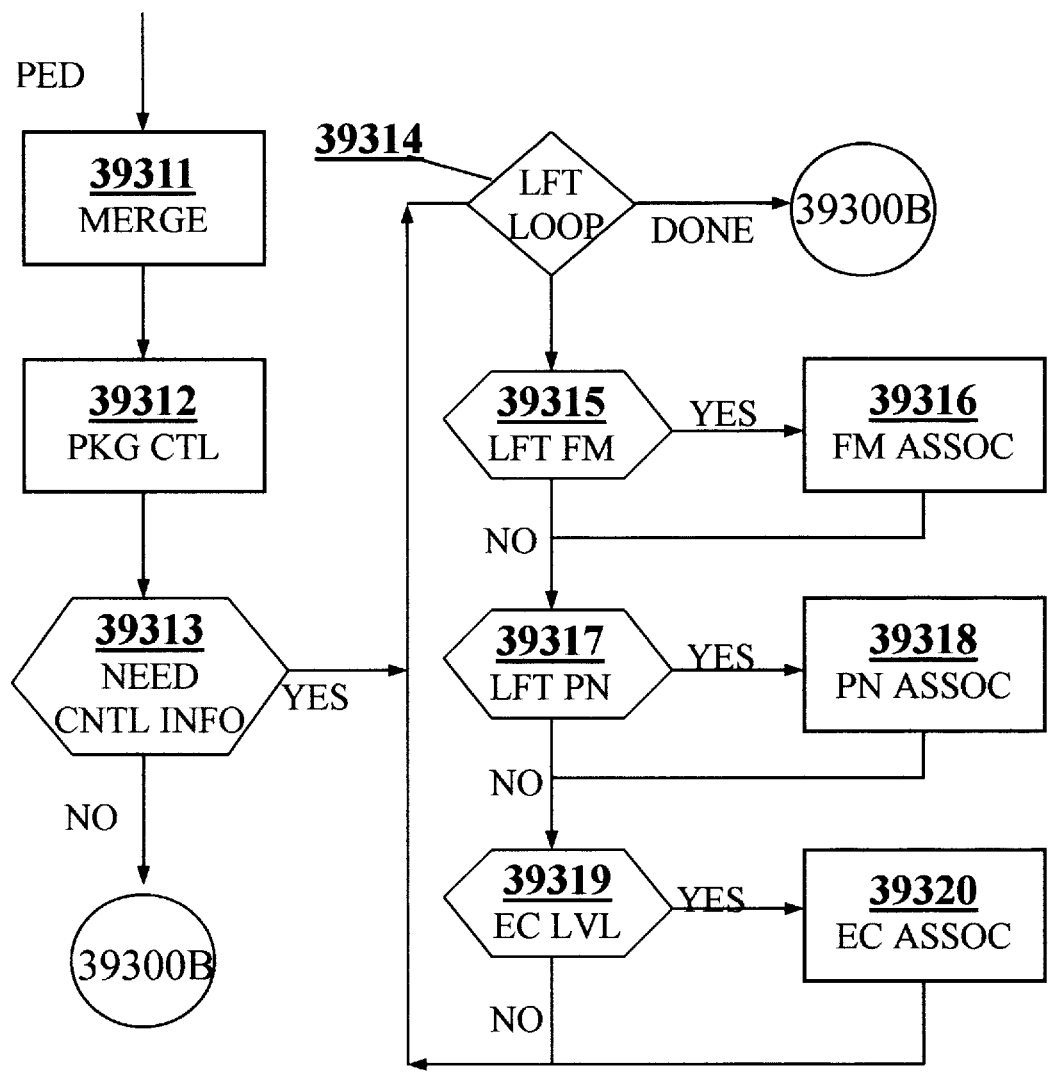
FIG. 21 diagrams the algorithm for transporting a PED file.

The user begins by invoking the program which executes the algorithm. In our preferred embodiment, the file name of a PED is a parameter passed to the program. The first Step, 39311 in FIG. 21a, is the Merge Step. The preferred embodiment permits the user to repeat Steps 39301 and 39302 of FIG. 20 using different tasks. This may result in multiple PED files being created. Step 39311 begins by presenting a selection list of all PEDs found in the current directory or the search path. Upon selecting the PEDs to be transported, the program requires the Package, Version and Target Level of the PED. The program may be able to determine the Package and Version from the file name, but the Target Level is requested from the user. Upon entering this information, the program detects whether more than one PED was selected. If this tests "true" then a merge process takes place in the following way:

1. Each PED is read and the Pedigree ("P") records are discarded.
2. The remaining records are written into a temporary file.
3. The originally selected PEDs are "backed up" by renaming them.
4. The new merged PED is renamed from the temporary file name to the original file name supplied at the beginning of Step 39311.
5. A File Identification Code is generated for the new merged PED file and inserted as a "P" record in the PED.

In Step 39312 the program queries the Design Control Repository for Package Control Information This query can be as simple as reading the information from a file if the Control Repository is file-based, or it can be a database query. Regardless of the method, the repository must return information about the package regarding Fix Management, Part Number Control and EC Control. The results of these interrogations will determine branching in the next step. It should be noted that Steps 39311 and 39312 can be done in either order since they are independent tasks.

Step 39313 is the decision point where the program must determine whether Control Information is Needed from the user. This is determined by asking the question "is the package under some form of Fix Management, Part Number Control or EC Control"? If any of these tests are true, additional information must be gathered from the user. In the preferred embodiment of our invention these tests consist of examining three flags set in the Package Control Table of the database. If the decision resolves to "yes" the flow proceeds to Step 39314, otherwise it branches to 39321.

Continuing with Step 39314, the program examines all the Member "M" records in the merged PED file, and sorts them by unique library file type. This improves performance by eliminating the need to examine the same flag for multiple files of the same library file type. At this point the program enters an LFT Loopwhich will be repeated for each library file type in the sorted list. Next the program must query the Control Repository for the Fix Management and Part Number flags of each file type in the list. Depending on the implementation, it could be individual queries for each file type, or one large query covering all the filetypes in the list. Once the information (which is usually two flags for each file type) is returned the flow proceeds with Steps 39315 through 39318.

Steps 39315 and 39317 can be processed in either order, and they are used as decision points for Steps 39316 and 39318 respectively. In Step 39315, the program inspects the Fix Management information for the package. If the package is under Single Fix Mode or Engineering Change Mode, then the LFT FM, or Library File Type Fix Management, flag is examined for the LFT being processed. If the flag is on, Step 39316 is invoked, otherwise the program proceeds to Step 39317. In Step 39316, LFT FM Assoc, the program attempts to associate the file being processed with a Problem Fix Number. If the package is under Single Fix Mode, the default Problem Fix Number is associated to the file. If the package is in Engineering Change Mode and the repository already has existing Fix Numbers for that file, they are presented on a user screen. This is usually done with another interrogation of the Control Repository. The user is given the choice of selecting one of the existing ones or entering a new one. If no Fix Numbers exist, the user is prompted to enter a new one.

In Step 39317, the program checks to see if the Part Number Control Level is being crossed by comparing it to the Target Level provided by the user in Step 39311. If the answer is "yes", then the LFT PN, or Library File Type Part Number, flag is examined for each LFT being processed. If the flag is on, Step 39318 is invoked, otherwise the program proceeds to Step 39319. In Step 39318, LFT PN Assoc, the program attempts to associate the file being processed with a Part Number. If the repository already has an existing Part Number for that file, it is presented on a user screen. This is usually done with another interrogation of the Control Repository. The user is given the choice of selecting the existing PN or entering a new one. If no Part Number exists, the user is prompted to select a new one.

Since Steps 39315 through 39318 may be repeated for a large number of files, the Design Control System may be implemented in such a way that the DMS server returns all associated Part Number and Fix Management data for all files being processed with one large query. The client then sifts through the data to find the information necessary to interact with the user. The algorithm states the information that must be obtained from the Control Repository and the user, but permits a great deal of flexibility in the way it is acquired.

Step 39319, EC LVL, is where the program checks to see if the Engineering Change Control Level is being crossed during the transport. This is done by determining if the Target Level entered in Step 39311 is at or above the EC Control Level. If the test resolves to a "yes" answer, the program must perform Step 39320, EC Assoc. Here, it queries the Control Repository for EC information regarding any Problem Fix Numbers and Part Numbers selected or entered in Steps 39316 and 39318. For any Fix Number or Part Number not associated with an EC, the program prompts the user to select an EC from a list of existing EC Numbers or choose a new one.

Note: All queries concerning Problem Fix, Part Number and EC information are discussed in more detail in disclosure # PO996-0008.

Our preferred embodiment employs a client/server environment where it's easy to copy and move files from one physical location to another. Step 39321 in FIG. 21b, Copy Possible, may or may not be an actual in the implemented program. If it is, and the answer is "yes", then program proceeds to Step 39324. On the other hand, if the environment can't accommodate a direct copy of the files, or if the program does give the user a choice (ie. for security reasons) and the answer is "no", then the program should perform Step 39322.

Step 39322, Pack PED, is done to improve performance and data integrity. In this Step, the program attempts to gather all the member files ("M" records) listed in the PED and compress them along with the PED. The actual mechanism for this can be a "tar" operation if the environment is unix, a "packlib" if it's VM, or a "zip" file if it's a pc-based system. Here, the program must check for any restrictions imposed by the compression mechanism (such as not being able to compress files already in compressed form). Any files that can be compressed are stored into a temporary file. Files that can't be compressed are left alone, but remembered for the next Step. Once the compression is complete, the uncompressed PED is erased and the temporary compressed file is renamed to the original PED file name. At this point, the program proceeds to Step 39323.

Figure 21B:
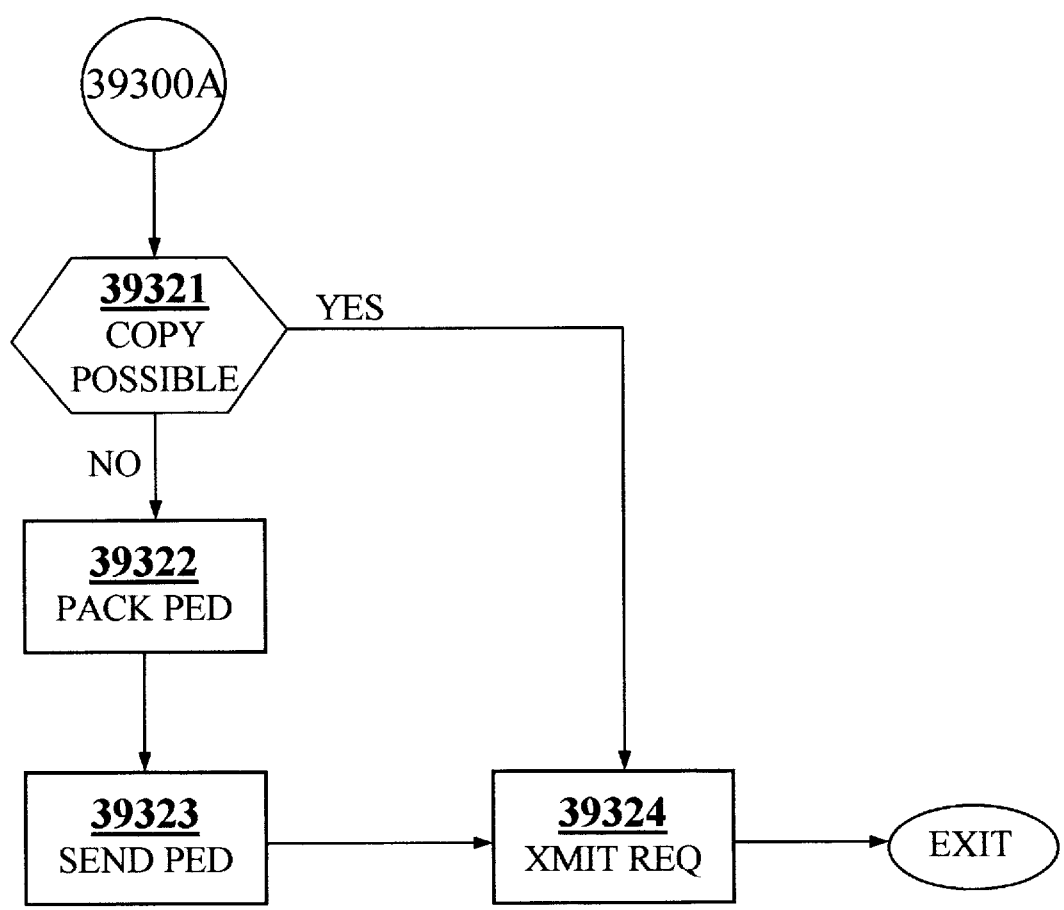

In Step 39323, Send Files, the program sends the compressed PED, and any left over files that couldn't be compressed, to the Design Control System. The final Step in FIG. 21b is Step 39324, Xmit Req. Here, the control information is transmitted to the Design Control System. This information includes:

The file name of the PED

A flag indication whether the files should be copied or received.

The list of any other files that had to be sent.

The Package, Version and target Level information.

All Problem Fix, Part Number and EC information collected from the user.

From this point on, the Design Control System can handle it a number of ways. In the preferred embodiment, External Data Control is used in conjunction with Automated Library Processing. In this type of environment, it's easier to configure the DMS to process the PED file as a library process. Our invention permits an alternate approach whereby no library processing exists in the system, so the processing of the PED is "hard coded" into the DMS. In either case, the algorithm for processing the PED file applies.

Figure 22A:
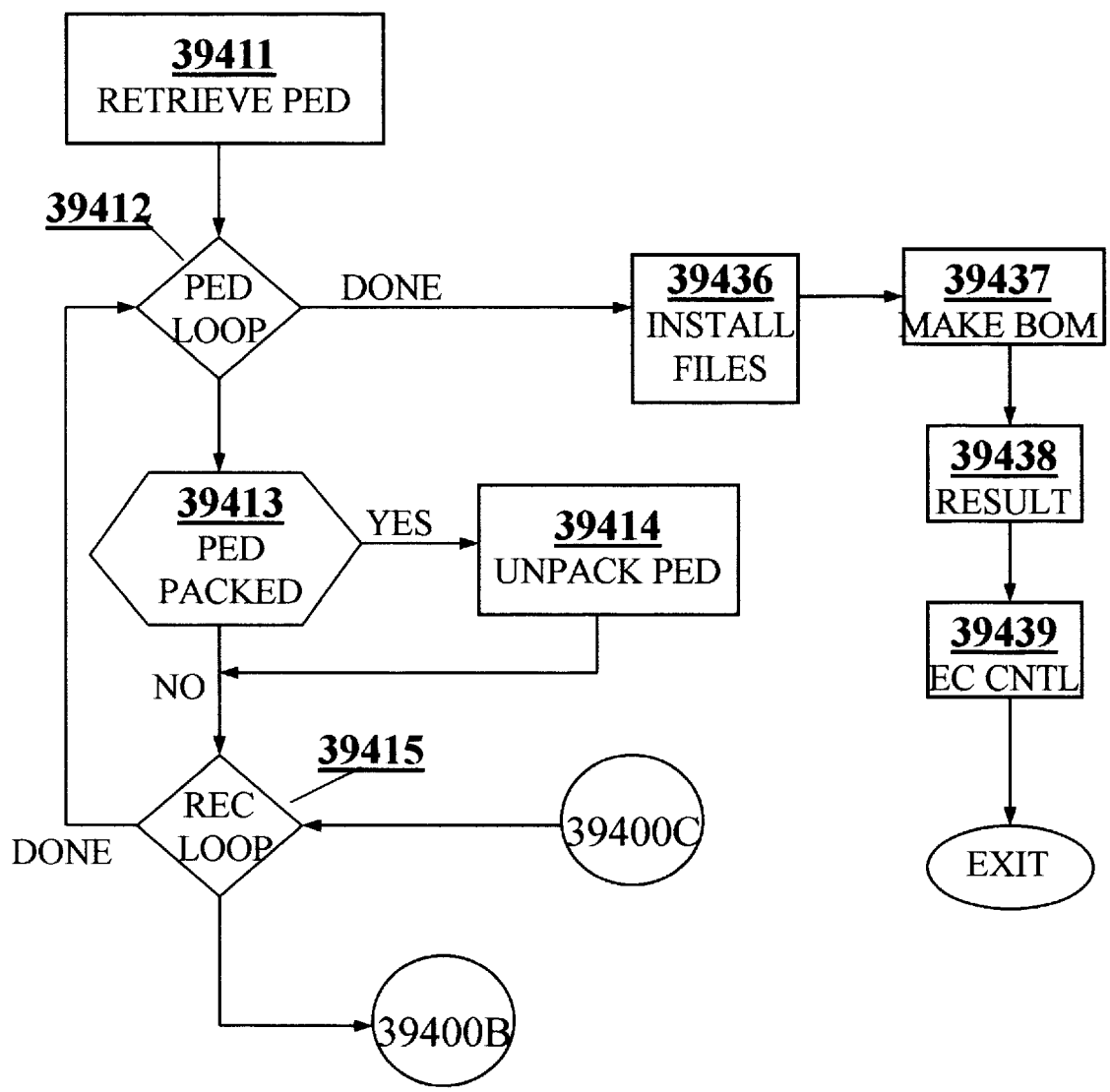
FIG. 22 diagrams the algorithm for processing a PED file.

Returning to the main flow chart in FIG. 20, Step 39104, Process PED, is the last Step. This Step is described in detail using the algorithm in FIGS. 22a thru 22c. Our preferred embodiment begins with Step 39411 in FIG. 22a, Retrieve PED. In this Step the DMS reads the control information received from Step 39324 of FIG. 21b. All files are put into a working area depending on the method used in the system for transferring files. Part of the control information is a list of all PEDs being processed. In most cases there is only one PED file since a single merged file is created in Step 39311 of FIG. 21a, however, our invention permits the DMS to work with groups of PED files too.

Step 39412, PED Loop, is the loop which must be set up to process all the PED files listed in the control information. Once again, in most cases, this loop will only be exercised once. Step 39413 is the Packed PED decision where the question "is the PED file compressed?" is asked. If the answer is "yes", the program proceeds to Step 39414, Unpack PED where the same routine used to compress the file in Step 39322 of FIG. 21b is used to expand it back to its original state.

Next the program proceeds to Step 39415, Rec Loop, which is another loop nested within the PED Loop in Step 39412. This inner loop is used to process all the records of the current PED file. Processing continues with asking the five questions in decision blocks 39416, 39420, 39426, 39430, 39434. Since this can be easily implemented using case or select statements, the order is not important. Each record must be tested using the first token to determine the type of record.

Figure 22B:
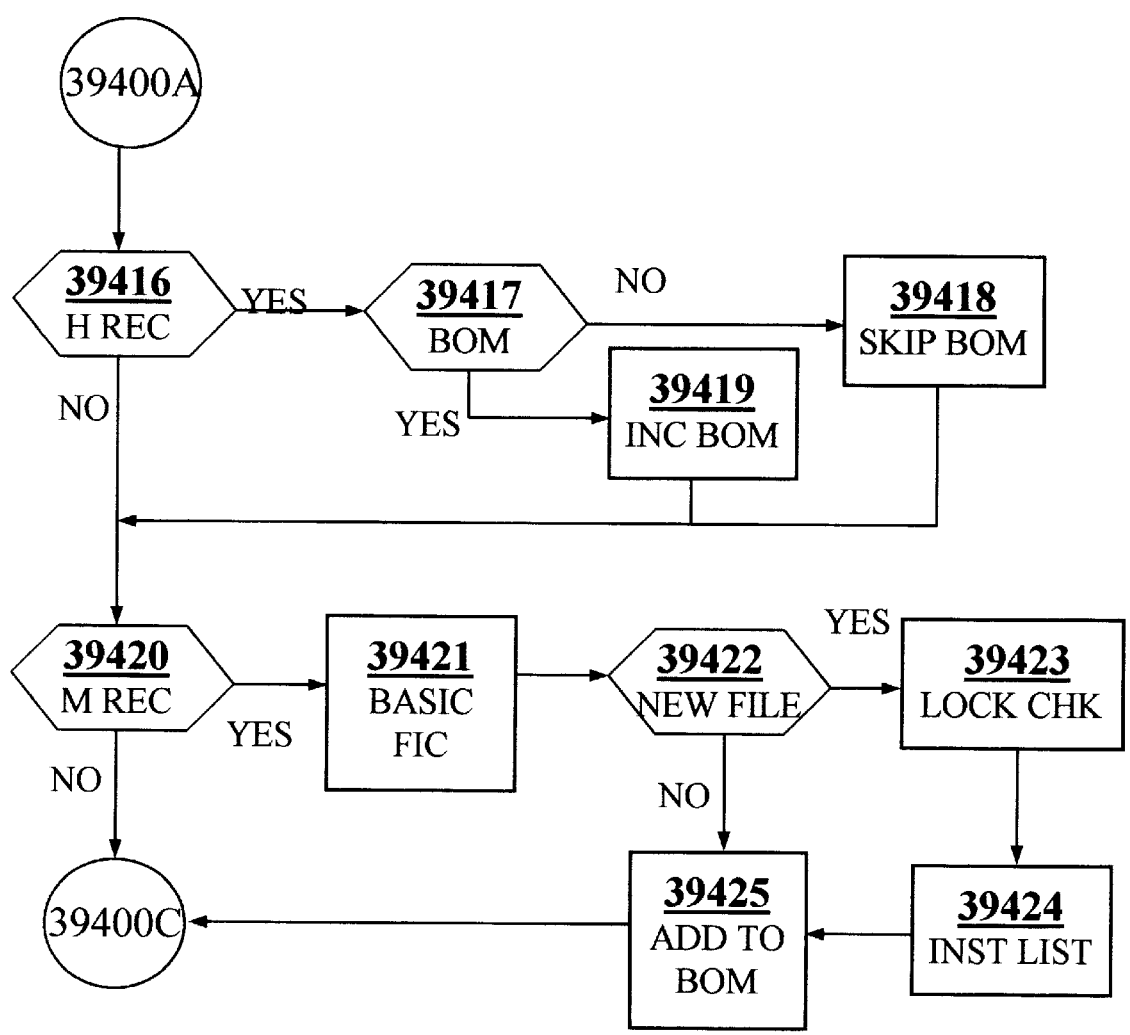

Step 39416 in FIG. 22b, H Rec, determines if the line is a Header record denoted by an "H" as the first token. If so, the header is evaluated in Step 39417, BOM, using the third token to determine whether a Bill of Materials is required. If not, a flag in Step 39418 is set to Skip BOM creation. If so, Step 39419 Increments a BOM index. This index is used in Step 39425 to set up an array or structure of BOM members.

Step 39420, M Rec, determines if the line is a Member record denoted by an "M" as the first token. If so, Step 39421 Basic FIC is executed. This performs a File Identification Check against the file listed in the second token. The fifth token provides the expected answer. In our preferred embodiment the same CRC routine used to calculate the fifth token is run again. It should produce the expected result. If not, this indicates the current image of this file is not the same as the one used in the initial task executed in Step 39101 of flow chart FIG. 20. The DMS would gracefully cease processing and notify the user of the mismatch.

If the CRC check passes, the program asks the question in Step 39422 "is this a New File". A new file is one that is not currently being tracked by the DMS. If the answer is "yes", some additional checks must be performed. Step 39423, Lock Check is designed to ensure that the user has the proper authority to promote the current file into the DMS. Since External Data Control substitutes for a formal promotion, it must comply with certain data integrity rules. The Lock Check essentially ensures that the file is not prohibited from entering the library due to an existing overlay or processing lock. It then checks to see if the file is "owned" by anyone. If so, it must be the user or someone for whom the user is a surrogate. In the latter case, the lock would be reset in favor of the user, and notification would be sent to the original owner. Once the Lock Check is cleared, Step 39424, Inst List is executed. Here the file is added to a list of files to be installed into the library at the end of the processing. The last thing the program must do with an "M" record is Add to BOM in Step 39425. In the preferred embodiment, this is done by parsing the file information from the second and third tokens into the proper format to write it into a temporary file. This file is used in a later by the Aggregation Manager's API which creates BOMs for the DMS. The fourth token, which is the BOM Member Type, is also written along with the file information.

Figure 22C:
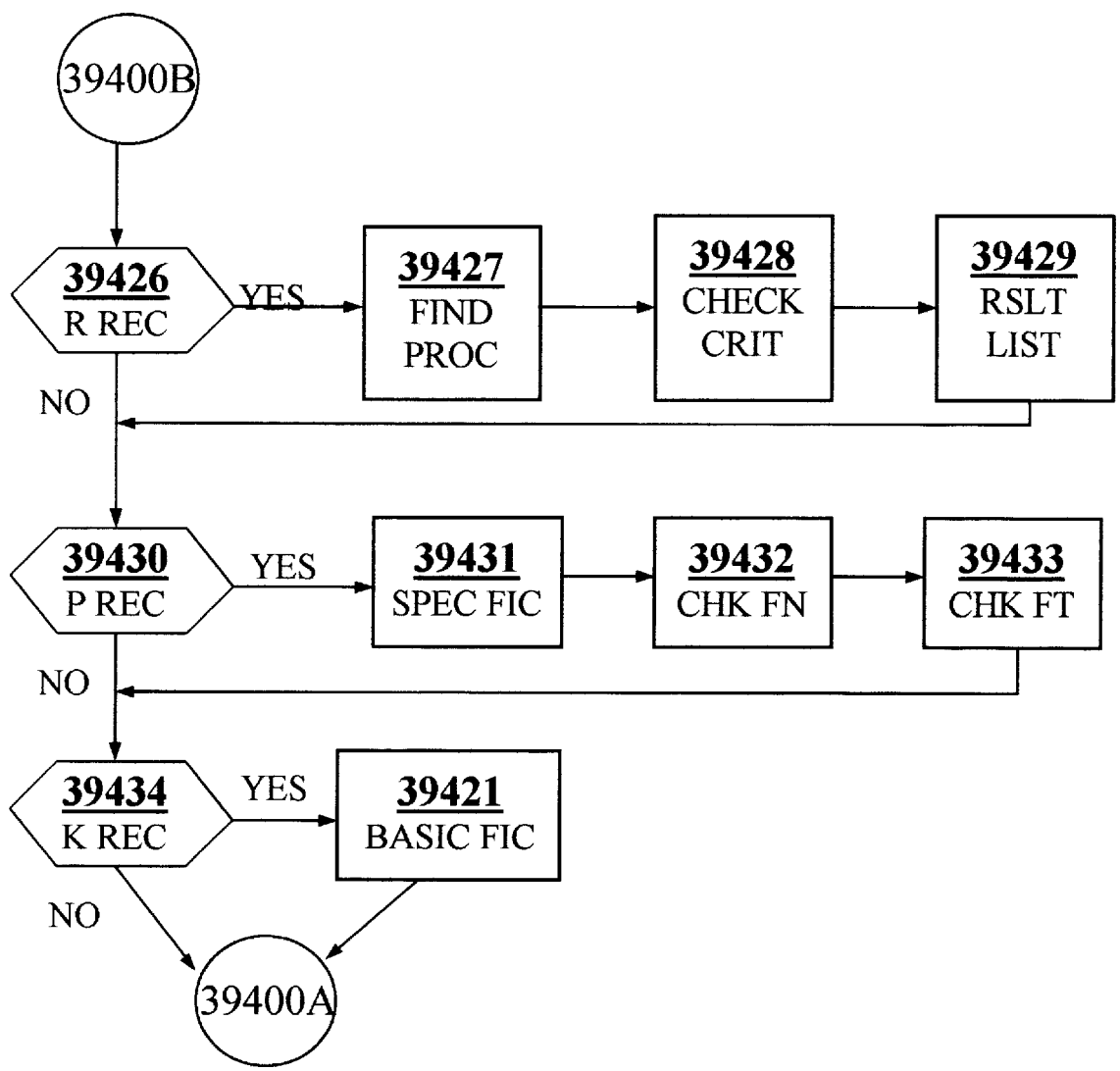

Step 39426 in FIG. 22c, R Rec, determines if the line is a Result record denoted by an "R" as the first token. If so, Step 39427 Find Proc is executed. In this Step the third token is parsed into the library filetype. The Target Package, Level and Version contained in the control information transmitted from Step 39324 is used as the PFVL. This information is used to filter the search of all processes in the DMS for that package. The process names are compared against the second token. If a match is found, Step 39428, Crit Chk, is run. Here the criteria for that process is compared against the actual process result in the fifth token. If the result meets the criteria, Step 39429, Rslt List is performed. All information required to store the result is saved for a future Step. This information contains the process name, version, library filetype, Target Level and the result.

Step 39430, P Rec, determines if the line is the Master Pedigree Record denoted by a "P" as the first token. If so, Step 39431 Spec FIC is invoked to perform a special CRC check. The purpose of this check is to ensure that the actual PED file being processed is identical to the one generated by the task in Step 39101 of FIG. 20. In our preferred embodiment, the "P" record is always last, so all records excluding the last one are temporarily stored into a file. The CRC routine is run on this file and the result should match the fourth token of the Master Pedigree Record. If not, then the PED file has been altered since creation and the contents can't be used. If this check passes, the temporary file is discarded, and Step 39432 Chk FN is executed. Here the second token of the Master Pedigree Record is compared against the actual file name being processed. This ensures the contents of two PED files weren't swapped. The final check, Chk FT, is Step 39433. This simply ensures that the library filetype denoted by the third token is indeed that which the DMS expects for External Data Control.

Step 39434, K Rec, determines if the line is a Support record denoted by a "K" as the first token. The files identified by the second token in these records only need to be run through the same Basic FIC check as in Step 39421.

At this point the program returns to the top of the Rec Loop in Step 39415 and repeats Steps 39416 through 39434 until all records of the current PED have been examined. Once the loop is exhausted, control returns to the top of the PED Loop in Step 39412. Once again, all steps from 39411 through 39434 are repeated until all PED files are examined.

Once all PED files have been successfully processed, it's safe to continue with the steps that actually store data in the repository and set results in the DMS. Step 39436, Inst Files, is invoked to deposit the files into the repository. All information required for this task was saved during Step 39424. In our preferred embodiment, this step relies on our Install Algorithm to store the data into the DMS. It should be noted that there is no need to actually save the PED file itself since it is merely a conduit by which other files and results are transported.

Step 39437, Make BOM is initiated to use the Bill of Material information gathered in Step 39425 to actually create the BOM in the DMS. This is done via the Application Program Interface provided by our Aggregation Manager. In Step 39438, Rslt, all the result information gathered in Step 39429 is stored into the DMS. This is done via various functions provided by the Process Manager for setting process results. These are described in the previous section. The program finishes by executing Step 39439, EC Cntl which checks to see if any Problem Fix, Part Number or Engineering Change information was transported with the PED. If so, the information is loaded into the proper tables of the DMS.

Upon completion of the above steps, the data and all results used and/or generated in Step 39101 of FIG. 20 is safely stored into the DMS in a manner consistent with the rules regarding Automated Library Processing.

While we have described our preferred embodiments of our inventions it will be understood that those skilled in the art, both now and in the future, may make various improvements and enhancements which fall within the scope of the claims which follow. These claims should be construed to maintain the proper protection for the inventions first disclosed.

What is claimed is:

1. A data management system for file and database management useful in concurrent engineering processes, comprising:

a design control system for fulfilling requests of a user initiated from a computer system client system coupled to a network, including a data management control system for managing a plurality of projects, each project having a data repository for data records and a control repository comprising a common access interface and one or more databases, said control repository communicating with users of said design control system for fulfilling requests of a user and the data repositories of said data management control system through a plurality of managers, each manager performing a unique function, wherein said managers act as building blocks which can be combined in a plurality of manners to support an environment for suitable for multiple users of a user community, and an external data control environment coupled to said data management control system via said common access interface for transferring results and data into said data management control system for storage in said data control repository from a process executed outside of said data management control system; and wherein one of said managers is a process manager, and one of said managers is a library manager enabling automated library processing of any application program or tool to be launched using input data from said data management control system and after processing enabling results to be recorded as output data in any data control repository of said data management control system as a record in said data control repository;

wherein each of said records in said data control repository includes data indicating the record filename, library, filetype, version and level; and, wherein said library manager enables a library process to be run on automated library machines (ALMs), including single ALMs, remote execution machines, and in an actor/object environment.

2. A data management system for file and database management according to claim 1 wherein said library manager enables two methods for initiating a library process, a first method being library initiated processing, and a second method being designer initiated library processing.

3. A data management system for file and database management according to claim 2 wherein said library initiated processing enables support by foreground processing, and by pre and post background processing.

4. A data management system for file and database management according to claim 3 in which said library processes may be run as independent tasks or chained together in a dependent sequence or any combination thereof.

5. A data management system for file and database management according to claim 3 including, for results disposition,
 a regular installation of output under full DMS control;
 a high performance (or aggregate) install which performs full checking on a designated anchor file and limited checking on the component files to improve performance;
 a create DILP (Designer Initiated Library Process) install whereby output is installed into DMS (Data Management System), then process result is recorded against it;
 a regular store which stores the output in the physical data repository but does not track it in the Control Repository;
 a sending of output to a specified destination outside of the DMS; allowing the output to be used as input to initiate a DILP.

6. A data management system for file and database management according to claim 3 wherein said library processes run dependently or independently within a homogeneous computer platform or across multiple platforms.

7. A data management system for file and database management according to claim 3 where a Library Process is pre-checked in the foreground for ensuring the existance of all the required input files prior to subjecting the input files to the background processing.

8. A data management system for file and database management according to claim 3 whereby a user may override the run-time process parameters in the foreground without the need for the Data Manager to redefine the library process.

9. A data management system for file and database management according to claim 2 whereby library processes may be deferred by initiation of a programmable timer which controls the time of initiation of a library process.

10. A data management system for file and database management according to claim 2 providing means for creating DILPs (Designer Initiated Library Processes) for recording a library process result against a non-existant file which will be created as part of the process and installed into the DMS (Data Management System) using a create DILP (Designer Initiated Library Process) installation.

11. A data management system for file and database management according to claim 2 which includes means for setting Level Independent Pseudo Processes for recording results against a file at the same level where the file resides; and which includes means for setting Level Independent Pseudo Processes for recording results against a file at a level above the level where the file resides; and wherein results may be used as promotion criteria once the file reaches a level where the result is recorded.

12. A data management system for file and database management according to claim 2 wherein a failed Post Process may be rectified by running an equivalent DILP (Designer Initiated Library Process) for avoiding any need to re-promote the file.

13. A data management system for file and database management according to claim 2 wherein is included a utility for a user to exempt a failing Library Process result from being checked as part of a promotion criteria.

14. A data management system for file and database management useful in concurrent engineering processes, comprising:
 a design control system for fulfilling requests of a user initiated from a computer system client system coupled to a network, including
  a data management control system for managing a plurality of projects, each project having a data repository for data records and a control repository comprising a common access interface and one or more databases,
  said control repository communicating with users of said design control system for fulfilling requests of a user and the data repositories of said data management control system through a plurality of managers, each manager performing a unique function, wherein said managers act as building blocks which can be combined in a plurality of manners to support an environment for suitable for multiple users of a user community, and
 an external data control environment coupled to said data management control system via said common access interface for transferring results and data into said data management control system for storage in said data control repository from a process executed outside of said data management control system; and wherein
  one of said managers is a process manager, and
  one of said managers is a library manager enabling automated library processing of any application program or tool to be launched using input data from said data management control system and after processing enabling results to be recorded as output data in any data control repository of said data management control system as a record in said data control repository; and
  including means for transporting all data and results generated outside the DMS (Data Management System) into the DMS (Data Management System) for affording data integrity and result checking as if the results were created within the DMS using Automated Library Processing.

15. A data management system for file and database management according to claim 14 whereby the External Data Control interacts with
 a Lock Manager for ensuring that any files currently locked in the DMS (Data Management Stem) are not overlaid or disturbed by those transported with a PED (Pedigree) file; and with
 an Authority Manager for ensuring that an owner of the PED has the proper authorities to perform the actions requested within the PED; and with
 a Problem Fix Manager for performing proper fix management associations; and with
 Part Number processing, EC (Engineering Change) Management and Release control for any data transported with the PED; and with
 an Aggregation Manager to permit the creation of BOMs (Bill of Materials) using data transported with the PED.

* * * * *